United States Patent
Henry et al.

(10) Patent No.: US 7,785,207 B2
(45) Date of Patent: Aug. 31, 2010

(54) WATER AMUSEMENT SYSTEM WITH ELEVATED STRUCTURE

(75) Inventors: Jeffery Wayne Henry, New Braunfels, TX (US); John Timothy Schooley, New Braunfels, TX (US)

(73) Assignee: Water Ride Concepts, Inc., New Braunfels, TX (US)

( * ) Notice: Subject to any disclaimer, the term of this patent is extended or adjusted under 35 U.S.C. 154(b) by 530 days.

(21) Appl. No.: 11/407,875

(22) Filed: Apr. 20, 2006

(65) Prior Publication Data

US 2007/0033868 A1 Feb. 15, 2007

Related U.S. Application Data

(60) Provisional application No. 60/673,326, filed on Apr. 20, 2005, provisional application No. 60/713,849, filed on Sep. 2, 2005.

(51) Int. Cl.
*A63H 23/16* (2006.01)
*A63H 23/10* (2006.01)
(52) U.S. Cl. .................. 472/128; 472/117; 472/136
(58) Field of Classification Search ............... 472/13, 472/116, 117, 128, 129, 136, 137
See application file for complete search history.

(56) References Cited

U.S. PATENT DOCUMENTS

| 193,516 | A | 7/1877 | Johns |
|---|---|---|---|
| 206,387 | A | 7/1878 | Bowen |
| 419,860 | A | 1/1890 | Libbey |
| 435,227 | A | 8/1890 | Inglis |
| 485,624 | A | 11/1892 | Gardner |
| 536,441 | A | 3/1895 | Morris |
| 540,715 | A | 6/1895 | Butler |
| 548,256 | A | 10/1895 | Idler |

(Continued)

FOREIGN PATENT DOCUMENTS

BE 543055 12/1955

(Continued)

OTHER PUBLICATIONS

Rorres, C. "The Turn of the Screw: Optimal Design of an Archimedes Screw" J. of Hydraulic Engineering, Jan. 2000, vol. 126, No. 1, pp. 72-80.

(Continued)

*Primary Examiner*—Kien T Nguyen
(74) *Attorney, Agent, or Firm*—Meyertons, Hood, Kivlin, Kowert & Goetzel, P.C.; Eric B. Meyertons

(57) ABSTRACT

A water amusement system may include a composite tree and an elevated structure. A composite tree may include a base having an artificial trunk portion. The base may be coupled to the surface. Living plants may be coupled to the base. Portions of the living plants may form branches of the composite tree. In some embodiments, the living plants are living trees. The system may include at least one structure coupled to the base. At least one of the structures may function to contain one or more persons above the surface. The water amusement system may include a water amusement ride coupled to the base. The water amusement ride may include an access point configured to allow participants to access the water amusement ride from the structure.

20 Claims, 21 Drawing Sheets

U.S. PATENT DOCUMENTS

| | | |
|---|---|---|
| 552,713 A | 1/1896 | Lenox |
| 555,049 A | 2/1896 | Ogilbe |
| 566,182 A | 8/1896 | Jackman |
| 570,016 A | 10/1896 | Harman |
| 572,426 A | 12/1896 | Idler |
| 576,704 A | 2/1897 | Urch |
| 583,121 A | 5/1897 | Pattee |
| 604,164 A | 5/1898 | Wilde et al. |
| 610,548 A | 9/1898 | Manny |
| 640,439 A | 1/1900 | Boyton |
| 654,980 A | 6/1900 | Howard |
| 664,179 A | 12/1900 | Schofield |
| 665,765 A | 1/1901 | Thompson |
| 689,114 A | 12/1901 | Pape |
| 691,353 A | 1/1902 | Carpenter et al. |
| 697,202 A | 4/1902 | Donne |
| 697,891 A | 4/1902 | Schrader |
| 706,821 A | 8/1902 | Hart |
| 714,717 A | 12/1902 | LaPorte |
| 720,014 A | 2/1903 | Folks |
| 724,040 A | 3/1903 | Pusterla |
| 724,757 A | 4/1903 | Symonds |
| 728,303 A | 5/1903 | Roltair |
| 728,894 A | 5/1903 | Folks |
| 741,964 A | 10/1903 | Harlan |
| 743,968 A | 11/1903 | Wilson |
| 744,880 A | 11/1903 | Smith |
| 753,311 A | 3/1904 | Pusterla |
| 753,449 A | 3/1904 | Thompson |
| 754,698 A | 3/1904 | Reed |
| 757,286 A | 4/1904 | Du Clos |
| 760,503 A | 5/1904 | Welsh |
| 762,566 A | 6/1904 | Webster et al. |
| 764,675 A | 7/1904 | Pfeiffer |
| 774,209 A | 11/1904 | Stubbs |
| 774,274 A | 11/1904 | Pusterla |
| 774,917 A | 11/1904 | Maguire |
| 776,936 A | 12/1904 | Pusterla |
| 779,464 A | 1/1905 | Bruce |
| 783,425 A | 2/1905 | Folks |
| 792,422 A | 6/1905 | Kelly |
| 801,945 A | 10/1905 | Welsh |
| 808,487 A | 12/1905 | Stahl |
| 824,436 A | 6/1906 | Pester |
| 828,689 A | 8/1906 | Thompson |
| 831,149 A | 9/1906 | Faller |
| 849,970 A | 4/1907 | Boyton |
| 868,736 A | 10/1907 | Washington |
| 879,283 A | 2/1908 | Mayberry et al. |
| 883,441 A | 3/1908 | Andrews |
| 891,388 A | 6/1908 | Visser et al. |
| 896,940 A | 8/1908 | Rosen |
| 904,848 A | 11/1908 | DeVore |
| 929,972 A | 8/1909 | M'Giehan |
| 931,863 A | 8/1909 | Haight |
| 952,673 A | 3/1910 | Karr |
| 1,004,174 A | 9/1911 | Kavakos |
| 1,056,929 A | 3/1913 | Navarro |
| 1,062,838 A | 5/1913 | Miller |
| 1,063,949 A | 6/1913 | Bedient |
| 1,095,965 A | 5/1914 | Glazier |
| 1,124,950 A | 1/1915 | Reagen et al. |
| 1,158,295 A | 10/1915 | Rodriguez |
| 1,159,519 A | 11/1915 | Menier |
| 1,167,993 A | 1/1916 | Guzendorfer |
| 1,195,707 A | 8/1916 | Miller |
| 1,198,749 A | 9/1916 | Myers |
| 1,230,559 A | 6/1917 | Burke |
| 1,249,455 A | 12/1917 | Myers |
| 1,266,749 A | 5/1918 | Abbott |
| 1,320,124 A | 10/1919 | Chrul |
| 1,378,635 A | 5/1921 | Unger |
| 1,399,469 A | 12/1921 | Cucullu |
| 1,417,570 A | 5/1922 | Ridgway |
| 1,440,661 A | 1/1923 | Dickinson |
| 1,441,126 A | 1/1923 | Sherman et al. |
| 1,448,306 A | 3/1923 | Lezert |
| 1,497,754 A | 6/1924 | Howard |
| 1,520,217 A | 12/1924 | Auperl |
| 1,540,635 A | 6/1925 | Kohl |
| 1,551,249 A | 8/1925 | Held |
| 1,563,855 A | 12/1925 | Held |
| 1,591,566 A | 7/1926 | Schmidt et al. |
| 1,601,483 A | 9/1926 | Vaszin |
| 1,606,024 A | 11/1926 | Gorhum et al. |
| 1,606,854 A | 11/1926 | Vaszin |
| 1,607,771 A | 11/1926 | Miller |
| 1,609,922 A | 12/1926 | Wiig |
| 1,648,196 A | 11/1927 | Rohmer |
| 1,763,976 A | 6/1930 | Lippincott |
| 1,783,268 A | 12/1930 | Traver |
| 1,849,226 A | 3/1932 | Erban |
| 1,859,267 A | 5/1932 | Kurz |
| 1,893,167 A | 1/1933 | Glagolin |
| 1,926,780 A | 9/1933 | Lippincott |
| 2,064,035 A | 12/1936 | Rynearson |
| 2,146,631 A | 2/1939 | Kish |
| 2,484,466 A | 3/1946 | Rumler |
| 2,651,143 A | 9/1953 | Esmay et al. |
| 2,705,144 A | 3/1955 | Ridgway |
| 2,738,885 A | 3/1956 | Demaline |
| 2,837,866 A | 6/1958 | Esmay et al. |
| 2,888,205 A | 5/1959 | Trucco |
| 3,007,282 A | 5/1959 | Galesky |
| 2,900,759 A | 8/1959 | Hutchinson |
| 2,941,331 A | 6/1960 | Ottolini |
| D190,127 S | 4/1961 | Fowler |
| 2,991,726 A | 7/1961 | Miller |
| 3,000,017 A | 9/1961 | Skovira |
| 3,003,430 A | 10/1961 | Hamel |
| 3,030,895 A | 4/1962 | Hamel |
| 3,113,528 A | 12/1963 | Morgan et al. |
| 3,114,333 A | 12/1963 | Fowler et al. |
| 3,116,925 A | 1/1964 | Welch |
| D204,282 S | 4/1966 | Morgan |
| 3,302,413 A | 2/1967 | Burnett |
| 3,390,640 A | 7/1968 | Couttet et al. |
| 3,404,635 A | 10/1968 | Bacon et al. |
| 3,410,420 A | 11/1968 | Butts |
| 3,456,943 A | 7/1969 | Brown |
| 3,473,334 A | 8/1969 | Dexter |
| 3,508,405 A | 4/1970 | Koch |
| 3,534,413 A | 10/1970 | Plasseraud |
| 3,598,402 A | 8/1971 | Frenzl |
| 3,610,527 A | 10/1971 | Ericson |
| 3,690,265 A | 9/1972 | Horibata |
| 3,730,520 A | 5/1973 | Willis |
| D229,354 S | 11/1973 | Morgan |
| 3,827,387 A | 8/1974 | Morgan |
| 3,829,349 A | 8/1974 | Hermanson |
| 3,830,161 A | 8/1974 | Bacon |
| 3,838,648 A | 10/1974 | Dahlberg et al. |
| 3,841,023 A | 10/1974 | Carlyon, Jr. |
| 3,853,067 A | 12/1974 | Bacon |
| 3,861,514 A | 1/1975 | Ling |
| 3,865,041 A | 2/1975 | Bacon |
| 3,890,655 A | 6/1975 | Mathis |
| 3,913,332 A | 10/1975 | Forsman |
| 3,923,301 A | 12/1975 | Myers |
| 3,930,450 A | 1/1976 | Symons |
| 3,956,779 A | 5/1976 | Jewett |
| 4,001,899 A | 1/1977 | Mathis |
| 4,063,517 A | 12/1977 | Nardozzi, Jr. |
| 4,073,722 A | 2/1978 | Grutsch |

| | | | | | |
|---|---|---|---|---|---|
| 4,149,469 A | 4/1979 | Bigler | 5,152,210 A | 10/1992 | Chen |
| 4,149,710 A | 4/1979 | Rouchard | 5,167,321 A | 12/1992 | Brodrick, Sr. |
| 4,175,361 A | 11/1979 | Kumode | 5,171,101 A | 12/1992 | Sauerbier et al. |
| 4,194,733 A | 3/1980 | Whitehouse, Jr. | 5,172,517 A | 12/1992 | Thomsen |
| 4,196,900 A | 4/1980 | Becker et al. | 5,183,437 A | 2/1993 | Millay et al. |
| 4,198,043 A | 4/1980 | Timbes et al. | 5,194,048 A | 3/1993 | Briggs |
| 4,205,785 A | 6/1980 | Stanley | 5,213,547 A | 5/1993 | Lochtefeld |
| 4,221,170 A | 9/1980 | Koudelka | 5,219,315 A | 6/1993 | Fuller et al. |
| 4,225,953 A | 9/1980 | Simon et al. | 5,224,652 A | 7/1993 | Kessler |
| 4,278,247 A | 7/1981 | Joppe et al. | 5,230,662 A | 7/1993 | Langford |
| 4,299,171 A | 11/1981 | Larson | 5,236,280 A | 8/1993 | Lochtefeld |
| 4,305,117 A | 12/1981 | Evans | 5,243,782 A | 9/1993 | Jones |
| 4,337,704 A | 7/1982 | Becker et al. | RE34,407 E | 10/1993 | Frenzl |
| 4,376,404 A | 3/1983 | Haddad | 5,253,864 A | 10/1993 | Heege et al. |
| D269,082 S | 5/1983 | Spieldiener | 5,265,373 A | 11/1993 | Vollebregt |
| 4,386,480 A | 6/1983 | Horowitz | 5,265,802 A | 11/1993 | Hobbs et al. |
| 4,391,201 A | 7/1983 | Bailey | 5,271,692 A | 12/1993 | Lochtefeld |
| 4,392,434 A | 7/1983 | Dürwald et al. | 5,299,964 A | 4/1994 | Hopkins |
| 4,423,864 A | 1/1984 | Wiik | 5,320,362 A | 6/1994 | Bear et al. |
| 4,429,867 A | 2/1984 | Barber | 5,323,307 A | 6/1994 | Wolf et al. |
| 4,484,739 A | 11/1984 | Kreinbihl et al. | 5,378,197 A | 1/1995 | Briggs |
| 4,484,836 A | 11/1984 | Bailard | 5,387,158 A | 2/1995 | Bertrand |
| 4,501,434 A | 2/1985 | Dupuis | 5,393,170 A | 2/1995 | Lochtefeld |
| 4,516,943 A | 5/1985 | Spieldiener et al. | 5,401,117 A | 3/1995 | Lochtefeld |
| 4,543,886 A | 10/1985 | Spieldiener et al. | 5,403,238 A | 4/1995 | Baxter et al. |
| 4,545,574 A | 10/1985 | Sassak | 5,405,294 A | 4/1995 | Briggs |
| 4,545,583 A | 10/1985 | Pearman et al. | 5,413,454 A | 5/1995 | Movsesian |
| 4,557,634 A | 12/1985 | Vidal | 5,421,451 A | 6/1995 | Easton |
| 4,558,474 A | 12/1985 | Bastenhof | 5,421,782 A | 6/1995 | Lochtefeld |
| 4,564,190 A | 1/1986 | Frenzl | 5,426,899 A | 6/1995 | Jones |
| 4,576,512 A | 3/1986 | Combes et al. | 5,427,574 A | 6/1995 | Donnelly-Weide |
| 4,683,686 A | 8/1987 | Ozdemir | 5,433,671 A | 7/1995 | Davis |
| 4,695,058 A | 9/1987 | Carter, III et al. | 5,437,463 A | 8/1995 | Fromm |
| 4,696,251 A | 9/1987 | Spieldiener et al. | 5,439,170 A | 8/1995 | Dach |
| 4,741,388 A | 5/1988 | Kuroiwa | 5,450,691 A | 9/1995 | Christie et al. |
| 4,759,545 A | 7/1988 | Grable | 5,452,678 A | 9/1995 | Simpkins |
| 4,778,430 A | 10/1988 | Goldfarb et al. | 5,453,054 A | 9/1995 | Langford |
| 4,783,861 A | 11/1988 | Leurent | 5,461,876 A | 10/1995 | Dressler |
| 4,792,260 A | 12/1988 | Sauerbier | 5,473,233 A | 12/1995 | Stull et al. |
| 4,797,027 A | 1/1989 | Combes et al. | 5,477,750 A | 12/1995 | Korzan |
| 4,797,605 A | 1/1989 | Palanisamy | 5,478,281 A | 12/1995 | Forton |
| 4,805,896 A | 2/1989 | Moody | 5,482,510 A | 1/1996 | Ishii et al. |
| 4,805,897 A | 2/1989 | Dubeta | 5,494,729 A | 2/1996 | Henry et al. |
| 4,817,312 A | 4/1989 | Fuller et al. | 5,499,821 A | 3/1996 | Rycroft |
| 4,836,521 A | 6/1989 | Barber | 5,503,597 A | 4/1996 | Lochtefeld et al. |
| 4,850,896 A | 7/1989 | Smith et al. | 5,513,470 A | 5/1996 | Vollebregt |
| 4,854,256 A | 8/1989 | Hayashi | 5,536,210 A | 7/1996 | Barber |
| 4,855,167 A | 8/1989 | Biehl | 5,540,622 A | 7/1996 | Gold et al. |
| 4,905,987 A | 3/1990 | Frenzi | 5,555,676 A | 9/1996 | Lund |
| 4,910,814 A | 3/1990 | Weiner | 5,564,859 A | 10/1996 | Lochtefeld |
| 4,939,358 A | 7/1990 | Herman et al. | 5,564,984 A | 10/1996 | Mirabella et al. |
| 4,954,014 A | 9/1990 | Sauerbier et al. | 5,577,344 A | 11/1996 | Zaremba et al. |
| 4,960,275 A | 10/1990 | Magon | 5,581,954 A | 12/1996 | Vollebregt |
| 4,962,922 A | 10/1990 | Chu | 5,613,443 A | 3/1997 | Ariga et al. |
| 4,963,057 A | 10/1990 | Fournier | 5,623,986 A | 4/1997 | Wiggs |
| 4,979,679 A | 12/1990 | Downs | 5,628,584 A | 5/1997 | Lochtefeld |
| 4,984,783 A | 1/1991 | Fujimaki | 5,649,867 A | 7/1997 | Briggs |
| 4,986,784 A | 1/1991 | French | 5,662,525 A | 9/1997 | Briggs |
| 5,011,134 A | 4/1991 | Langford | 5,664,910 A | 9/1997 | Lochtefeld et al. |
| 5,011,161 A | 4/1991 | Galphin | 5,667,445 A | 9/1997 | Lochtefeld |
| 5,020,465 A | 6/1991 | Langford | 5,678,956 A | 10/1997 | Freelain |
| 5,022,588 A | 6/1991 | Haase | 5,685,778 A | 11/1997 | Sheldon et al. |
| 5,031,356 A | 7/1991 | Thomsen | 5,704,294 A | 1/1998 | Van Winkle et al. |
| 5,033,392 A | 7/1991 | Schemitsch | 5,716,282 A | 2/1998 | Ring et al. |
| 5,069,387 A | 12/1991 | Alba | 5,722,874 A | 3/1998 | Horton et al. |
| 5,069,443 A | 12/1991 | Shiratori | 5,732,635 A | 3/1998 | McKoy |
| 5,073,082 A | 12/1991 | Radlik | 5,735,748 A | 4/1998 | Meyers et al. |
| 5,092,268 A | 3/1992 | Taylor | 5,738,590 A | 4/1998 | Lochtefeld |
| 5,115,908 A | 5/1992 | Williams | 5,741,189 A | 4/1998 | Briggs |
| 5,118,196 A | 6/1992 | Ault et al. | 5,761,776 A | 6/1998 | Vollebregt |
| 5,137,497 A | 8/1992 | Dubeta | 5,765,314 A | 6/1998 | Giglio et al. |
| 5,143,107 A | 9/1992 | Kelley | 5,766,082 A | 6/1998 | Lochtefeld et al. |
| D330,579 S | 10/1992 | Briggs | 5,779,553 A | 7/1998 | Langford |

| | | | | | | |
|---|---|---|---|---|---|---|
| 5,785,592 | A | 7/1998 | Jacobsen | 6,561,914 B2 | 5/2003 | Henry |
| 5,791,254 | A | 8/1998 | Mares et al. | 6,569,023 B1 * | 5/2003 | Briggs ................ 472/117 |
| 5,809,701 | A | 9/1998 | Vollebregt | 6,579,175 B2 | 6/2003 | Suzuki |
| 5,816,314 | A | 10/1998 | Wiggs et al. | 6,604,327 B1 | 8/2003 | Reville |
| 5,820,471 | A * | 10/1998 | Briggs ................ 472/128 | 6,608,563 B2 | 8/2003 | Weston et al. |
| 5,820,472 | A | 10/1998 | Briggs | 6,634,949 B1 | 10/2003 | Briggs et al. |
| D403,392 | S | 12/1998 | Briggs et al. | 6,651,268 B1 | 11/2003 | Briggs |
| 5,853,332 | A | 12/1998 | Briggs | 6,676,530 B2 | 1/2004 | Lochtefeld |
| 5,860,364 | A | 1/1999 | McKoy | 6,702,687 B1 | 3/2004 | Henry |
| 5,860,766 | A | 1/1999 | Lochtefeld et al. | 6,708,706 B1 | 3/2004 | Robinson |
| 5,865,680 | A | 2/1999 | Briggs | 6,716,107 B2 | 4/2004 | Lochtefeld |
| D406,871 | S | 3/1999 | Briggs | 6,738,992 B2 | 5/2004 | Lochtefeld |
| D407,133 | S | 3/1999 | Briggs | 6,758,231 B1 | 7/2004 | Lochtefeld et al. |
| 5,899,633 | A | 5/1999 | Lochtefeld | 6,773,355 B1 | 8/2004 | Lekhtman |
| 5,899,634 | A | 5/1999 | Lochtefeld | 6,786,830 B2 | 9/2004 | Briggs et al. |
| 5,911,190 | A | 6/1999 | Lochtefeld et al. | 6,789,608 B1 | 9/2004 | Wiggs |
| 5,927,478 | A | 7/1999 | Archer | 6,796,908 B2 | 9/2004 | Weston |
| D413,957 | S | 9/1999 | Briggs | 6,830,146 B1 | 12/2004 | Scully et al. |
| 5,950,253 | A | 9/1999 | Last | 6,928,670 B2 | 8/2005 | Lochtefeld et al. |
| 5,967,901 | A | 10/1999 | Briggs | 6,957,662 B2 | 10/2005 | Lochtefeld et al. |
| D416,066 | S | 11/1999 | Briggs | 6,976,434 B2 | 12/2005 | Roig et al. |
| 5,978,593 | A | 11/1999 | Sexton | 7,004,847 B2 | 2/2006 | Henry |
| 5,989,126 | A | 11/1999 | Kilbert et al. | 7,029,400 B2 | 4/2006 | Briggs |
| 6,006,672 | A | 12/1999 | Newfarmer et al. | 7,040,994 B2 | 5/2006 | Lochtefeld et al. |
| D421,283 | S | 2/2000 | Briggs et al. | 7,055,282 B2 | 6/2006 | Bryan, III |
| 6,036,603 | A | 3/2000 | Mason et al. | RE39,171 E | 7/2006 | Lochtefeld |
| 6,045,449 | A | 4/2000 | Aragona et al. | 7,179,173 B2 | 2/2007 | Henry et al. |
| 6,075,442 | A | 6/2000 | Welch | 7,229,359 B2 | 6/2007 | Henry et al. |
| 6,089,987 | A * | 7/2000 | Briggs ................ 472/128 | 7,263,805 B2 | 9/2007 | Chapus |
| 6,092,332 | A | 7/2000 | Roess et al. | 7,278,028 B1 | 10/2007 | Hingoranee |
| 6,105,527 | A | 8/2000 | Lochtefeld et al. | 7,285,053 B2 | 10/2007 | Henry et al. |
| 6,113,506 | A | 9/2000 | Nielsen | 7,371,182 B2 | 5/2008 | Henry et al. |
| 6,115,974 | A | 9/2000 | Milanian | 7,371,183 B2 | 5/2008 | Henry et al. |
| 6,132,317 | A | 10/2000 | Lochtefeld | 7,401,786 B2 | 7/2008 | Lochtefeld |
| 6,132,318 | A | 10/2000 | Briggs | 7,445,550 B2 | 11/2008 | Barney et al. |
| 6,139,382 | A | 10/2000 | Eschbacher et al. | 2002/0072317 A1 | 6/2002 | Livingston et al. |
| 6,146,282 | A | 11/2000 | McCready et al. | 2002/0082097 A1 | 6/2002 | Henry et al. |
| 6,161,771 | A | 12/2000 | Henry | 2002/0180155 A1 | 12/2002 | Lochtefeld |
| 6,162,127 | A | 12/2000 | Ochi | 2003/0190967 A1 | 10/2003 | Henry |
| 6,174,242 | B1 | 1/2001 | Briggs et al. | 2003/0203760 A1 | 10/2003 | Henry et al. |
| 6,178,692 | B1 | 1/2001 | Graven | 2004/0033833 A1 | 2/2004 | Briggs et al. |
| 6,186,902 | B1 | 2/2001 | Briggs | 2004/0077423 A1 | 4/2004 | Weston et al. |
| 6,195,851 | B1 | 3/2001 | Vollebregt et al. | 2004/0197221 A1 | 10/2004 | Stanley |
| 6,210,287 | B1 | 4/2001 | Briggs | 2005/0034768 A1 | 2/2005 | Henry et al. |
| 6,231,451 | B1 | 5/2001 | Briggs | 2005/0047869 A1 | 3/2005 | Lochtefeld |
| 6,237,499 | B1 | 5/2001 | McKoy | 2005/0085306 A1 | 4/2005 | Henry et al. |
| 6,261,186 | B1 | 7/2001 | Henry | 2005/0090318 A1 | 4/2005 | Henry et al. |
| 6,264,202 | B1 | 7/2001 | Briggs | 2005/0090319 A1 | 4/2005 | Henry et al. |
| 6,265,977 | B1 | 7/2001 | Vega et al. | 2005/0090320 A1 | 4/2005 | Henry et al. |
| 6,269,588 | B1 | 8/2001 | Ito | 2005/0090321 A1 | 4/2005 | Henry et al. |
| 6,272,695 | B1 | 8/2001 | Brandner | 2005/0090322 A1 | 4/2005 | Henry et al. |
| 6,276,353 | B1 | 8/2001 | Briggs et al. | 2005/0143173 A1 | 6/2005 | Barney et al. |
| 6,280,342 | B1 | 8/2001 | Tod | 2005/0148398 A1 | 7/2005 | Lochtefeld et al. |
| 6,283,871 | B1 | 9/2001 | Briggs | 2005/0286976 A1 | 12/2005 | Lochtefeld et al. |
| 6,286,266 | B1 | 9/2001 | Popowych et al. | 2005/0288111 A1 | 12/2005 | Cowan et al. |
| 6,319,137 | B1 | 11/2001 | Lochtefeld | 2006/0052171 A1 | 3/2006 | Henry et al. |
| 6,320,495 | B1 | 11/2001 | Sporgis | 2006/0111195 A1 | 5/2006 | Henry |
| 6,336,771 | B1 | 1/2002 | Hill | 2006/0111196 A1 | 5/2006 | Henry |
| 6,354,955 | B1 | 3/2002 | Stuart et al. | 2006/0135274 A1 | 6/2006 | Henry |
| 6,362,778 | B2 | 3/2002 | Neher | 2006/0142090 A1 | 6/2006 | Henry |
| 6,371,717 | B1 | 4/2002 | Grams et al. | 2006/0154726 A1 | 7/2006 | Weston et al. |
| 6,375,578 | B1 | 4/2002 | Briggs | 2006/0214805 A1 | 9/2006 | Boujon |
| 6,443,849 | B1 * | 9/2002 | Byrd ................ 472/116 | 2006/0229134 A1 | 10/2006 | Briggs et al. |
| 6,460,201 | B1 | 10/2002 | Lochtefeld | 2006/0258471 A1 | 11/2006 | Briggs et al. |
| 6,475,095 | B1 | 11/2002 | Henry | 2006/0260697 A1 | 11/2006 | Lochtefeld et al. |
| 6,488,590 | B2 | 12/2002 | Katayama | 2006/0287030 A1 | 12/2006 | Briggs et al. |
| 6,491,589 | B1 | 12/2002 | Lochtefeld | 2007/0054745 A1 | 3/2007 | Henry et al. |
| 6,513,284 | B1 | 2/2003 | Sandlin | 2007/0060404 A1 | 3/2007 | Henry et al. |
| 6,520,853 | B2 | 2/2003 | Suzuki | 2007/0066396 A1 | 3/2007 | Weston et al. |
| 6,526,158 | B1 | 2/2003 | Goldberg | 2007/0078016 A1 | 4/2007 | Henry et al. |
| 6,527,646 | B1 | 3/2003 | Briggs | 2007/0087849 A1 | 4/2007 | Henry et al. |
| 6,533,191 | B1 | 3/2003 | Berger et al. | 2007/0087850 A1 | 4/2007 | Henry et al. |
| 6,553,336 | B1 | 4/2003 | Johnson et al. | 2007/0087851 A1 | 4/2007 | Henry et al. |

| | | |
|---|---|---|
| 2007/0087852 A1 | 4/2007 | Henry et al. |
| 2007/0087853 A1 | 4/2007 | Henry et al. |
| 2007/0087854 A1 | 4/2007 | Henry et al. |
| 2007/0197304 A1 | 8/2007 | Henry et al. |
| 2007/0199722 A1 | 8/2007 | Bridge |
| 2007/0249425 A1 | 10/2007 | Weston et al. |
| 2008/0014835 A1 | 1/2008 | Weston et al. |
| 2008/0021776 A1 | 1/2008 | Lochtefeld |
| 2008/0216427 A1 | 9/2008 | Lochtefeld |

FOREIGN PATENT DOCUMENTS

| | | |
|---|---|---|
| DE | 129145 | 3/1902 |
| DE | 893778 | 10/1953 |
| DE | 4243812 A1 | 6/1994 |
| EP | 1318864 | 6/2003 |
| EP | 1318864 | 11/2005 |
| EP | 1604712 | 12/2005 |
| WO | 92/03201 | 3/1992 |
| WO | 92/04087 | 3/1992 |
| WO | 97/33668 | 9/1997 |
| WO | 98/45006 | 10/1998 |
| WO | 01/10184 | 2/2001 |
| WO | 02/22226 | 3/2002 |
| WO | 02/22227 | 3/2002 |
| WO | 2005/042124 | 5/2005 |
| WO | 2006/057970 | 6/2006 |
| WO | 2006/113936 | 10/2006 |
| WO | 2007/019278 | 2/2007 |
| WO | 2007/027841 | 3/2007 |
| WO | 2007/028040 | 3/2007 |
| WO | 2007/028042 | 3/2007 |
| WO | 2007/028043 | 3/2007 |
| WO | 2007/035524 | 3/2007 |
| WO | 2007/106717 | 9/2007 |

OTHER PUBLICATIONS

Office Action for U.S. Appl. No. 10/693,654 mailed on Dec. 7, 2004.
Office Action for U.S. Appl. No. 10/693,654 mailed on Jun. 10, 2005.
International Search Report for PCT/US01/28542 mailed Mar. 27, 2002.
Written Opinion for PCT/US01/28542 mailed May 2, 2002.
Written Opinion for PCT/US01/28542 issued Aug. 5, 2002.
International Preliminary Examination Report for PCT/US01/28542 issued Dec. 2, 2002.
Written Opinion for 01 970 881.7-2307 mailed Apr. 13, 2004.
Written Opinion for 01 970 881.7-2307 mailed Oct. 21, 2004.
International Search Report for PCT/US01/28535 mailed Mar. 27, 2002.
Written Opinion for PCT/US01/28535 mailed May 2, 2002.
Written Opinion for PCT/US01/28535 mailed Aug. 6, 2002.
International Preliminary Examination Report for PCT/US01/28535 issued Jan. 13, 2003.
Engineering drawing (as well as photographs of the finished product) for the Silver Dollar City water slide in Branson, Missouri, the date is unknown, however there is a 1986 copyright on the engineering drawing.
European Search Report for EP 05019093.3 mailed Oct. 28, 2005.
Office Action for U.S. Appl. No. 09/952,036 mailed on Feb. 9, 2006.
Office Action for U.S. Appl. No. 10/985,178 mailed on Apr. 20, 2005.
Office Action for U.S. Appl. No. 10/985,178 mailed on Oct. 3, 2005.
Office Action for U.S. Appl. No. 10/985,178 mailed on May 18, 2006.
Co-Pending U.S. Appl. No. 11/215,357 entitled, "Methods and Systems for Amusement Park Conveyors" to Henry et al. filed Aug. 30, 2005; available in private Pair.
Co-Pending U.S. Appl. No. 11/215,736 entitled, "Water Amusement Park Conveyor Barriers" to Henry et al. filed Aug. 30, 2005; available in private Pair.
Co-Pending U.S. Appl. No. 11/215,747 entitled, "Adjusting Participant Flow Rate in Water Amusement Parks" to Henry et al. filed Aug. 30, 2005; available in private Pair.

Co-Pending U.S. Appl. No. 11/215,795 entitled, "Modular Water Amusement Park Conveyors" to Henry et al. filed Aug. 30, 2005; available in private Pair.
Co-Pending U.S. Appl. No. 11/215,351 entitled, "Water Amusement Park Conveyor Support Elements" to Henry et al. filed Aug. 30, 2005; available in private Pair.
Co-Pending U.S. Appl. No. 11/244,864 entitled, "Water Amusement Park Water Channel Flow System" to Henry et al. filed Oct. 6, 2005; available in private Pair.
Co-Pending U.S. Appl. No. 11/244,872 entitled, "Water Amusement Park Water Channel and Adjustable Flow Controller" to Henry et al. filed Oct. 6, 2005; available in private Pair.
Co-Pending U.S. Appl. No. 11/283,503 entitled, "Methods and Systems for Water Amusement Conveyor" to Henry et al. filed Nov. 18, 2005; available in private Pair.
Co-Pending U.S. Appl. No. 11/375,361 entitled, "Method and System of Positionable Covers for Water Amusement Parks" to Henry et al. filed Mar. 14, 2006; available in private Pair.
Co-Pending U.S. Appl. No. 11/407,862 entitled, "Composite Tree" to Henry et al. filed Apr. 20, 2006; available in private Pair.
Co-Pending U.S. Appl. No. 11/407,861 entitled, "Tree With Elevated Structure" to Henry et al. filed Apr. 20, 2006; available in private Pair.
Co-Pending U.S. Appl. No. 11/407,875 entitled, "Water Amusement System With Elevated Structure" to Henry et al. filed Apr. 20, 2006; available in private Pair.
Co-Pending U.S. Appl. No. 11/407,874 entitled, "Thematic Tree System" to Henry et al. filed Apr. 20, 2006; available in private Pair.
Co-Pending U.S. Appl. No. 11/407,886 entitled, "Water Amusement System With Trees" to Henry et al. filed Apr. 20, 2006; available in private Pair.
Co-Pending U.S. Appl. No. 11/407,845 entitled, "Lift Apparatus for Base-Mounted Plant" to Henry et al. filed Apr. 20, 2006; available in private Pair.
Co-Pending U.S. Appl. No. 11/407,885 entitled, "Tree With Covering Apparatus" to Henry et al. filed Apr. 20, 2006; available in private Pair.
AA38—Exhibits related to the "Gravity Groove" slide (Sep. 1995).
AA41—Exhibits related to the "Mountain Slidewinder" ride.
AA42—Office Action for U.S. Appl. No. 10/997,790 mailed on Jan. 19, 2007.
AA43—Office Action for U.S. Appl. No. 10/986,720 mailed on Jan. 19, 2007.
AA44—Office Action for U.S. Appl. No. 10/987,099 mailed on Jan. 19, 2007.
AA51—International Search Report and Written Opinion for PCT/US06/15503 mailed Jul. 6, 2007.
AA52—International Search Report and Written Opinion for PCT/US06/34264 mailed Jul. 24, 2007.
AA53—Flinn, J. "Sleeping with the birds: Treehouse resort makes it easy to be a kid again." San Francisco Chronicle, Jul. 29, 2003, Final Edition, p. A20.
AA54—Office Action for U.S. Appl. No. 10/985,178 mailed on Feb. 20, 2007.
AA55—Office Action for U.S. Appl. No. 11/987,727 mailed on Feb. 20, 2007.
AA56—Office Action for U.S. Appl. No. 11/987,727 mailed on Sep. 13, 2007.
AA57—Office Action for U.S. Appl. No. 10/997,791 mailed on Aug. 11, 2005.
AA58—Office Action for U.S. Appl. No. 10/997,791 mailed on Feb. 14, 2007.
AA59—Office Action for U.S. Appl. No. 10/997,791 mailed on Sep. 14, 2007.
AA60—Office Action for U.S. Appl. No. 10/997,790 mailed on Jul. 18, 2007.
AA61—International Search Report and Written Opinion for PCT/US05/42185 mailed Mar. 23, 2007.
AA62—Office Action for U.S. Appl. No. 11/215,357 mailed on Jul. 16, 2007.
AA63—Office Action for U.S. Appl. No. 11/215,736 mailed on March 9, 2007.
AA64—Office Action for U.S. Appl. No. 11/215,736 mailed on August 23, 2007.

AA65—Office Action for U.S. Appl. No. 11/375,361 mailed on August 23, 2007.
AA66—Office Action for U.S. Appl. No. 10/986,720 mailed on Jul. 18, 2007.
AA67—Office Action for U.S. Appl. No. 10/987,099 mailed on Jul. 16, 2007.
AA68—Office Action for U.S. Appl. No. 10/987,994 mailed on Jun. 4, 2007.
AA69—Thompson "Big Isle builder plans banyan-like treehouse resort" Honolulu Star-Bulletin Hawaii News, Feb. 19, 2001.
Office Action for U.S. Appl. No. 11/244,866 mailed on Mar. 26, 2008, available in Pair.
Office Action for U.S. Appl. No. 11/244,869 mailed on Apr. 8, 2008, available in Pair.
Office Action for U.S. Appl. No. 11/215,747 mailed on Mar. 18, 2008, available in Pair.
Office Action for U.S. Appl. No. 11/407,886 mailed on Sep. 9, 2008, available in Pair.
Office Action for U.S. Appl. No. 11/513,338 mailed on Jun. 12, 2008, available in Pair.
Office Action for U.S. Appl. No. 11/283,503 mailed on Mar. 28, 2008, available in Pair.
Office Action for U.S. Appl. No. 11/215,795 mailed on Mar. 17, 2008, available in Pair.
Office Action for U.S. Appl. No. 11/218,330 mailed on Mar. 25, 2008, available in Pair.
Office Action for U.S. Appl. No. 11/244,866 mailed on Sep. 23, 2008, available in Pair.
Office Action for U.S. Appl. No. 11/407,862 mailed on Aug. 27, 2008, availaible in Pair.
Office Action for U.S. Appl. No. 11/407,874 mailed on Sep. 8, 2008, available in Pair.
Office Action for U.S. Appl. No. 11/283,503 mailed on Sep. 26, 2008, available in Pair.
Office Action for U.S. Appl. No. 11/407,885 mailed on Sep. 5, 2008, availaible in Pair.
Office Action for U.S. Appl. No. 11/218,330 mailed on Sep. 23, 2008, available in Pair.
AA74—Examiner's Report for Australian Patent Application No. 2004285488 mailed Sep. 19, 2008.
Office Action for U.S. Appl. No. 11/215,795 mailed on Oct. 9, 2008, available in Pair.
Office Action for U.S. Appl. No. 11/407,845 mailed on Oct. 17, 2008, availaible in Pair.
Co-Pending U.S. Appl. No. 12/338,535 entitled, "Themed Amusement River Ride System" to Henry filed Dec. 18, 2008; available in private Pair.
Office Action for U.S. Appl. No. 11/244,869 mailed on Nov. 13, 2008, available in Pair.
Office Action for U.S. Appl. No. 11/407,885 mailed on Jan. 30, 2009, availaible in Pair.
Office Action for U.S. Appl. No. 11/513,338 mailed on Dec. 10, 2008, available in Pair.
Office Action for U.S. Appl. No. 11/215,747 mailed on October 24, 2008, available in Pair.
AA77—International Search Report and Written Opinion for PCT/US06/33955 mailed Apr. 4, 2008.
Office Action for U.S. Appl. No. 11/244,866 mailed on Feb. 24, 2009, available in Pair.
Office Action for U.S. Appl. No. 11/244,866 mailed on Jun. 26, 2009, available in Pair.
Office Action for U.S. Appl. No. 11/244,869 mailed on Apr. 14, 2009, available in Pair.
Office Action for U.S. Appl. No. 11/407,862 mailed on Jun. 24, 2009, availaible in Pair.
Office Action for U.S. Appl. No. 11/407,861 mailed on Mar. 12, 2009, availaible in Pair.
Office Action for U.S. Appl. No. 11/407,874 mailed on Jul. 14, 2009, available in Pair.
Office Action for U.S. Appl. No. 11/407,886 mailed on Jul. 13, 2009, available in Pair.
Office Action for U.S. Appl. No. 11/407,845 mailed on Apr. 16, 2009, availaible in Pair.
Office Action for U.S. Appl. No. 11/215,747 mailed on May 18, 2009, available in Pair.
Office Action for U.S. Appl. No. 11/215,795 mailed on Feb. 26, 2009, available in Pair.
Office Action for U.S. Appl. No. 11/215,795 mailed on Jun. 23, 2009, available in Pair.
Office Action for U.S. Appl. No. 11/218,330 mailed on Mar. 20, 2009, available in Pair.
Office Action for U.S. Appl. No. 11/283,503 mailed on Mar. 10, 2009, available in Pair.
Office Action for U.S. Appl. No. 11/513,338 mailed on Aug. 21, 2009, available in Pair.
Office Action for U.S. Appl. No. 11/218,330 mailed on Jul. 22, 2009, available in Pair.
Office Action for U.S. Appl. No. 11/283,503 mailed on Aug. 13, 2009, available in Pair.
AA79—International Search Report and Written Opinion for PCT/US2007/063611 mailed Nov. 10, 2008.
AA80—European Office Action for EP 05019093.3 mailed Aug. 4, 2009.
Office Action for U.S. Appl. No. 11/244,866 mailed on Oct. 21, 2009, available in Pair.
Office Action for U.S. Appl. No. 11/244,869 mailed on Sep. 24, 2009, available in Pair.
Office Action for U.S. Appl. No. 11/407,862 mailed on Nov. 30, 2009, available in Pair.
Office Action for U.S. Appl. No. 11/407,861 mailed on Oct. 15, 2009, available in Pair.
Office Action for U.S. Appl. No. 11/407,874 mailed on Dec. 1, 2009, available in Pair.
Office Action for U.S. Appl. No. 11/407,886 mailed on Nov. 18, 2009, available in Pair.
Office Action for U.S. Appl. No. 11/407,845 mailed on October 16, 2009, available in Pair.
Office Action for U.S. Appl. No. 11/407,885 mailed on Dec. 2, 2009, available in Pair.
Office Action for U.S. Appl. No. 11/513,338 mailed on Dec. 10, 2009, available in Pair.
Office Action for U.S. Appl. No. 11/215,747 mailed on Oct. 23, 2009, available in Pair.
Office Action for U.S. Appl. No. 11/215,795 mailed on Nov. 18, 2009, available in Pair.
Advisory Action for U.S. Appl. No. 11/218,330 mailed on Nov. 9, 2009, available in Pair.
Office Action for U.S. Appl. No. 11/244,866 mailed on Mar. 26, 2010, available in PAIR.
Office Action for U.S. Appl. No. 11/244,869 mailed on Jan. 29, 2010, available in PAIR.
AA82 - Extended European Search Report for European Application No. 05 851 944.8 mailed on Jan. 13, 2010.
Office Action for U.S. Appl. No. 11/407,861 mailed on Mar. 17, 2010, available in PAIR.
Office Action for U.S. Appl. No. 11/407,845 mailed on Apr. 5, 2010, available in PAIR.
Office Action for U.S. Appl. No. 11/215,747 mailed on Feb. 25, 2010, available in PAIR.
Office Action for U.S. Appl. No. 11/218,330 mailed on Feb. 17, 2010, available in PAIR.

* cited by examiner

WATER AMUSEMENT SYSTEM WITH ELEVATED STRUCTURE

PRIORITY CLAIM

This patent application claims priority to U.S. Provisional Patent Application Ser. No. 60/673,326 entitled "WATER RIDE WITH SYNTHETIC TREE LODGING" filed on Apr. 20, 2005 and U.S. Provisional Patent Application Ser. No. 60/713,849 entitled "WATER RIDE WITH COMPOSITE TREE FOR ELEVATED STRUCTURE" filed Sep. 2, 2005, the disclosures of which are hereby incorporated by reference.

BACKGROUND

1. Field of the Invention

The present disclosure generally relates to water amusement attractions and rides. More particularly, the disclosure generally relates to a system and method for a water transportation system. Further, the disclosure generally relates to water-powered rides and to a system and method in which participants may be actively involved in a water attraction. Certain embodiments include one or more composite trees that may support one or more elevated structures.

2. Description of Related Art

The 1980's witnessed a phenomenal growth in participatory family water recreation facilities (e.g., water parks) and in water oriented ride attractions in traditional themed amusement parks. In the current main genre of water ride attractions (e.g., waterslides, river rapid rides, log flumes), participants walk or are mechanically lifted to a high point, where gravity enables water, rider(s), and riding vehicle (if appropriate) to slide down a chute or incline to a lower elevation splash pool, whereafter the cycle repeats. Some rides can move riders uphill and downhill but for efficiency and performance reasons these rides also generally start on an elevated tower and generally require walking up steps to reach the start of the ride.

Generally, traditional downhill water rides are of short duration (normally measured in seconds of ride time) and have limited throughput capacity. The combination of these two factors quickly leads to a situation in which patrons of the parks typically have long queue line waits of up to two or three hours for a ride that, although exciting, lasts only a few seconds. Additional problems like hot and sunny weather, wet patrons, and other difficulties may create a poor overall customer feeling of satisfaction or perceived entertainment value in the water park experience.

Additionally, typical downhill water park rides are not designed to transport guests between rides. In large amusement parks, transportation between rides or areas of the park may be provided by a train or monorail system, or guests may walk from ride to ride or area to area. These forms of transportation have relatively minor entertainment value and are passive in nature, in that they have little if any active guest-controlled functions such as choice of pathway, speed of riders, or rider activity besides sightseeing from the vehicle. These forms of transportation are generally unsuitable for water parks because of high installation and operating costs and poor ambience within the parks. These types of transportation are often unsuitable for water park guests who, because of the large amount of time spent in the water, are often wet and want to be more active because of the combination of high ambient temperatures in summertime parks and the normal heat loss due to water immersion and evaporative cooling. Water helps cool guests and encourages a higher level of physical activity. Guests also want to stay in the water for fun. Water parks are designed around the original experience of a swimming hole combined with new sports, such as river rafting or tubing. A desirable feeling for some guests is one of natural ambience and organic experience. A good river ride combines calm areas and excitement areas like rapids, whirlpools, and beaches. Mechanical transportation systems do not fit in well with these types of rides. There exists a need in water parks for a means of transportation through the park and between the rides.

For water rides that involve the use of a floatation device (e.g., an inner tube or floating board), the walk back to the start of a ride can be particularly arduous if the rider has to carry the floatation device from the exit of the ride back to the start of the ride. Floatation devices may be transported from the exit to the entrance of the ride using mechanical transportation devices, but these devices are expensive to purchase and operate. Using a mechanical transportation device for the floatation device or having the guest walk with the floatation device may reduce guest enjoyment, cause excess wear and tear on the floatation devices, contribute to guest injuries, and make it impossible for some guests to access the rides. In addition, a park that includes many different non-integrated rides may require guests to use different floatation devices for different rides, which makes it difficult for the park operators to provide the guests with a general purpose floatation device. It is advantageous to standardize riding vehicles for rides as much as possible.

Typically, water parks cover a large area. Guests may pass through an entrance and by a changing room area upon entering the park. Rides and picnic areas located in areas distant to the entrance may be underused in relation to rides and areas located near the entrance. Popular rides may be crowded, with guests waiting in queue lines for entry. This may lead to guest dissatisfaction and general reduction of optimal guest dispersal throughout the park. The lack of an efficient transportation system between rides accentuates this problem in water parks.

Water parks may close intermittently due to inclement weather. Depending on the geographic location of the water park, the water park may be open less than half of the year. Water parks may be closed due to uncomfortably low temperatures associated with winter. Water parks may be closed due to inclement weather such as rain, thunderstorms, and/or any other type of weather conditions that might limit participant enjoyment and/or participant safety. Reducing the number of days the water park is open may lower the profitability of the water park.

Water parks may encounter problems including issues with transporting people and potential participants to and from locally available temporary accommodations. Groups of people (e.g., families) may travel great distances to water parks to make a family trip or a vacation out of the experience. People may then rent temporary lodgings close to the water park. Some water parks may provide temporary accommodations for guests. This not only solves the problem of transporting guests from local accommodations, but also provides further revenue to the water park.

Providing temporary accommodations to guests, however leads to additional problems. When a water park provides guest accommodations, greater amounts of land may be required to build the water park, thereby increasing costs of the water park. Increasing land requirements for water parks typically increases the distances of water parks from major metropolitan areas. Increasing distances from major metropolitan areas potentially increases time and/or money required of potential guests, consequently reducing potential numbers of guests as well as revenues.

It is therefore desirable that new methods and systems be developed for providing lodgings easily accessible by water park guests. It is further desired that the methods and systems provide lodgings and/or facilities for water park guests that will not significantly increase the footprint of the water park.

SUMMARY

In an embodiment, a composite tree includes a base having an artificial trunk portion. Living plants may be coupled to the base. At least one of the living plants forms a branch of the composite tree. In certain embodiments, the living plants are living trees. In certain embodiments, the living plants may have a theme (e.g., a seasonal or holiday theme). In some embodiments, a composite tree may be adjacent to or coupled with a water amusement ride.

In an embodiment, a base of a composite tree includes openings. A first portion of a living plant may be positioned in one of the openings. A second portion of the living plant may extend from the opening. The base may form a trunk of the composite tree. The second portion of the living plant may form a branch of the composite tree. In some embodiments, the first portion of the living plant includes the roots of the living plant. In some embodiments, the second portion of the livingh plant includes the trunk of a living tree. In some embodiments, the second portion of the living plant includes a branch of a living tree.

In some embodiments, a base of a composite tree includes a receptacle. Growth media (e.g., soil) may be provided in the receptacle. A portion of a living plant may be disposed in the growth media. In certain embodiments, a composite tree includes an irrigation system. The irrigation system may provide water to living plants on the tree. In certain embodiments, a system in the base may deliver nutrients to one or more of the living plants. In one embodiment, a composite tree includes a sensor positioned in a receptacle. The sensor may detect an environmental condition in the receptacle.

In some embodiments, a farm for growing and harvesting living plants may include living plants mounted on bases, in effect forming a tree farm across a section of land. Bases and living trees may form composite trees. Other living trees may be planted directly in the soil of a section of land.

In some embodiments, a lift apparatus may be used to move or manage elements of a tree system. A lift apparatus may position, transport, or otherwise move or manipulate a plant, tree, structure, or base. In one embodiment, a lift apparatus may lift and install a plant in an opening in a base. In another embodiment, a lift apparatus may remove a plant from an opening in a base. In certain embodiments, a lift apparatus may mount a structure in a tree.

In some embodiments, a tree system or structure includes a covering apparatus. A covering apparatus includes any apparatus that applies a material to surfaces of an object (e.g., to a branch of a tree or the roof of a structure). For example, a snow making machine may cover the branches of a tree with snow. Materials may be in various forms when dispensed from a covering apparatus, including, but not limited to, liquid, solid, gaseous, vapor, or a combination thereof. In one embodiment, water vapor is deposited on cold objects (e.g., tree branches that have been in a freezing environment) to form frost on the objects.

In some embodiments, a composite tree may include a system for controlling a temperature of living plants on the tree. In one embodiment, a composite tree may include a heater. The heater may provide heat to the living plants.

In an embodiment, a composite tree includes a base. The base includes an interior member and an exterior layer. The interior member may support an upper portion of the composite tree. The exterior layer may include an artificial tree trunk. In one embodiment, an artificial trunk portion includes synthetic bark. In certain embodiments, a base layer may include an insulating layer.

In an embodiment, a base of a composite tree is partially hollow. In one embodiment, a base includes a tubular member. At least one opening may be positioned about a circumference of the tubular member. The composite tree may include one or more extensions extending from a side of the base. The extension may include an opening to receive a living plant.

In one embodiment, a living plant may extend upwardly from a tubular member. In some embodiments, a composite tree may include a living tree extending above a top of a base and at least one living plant extending from an opening in a side of the base. In certain embodiments, the base of a composite tree includes a planter on an upper portion of the base. Ivy or similar vegetation may be planted in the planter.

In an embodiment, a composite tree may have an opening that accepts a container. A living plant may be potted in the container. The container with the living plant may be placed in the opening. The opening may include a stop to limit a depth and/or size of the living plant accepted by the base. In certain embodiments, a receptacle for a living plant may include apertures for allowing root growth through the receptacle.

In an embodiment, a method of constructing a composite tree includes providing a base having openings and an artificial trunk portion, and positioning one or more living plants in openings in the base. The living plants may form branches of the composite tree. In one embodiment, a portion of the tree is positioned over a water amusement ride.

In an embodiment, a tree system includes a base having a trunk portion. Two or more sets of branch portions may removably coupled to or positioned in the base. Each set of branch portions may have a different theme. In one embodiment, each set of branches has a different holiday theme. In another embodiment, each set of branches has a different seasonal theme. In still another embodiment, each set of branches has a different locale theme. In certain embodiments, the tree system may be adjacent to a water amusement ride.

In some embodiments, sets of branches for a tree system may be living plants. In other embodiments, sets of branches for a tree system may be artificial plants. In some embodiments, a combination of artificial and living plants may be used to simulate branches and/or foliage of a tree system. In certain embodiments, a trunk portion of a tree system may include a synthetic material.

In some embodiments, a tree system may include a structure coupled to a base. The structure may be configured to hold at least one participant. The structure may be designed or decorated to reflect a theme. The theme of a structure or decorations may match the theme of the branches. In one embodiment, the structure may be a lodging unit.

In an embodiment, a water amusement system includes a water amusement ride and a tree adjacent to the water ride. The tree may include a base. The tree may further include sets of branch portions that couple to or position in the base. Each set of branch portions may have a different theme (e.g., each set of branch portions may relate to a particular holiday or season). In some embodiments, trees in one thematic area of a water amusement park may have branch portions having one theme, and trees in another thematic area of the water amusement park may have another theme.

In an embodiment, a method of providing thematic settings includes providing a tree having a base. The base may form a trunk of the tree. A first set of branch portions having a first theme may be coupled to or positioned in the base. Persons (e.g., participants of a water amusement park) may be allowed to view the tree while the first set of branch portions may be coupled to or positioned in the base. The first set of branch portions may be removed from the base. A second set of branch portions may be coupled to or positioned in the base. The second set of branch portions having a second theme that is different from the first theme may be coupled to or positioned in the base. Persons may be allowed to view the tree while the second set of branch portions is coupled to or positioned in the base. In some embodiments, the branch portions are living plants. In certain embodiments, the living plants may be potted in containers and inserted into receptacles in the base.

In an embodiment, a system includes a base coupled to a surface. The base may have one or more openings. Plants may be coupled to or positioned in the base and extend through the openings. A structure may be coupled to the base. The structure may contain a person above the surface. In some embodiments, the structure is coupled to the base such that a bottom of the structure is above the surface. In one embodiment, the structure comprises a lodging unit. In certain embodiments, the system includes a water amusement ride adjacent to the base.

In some embodiments, a system includes two or more elevated structures. The structures may be coupled via a walkway. In another embodiment, structures may be coupled via a bridge.

In an embodiment a base for one or more elevated structures includes a plurality of columns spaced apart from one another. Each of the columns bears a portion of the weight of at least one of the structures. In some embodiments, the columns may be shoots of an artificial tree (e.g., the columns formed to resemble portions of a banyan tree).

In an embodiment, a system includes composite trees. Each composite tree includes a base and one or more living plants coupled to or positioned in the base. Structures are coupled to the base of at least one of the composite trees such that a bottom of at least one of the structures is elevated above the surface. The structures may contain at least one person above the surface. The system may allow human access from the surface to an interior of the structure. In certain embodiments, the structures may be lodging units.

In an embodiment, a system including composite trees having elevated structures includes openings. The openings may accept a portion of a living plant. In certain embodiments, a structure in a composite tree may have a theme (e.g., a holiday theme, a seasonal theme). In one embodiment, a structure in a composite tree may include an animal habitat. In one embodiment, a system includes a solar panel coupled to one of the structures.

In an embodiment, a method of constructing an elevated structure with living plants includes coupling a base having openings to a surface, coupling a structure to the base such that a bottom of the structure is elevated above the surface, and positioning living plants in the openings in the base.

In an embodiment, a water amusement system includes a base coupled to a surface and a structure coupled to the base. The structure may hold a participant of the water amusement system. In certain embodiments, the structure may accommodate overnights guests of the water amusement system. A bottom of the structure may be elevated above the surface. In some embodiments, the bottom of the structure is elevated such that participants of the water amusement system can walk on a surface directly below at least a portion of the structure. The bottom of at least one of the structures is configured such that a participant positioned on the ground is inhibited from viewing the interior of the structure. A water amusement ride may be coupled to or positioned adjacent the base. The water amusement ride may include an access point. The access point may allow participants to access the water amusement ride from the structure. In some embodiments, the system includes a platform adjacent to the access point. In certain embodiments, the system includes stairs leading from the access point to the structure. In one embodiment, the water amusement ride includes a zero-edge entry point. The zero-edge entry may include a gradual slope from a higher elevation to a lower elevation.

In some embodiments, a portion of an elevated structure may extend over a water amusement ride. In some embodiments, a portion of a base may extend over a water amusement ride. In one embodiment, a portion of an elevated structure or a base may shade a portion of the water amusement ride from overhead sunlight.

In some embodiments, an access point for a water amusement ride may couple the water amusement ride to the base such that a participant can move from a structure to the water amusement ride. In an embodiment, the access point includes an opening adjacent to the surface. The opening may provide access through the base to the structure. In one embodiment, the access point allows substantially vertical access to the surface.

In an embodiment, a composite tree includes a base that supports an elevated structure. The base may include receptacles that hold one or more plants. In some embodiments, the plants may be living plants. The base may comprise a trunk of the composite tree. The plants may form branches of the composite tree. In some embodiments, at least one of the branches may extend over the water amusement ride.

In an embodiment, a water amusement system includes an interactive control system coupled to an elevated structure. The interactive control system may be operable by a participant in or on the structure to interact with a participant on the water amusement ride.

In an embodiment, a water amusement system includes trees and a body of water adjacent to the trees. The body of water may include a water amusement ride. A structure may be coupled to at least one of the trees. In one embodiment, the tree is an artificial tree. In another embodiment, the tree is a composite tree having artificial and living portions. The structure in the tree may hold a participant of the water amusement system. The bottom of the structure may be elevated above the surface of the body of water. A portion of one of the trees or the structure may extend over the body of water. In some embodiments, a bottom of the structure is elevated above the surface such that participants of the water amusement system can walk on a surface directly below at least a portion of the structure. The structure or the tree may shade a portion of the body of water from overhead sunlight.

In some embodiments, the body of water includes an access point adjacent to one of the trees. The access point may couple the body of water to the tree such that a participant can move from the structure to the body of water. In one embodiment, the access point allows a participant to float from a position under a portion of the tree or a portion of the structure to the water amusement ride. In certain embodiments, a water amusement system includes an opening adjacent to a surface. The opening provides access through a base of a tree to the structure. In one embodiment, the system includes an elevation system. The elevation system may convey a participant between a location proximate to the surface and the structure.

In some embodiments, a structure is coupled to at least two trees. The trees may be coupled to one another to increase structural stability. In some embodiments, the trees may be coupled such that participants can move between the coupled trees.

In an embodiment, structures in trees adjacent to a body of water may be lodging units. In one embodiment, the structures comprise a hotel. In certain embodiments, a water amusement system includes an enclosure. The trees and the water amusement ride may be positioned in the enclosure.

In an embodiment, a system includes a plurality of bases. Each of the bases may be coupled to a surface. A body of water couples the bases to one another. A structure is coupled to each of the bases. The structures hold a participant of a water amusement system above a surface. In one embodiment, the body of water includes a water channel that couples the bases to one another. In some embodiments, the bottoms of the structures are elevated above the surface such that participants of the water amusement system can walk on a surface directly below at least a portion of the structure.

In some embodiments, the bases may form the trunks of composite trees. The system may further include living plants coupled to the bases. The living plants may form branches of the composite trees.

In some embodiments, the bottoms of the structures are such that a person positioned on a surface below the structure is inhibited from viewing the interior of the structure. In some embodiments, the structure may accommodate overnight guests.

In certain embodiments, a system allows a participant to move from one elevated structure to another elevated structure without using a body of water. In one embodiment, the system includes a walkway that allows a participant to move from one structure to another structure. In another embodiment, a system includes a powered assist system configured to transport a participant at least part of the way from a first structure to the second structure. In one embodiment, a self-powered system transports a participant at least part of the way from the first structure to the second structure.

In an embodiment, a system includes two or more elevated lodging units and a body of water. The elevated lodging units may be above ground level. The body of water may couple the elevated lodging units such that participants may move between composite trees using the body of water. In one embodiment, the elevated lodging units are part of a hotel. In certain embodiments, the elevated lodging units may be held in composite trees. Each of the composite trees may comprise a base and living plants coupled to or positioned in the base.

In an embodiment, a method of lodging participants of a water amusement system includes coupling a water amusement ride to one or more trees and positioning one or more lodging units in at least one of the trees. The trees may be composite trees that include a base and living plants coupled to or positioned in the base. In some embodiments, the method may include coupling or positioning sets of branch portions having a first theme to the bases, allowing participants to use the water amusement system while the first sets of branch portions are coupled to or positioned in the bases, removing the first sets of branch portions from the bases, coupling or positioning second sets of branch portions having a second theme to the bases, and allowing participants to use the water amusement system while the second sets of branch portions are coupled to or positioned in the bases.

Other components which may be incorporated into the system are disclosed in the following U.S. patents, incorporated herein by reference: an appliance for practicing aquatic sports as disclosed in U.S. Pat. No. 4,564,190; a tunnel-wave generator as disclosed in U.S. Pat. No. 4,792,260; a low rise water ride as disclosed in U.S. Pat. No. 4,805,896; a water sports apparatus as disclosed in U.S. Pat. No. 4,905,987; a surfing-wave generator as disclosed in U.S. Pat. No. 4,954,014; a waterslide with uphill run and floatation device as disclosed in U.S. Pat. No. 5,011,134; a couplable floatation apparatus forming lines and arrays as disclosed in U.S. Pat. No. 5,020,465; a surfing-wave generator as disclosed in U.S. Pat. No. 5,171,101; a method and apparatus for improved water rides by water injection and flume design as disclosed in U.S. Pat. No. 5,213,547; an endoskeletal or exoskeletal participatory water play structure where participants can manipulate valves to cause controllable changes in water effects that issue from various water forming devices as disclosed in U.S. Pat. No. 5,194,048; a waterslide with uphill run and floatation device as disclosed in U.S. Pat. No. 5,230,662; a method and apparatus for improving sheet flow water rides as disclosed in U.S. Pat. No. 5,236,280; a method and apparatus for a sheet flow water ride in a single container as disclosed in U.S. Pat. No. 5,271,692; a method and apparatus for improving sheet flow water rides as disclosed in U.S. Pat. No. 5,393,170; a method and apparatus for containerless sheet flow water rides as disclosed in U.S. Pat. No. 5,401,117; an action river water attraction as disclosed in U.S. Pat. No. 5,421,782; a controllable waterslide weir as disclosed in U.S. Pat. No. 5,453,054; a non-slip, non-abrasive, coated surface as disclosed in U.S. Pat. No. 5,494,729; a method and apparatus for injected water corridor attractions as disclosed in U.S. Pat. No. 5,503,597; a method and apparatus for improving sheet flow water rides as disclosed in U.S. Pat. No. 5,564,859; a method and apparatus for containerless sheet flow water rides as disclosed in U.S. Pat. No. 5,628,584; a boat activated wave generator as disclosed in U.S. Pat. No. 5,664,910; a jet river rapids water attraction as disclosed in U.S. Pat. No. 5,667,445; a method and apparatus for a sheet flow water ride in a single container as disclosed in U.S. Pat. No. 5,738,590; a wave river water attraction as disclosed in U.S. Pat. No. 5,766,082; a water amusement ride as disclosed in U.S. Pat. No. 5,433,671; and a waterslide with uphill runs and progressive gravity feed as disclosed in U.S. Pat. No. 5,779,553. The system is not, however, limited to only these components.

All of the above devices may be equipped with controller mechanisms that may be operated remotely and/or automatically. For large water transportation systems (e.g., measuring miles in length), a programmable logic control system may be used to allow park owners to operate the system effectively and cope with changing conditions in the system. During normal operating conditions, the control system may coordinate various elements of the system to control water flow. A pump shutdown may have ramifications both for water handling and guest handling throughout the system and may require automated control systems to manage efficiently. The control system may have remote sensors to report problems and diagnostic programs designed to identify problems and signal various pumps, gates, or other devices to deal with the problem as needed.

BRIEF DESCRIPTION OF THE DRAWINGS

Advantages of the present invention will become apparent to those skilled in the art with the benefit of the following detailed description of embodiments and upon reference to the accompanying drawings described herein below.

FIG. 11 depicts an embodiment of a composite tree including an opening for a water ride to pass through.

Figure 1:
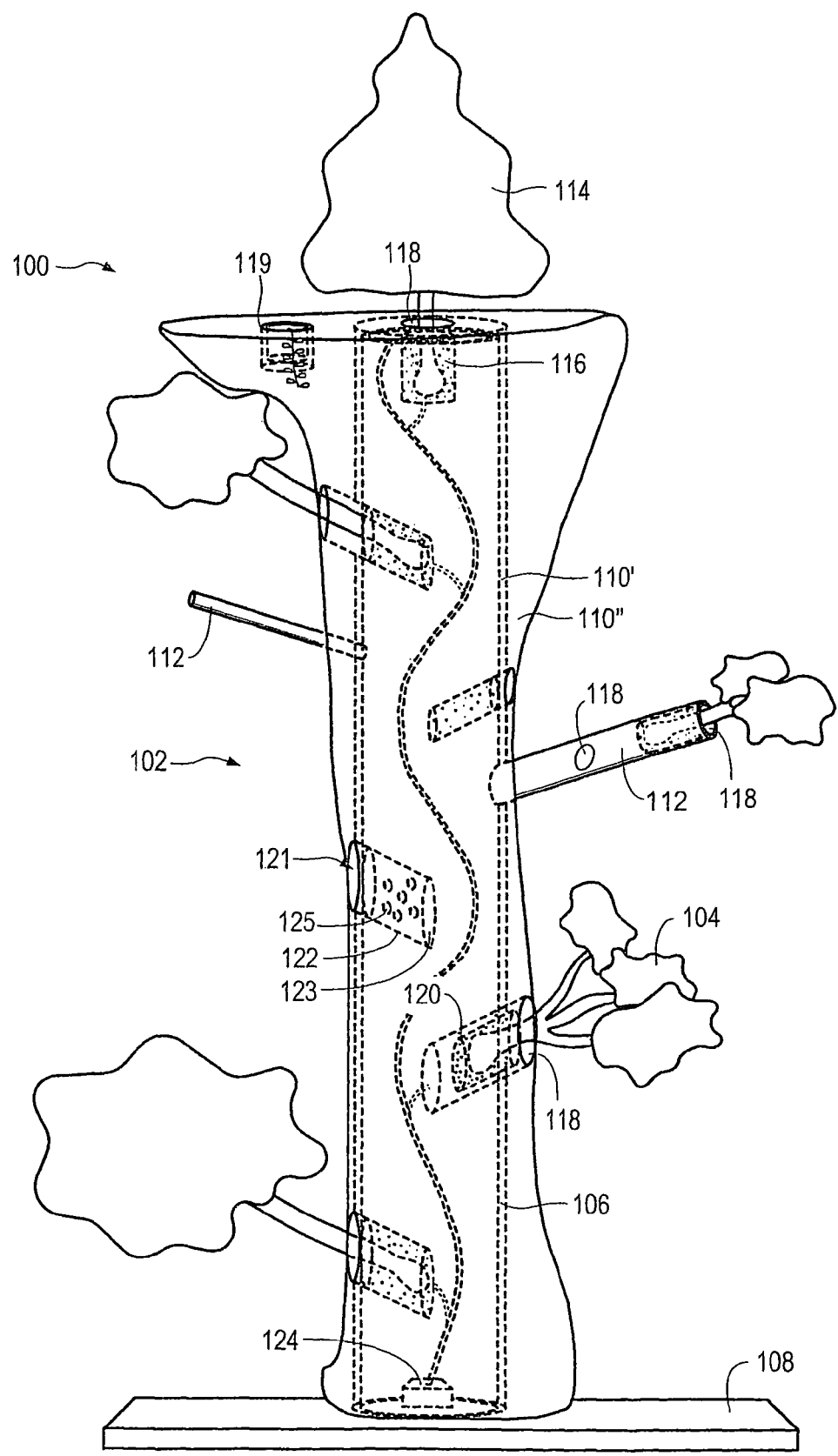
FIG. 1 depicts a schematic representation of an embodiment of a composite tree.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION

It is to be understood the present invention is not limited to particular devices or systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DEFINITIONS

Unless defined otherwise, all technical and scientific terms used herein have the same meaning as commonly understood by one of ordinary skill in the art.

The terms "base" or "base element" as used herein generally refers to any element that provides a base for one or more other elements.

The term "branch" or "branch portion" as used herein generally refers to any extensions from a base, a main stem of a tree, or a limb of a tree (e.g., a composite tree).

The term "chamber" as used herein generally refers to an at least partially enclosed space.

The term "composite tree" as used herein generally refers to a tree that includes both natural and synthetic portions.

The term "connected" as used herein generally refers to pieces which may be, or are, joined or linked together.

The term "coupled" as used herein generally refers to pieces which may be used operatively with each other, or joined or linked together, with or without one or more intervening members.

The term "cover" as used herein generally refers to covering all or at least a portion of an object with a material.

The term "farm" as used herein generally refers to a section of land on which living plants are grown.

The term "holder" as used herein generally refers to any element that holds an object.

The term "lift" as used herein generally refers to lifting an object straight up or at any angle from vertical.

The term "lift mechanism" as used herein generally refers to any device that is operable to lift, position, or manipulate an object, such as a tree or a plant.

The term "structure" as used herein generally refers to an architectural structure including, but not limited to, a roofed and/or walled building.

The term "trunk" or "trunk portion" as used herein generally refers to any of one or more main stems or limbs of a tree.

The term "zero-edge entry point" or "zero-edge access point" as used herein generally refers to an entry into a water ride or body of water that includes few edges, no edges, and/or no sudden drop offs at the entry point.

Some embodiments disclosed herein include trees. A tree may be natural, synthetic, or a combination of both. In some embodiments, a tree is a composite tree. As used herein, a "composite tree" generally includes a base and vegetation coupled to or positioned in the base. A composite tree may be designed to resemble a tree in appearance. In some embodiments, a composite tree may provide support to an elevated structure. In certain embodiments, a composite tree includes more than one base. Vegetation may include, but is not limited to, one or more living and/or artificial plants. Plants may include, but are not limited to, living and/or artificial trees, shrubs, herbs, flowers, vines, or a combination thereof. In some embodiments, a composite tree is a synthetic tree with no living components.

A base may have various shapes and sizes. In an embodiment, a base may include a tubular member in a range of shapes and/or sizes. A tubular member may be covered with one or more layers as desired to achieve various functional and/or visual effects. The base may be coupled to a surface. In some embodiments, a base includes one or more extensions (e.g., artificial branches of various shapes and/or sizes) connected to the base. In certain embodiments, a base may be coupled to vegetation to form a composite tree.

Materials of a base may include, but are not limited to, one or more metals or metal alloys, cement based materials, ceramics, and/or polymeric materials (e.g., resin). A base may include one or more hollow portions and/or one or more solid portions. For example, at least a portion of a base (e.g., a trunk) may be hollow, and at least a portion of an extension (e.g., a branch) may be solid. A hollow portion of a base may include one or more fillers (e.g., dirt, insulation, cement based material, portions of one or more real or artificial plants). In certain embodiments, a composite tree may play a role in an ecosystem by providing a habitat for living creatures such as birds and squirrels.

FIG. 1 depicts a schematic representation of an embodiment of a composite tree. Composite tree 100 includes base 102 and vegetation 104. Vegetation 104 may be living or artificial. Base 102 may include tubular member 106. In some embodiments, tubular member 106 is a steel pipe. Tubular member 106 may have a diameter of up to 18 inches, up to 36 inches, or more. Tubular member 106 may be shaped or contoured in any desired manner. In some embodiments, base 102 may be secured (e.g., bolted, cemented) to the ground. In certain embodiments, base 102 may be connected (e.g., bolted, welded, cemented) to surface 108. Surface 108 may be, but is not limited to, a concrete or asphalt slab, a metal platform, a deck (e.g., of metal, wood, or synthetic planks), or a combination thereof. In some embodiments, base 102 is connected to surface 108, and the surface is secured to the ground. In certain embodiments, surface 108 may be the ground. In certain embodiments, base 102 is connected substantially perpendicularly to the ground or to surface 108. In other embodiments, base 102 may be connected to the ground or to surface 108 in a range of angles between, for example, 45° and 90°.

In some embodiments, a composite tree includes a trunk and branch portions. In certain embodiments, the trunk and branch portions may each be formed by a discrete element. For example, two or more living shrubs may be coupled to or positioned in or adjacent a base. The base may form the trunk of the composite tree. Each of the shrubs may form a branch of the composite tree. As used herein, a "trunk" or "trunk portion" includes any of one or more main stems or limbs of a tree. As used herein, a "branch" or "branch portion" includes any extensions from a main stem or limb of a tree. Branches and branch portions may project vertically, horizontally, or at various upward or downward angles. In some embodiments, a branch, a trunk, or portion thereof may be a single, undivided member over its entire length. In other embodiments, a branch or trunk may divide into two or more members over its length. Trunks, branches, and portions thereof may be straight, curved, or a combination thereof.

In some embodiments, one or more layers 110 may at least partially surround a portion of tubular member 106. In certain embodiments, layers 110 may include first layer 110' and second layer 110". First layer 110' may be an insulating layer. An insulating layer may advantageously protect vegetation 104 growing from tubular member 106 from overheating and/or drying out. Second layer 110" may be a layer designed to impart the look of a tree trunk to tubular member 106. For example, second layer 110" may include a urethane coating over carved foam and/or cement that is molded and/or colored to mimic the appearance of a natural tree trunk. In some embodiments, second layer 110" may be formed to resemble a tree trunk with bark. In certain embodiments, a layer at least partially surrounding a portion of tubular member 106 may include mesh material (e.g., fabric or wire). The mesh material may provide a surface for vegetation 104 to attach to or to grow from on an outer portion of composite tree 100. In certain embodiments, a trunk or trunk portion of a composite tree may have a uniform cross section (e.g., a vertical cylinder). In one embodiment, the trunk or trunk portion of a composite tree has a smooth exterior surface.

In some embodiments, composite tree 100 may include one or more extensions 112 (e.g., branches or limbs) connected to tubular member 106 for decorative and/or structural purposes. Extensions 112 may be made of, for example, steel tubing in a range of lengths and diameters. In some embodiments, accessories including, but not limited to, birdhouses, swings, hanging baskets, chairs, and hammocks, may be coupled to composite tree 100 (e.g., to vegetation 104 and/or through extensions 112). In certain embodiments, one or more extensions 112 may couple or connect composite tree 100 to another composite tree (e.g., to base 102 of another composite tree).

In some embodiments, a portion of base 102 may be at least partially filled with growth media or structural material to support living and/or artificial vegetation. Growth media may include, but is not limited to, dirt, soil, peat moss, sand, hydroponic media, and/or a combination thereof. Vegetation 104 may be placed (e.g., secured or planted) in base 102. For example, roots of one or more living trees 114 may be placed in growth media 116 (e.g., dirt) through opening 118 in base 102, such that a top portion of at least one of the trees extends from the base. In some embodiments, base 102 may be substantially filled with growth media 116.

In certain embodiments, at least a portion of vegetation 104 (e.g., living and/or artificial trees shrubs, vines, flowers, fruit trees, vegetable plants, bamboo, tropical vegetation) may extend from openings 118 in tubular member 106 or in extensions 112. Openings 118 may be of any size and/or shape. Openings 118 may be positioned as desired in tubular member 106 and/or extensions 112 to allow growth of living plants through the openings as desired. Openings 118, along with vegetation 104 extending from the openings, may be positioned to provide an inviting appearance to composite tree 100, to create a mood, to extend a theme, and/or to blend in with natural or man-made surroundings.

In certain embodiments, vegetation 104 may be potted in container 120. The container may be coupled to or positioned in opening 118 such that the container is substantially inside base 102 and/or a portion of the container extends from the opening. In some embodiments, planter 119 may be provided in an upper portion of base 102. Planter 119 may include ivy or other vegetation that grows around a portion of the base or around other plants.

Holder 122 may be coupled or connected to base 102. Holder 122 may define receptacle 121 for receiving vegetation 104 in base 102. In some embodiments, holder 122 may include end wall 123. A depth of a receptacle may be defined by end wall 123 of holder 122. Holder 122 may have various forms, for example, cylindrical, rectangular, or conical. In some embodiments, holder 122 is filled with growth media 116 and vegetation 104 is planted directly in the holder. In certain embodiments, vegetation 104 including living trees 114 may be potted in containers 120, and the containers may be coupled to or positioned in openings 118 within holder 122. Thus, vegetation 104 and/or living trees 114 may be easily removed, exchanged, or replaced. In one embodiment, end wall 123 may form a stop for vegetation 104 or a container inserted into receptacle 121. A stop may limit the depth of acceptance of vegetation 104 into base 102. In another embodiment, a stop is a lip or tab on an inner side of holder 122. In still another embodiment, a stop is included on an exterior surface of base 102. Holder 122 may include apertures 125. Apertures 125 may allow roots of a living plants to grow beyond the boundaries of holder 122. In certain embodiments, a receptacle may pass through into an interior portion of a base (e.g., a holder may not have an end wall).

In some embodiments, composite tree 100 may include system 124 designed to create and/or maintain proper growth conditions in growth media 116. For example, system 124 may include, but is not limited to, a sensor to detect water content (e.g., humidity) in growth media 116, a heater to raise a temperature of the growth media, a cooling unit to lower a temperature of the growth media, and/or an irrigation system to deliver moisture and/or treatments (e.g., fertilizer) to the growth media. System 124 may include a computer designed to control irrigation, heating, and/or cooling of vegetation 104 in growth media 116 as needed.

In some embodiments, vegetation (e.g., living trees 114) may be selected to reflect a theme (e.g., a holiday or a seasonal theme). For example, living trees 114 may include evergreen trees in December; deciduous trees in the fall; trees with red, white, and blue foliage and/or flowers for Independence Day, trees with orange leaves in October, cherry trees in the spring, trees with red foliage or flowers near Valentine's Day, etc. In some embodiments, living trees 114 may be chosen as part of a theme and decorated to create a desired visual effect. In certain embodiments, living trees 114 may be replaced as needed and/or interchanged with other living trees throughout the year.

Figure 2:
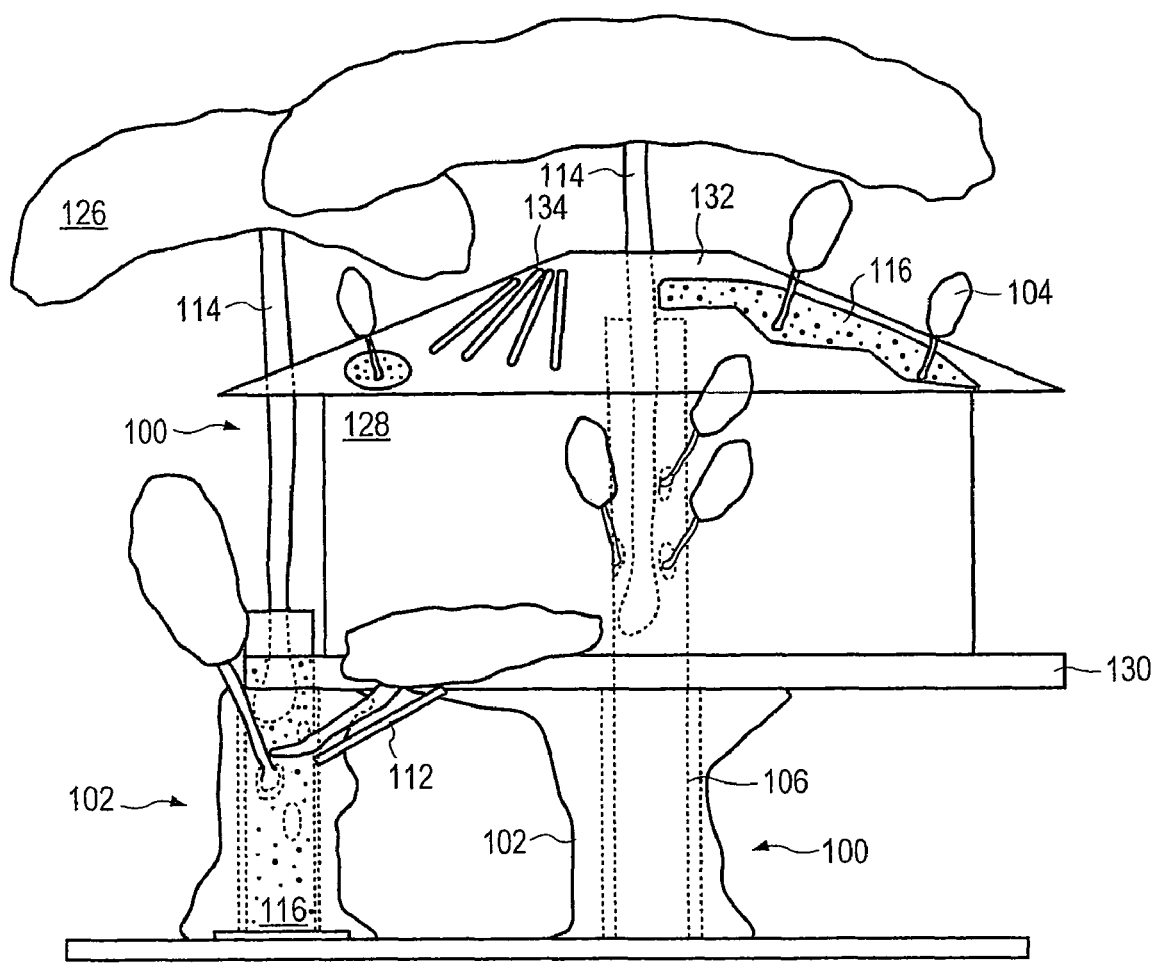
FIG. 2 depicts a schematic representation of an embodiment of a composite tree with an elevated structure.

In some embodiments, composite trees 100 may be grouped in clusters of two or more. As shown in FIG. 2, leaves of one or more trees 114 extending from base 102 may provide canopy 126. Canopy 126 may provide shade to surfaces, people, rides, attractions, etc. located proximate the canopy. In some embodiments, one or more trees 114 may be deciduous, such that leaves of the one or more deciduous trees bud, grow, change colors, and fall with the seasons. In certain embodiments, one or more trees 114 may be artificial, with artificial leaves that resemble real leaves in color, shape, other properties, and/or combinations thereof. Colored leaves on living and/or artificial trees may be ornamental, thereby enhancing a mood or theme of the water amusement park.

In some embodiments, accessories including, but not limited to, birdhouses, squirrel houses, nests, speakers for a music or announcement system, and video cameras may be positioned in canopy 126. Such accessories may be coupled to a portion of composite tree 100. In certain embodiments, accessories including, but not limited to, a hammock, a swing, a rope, a dumbwaiter, or a deck may be coupled to a portion of composite tree 100 such that at least a portion of the accessory is substantially concealed or shaded by canopy 126.

In some embodiments, one or more structures may be coupled to a base of one or more composite trees. One or more structures may be coupled to the base of one or more composite trees such that a bottom of at least one of the structures is elevated at least 1 meter, at least 2 meters, or more above a surface to which at least one of the composite trees is coupled. In some embodiments, a bottom of a structure may be far enough above a surface that participants of a water amusement system can walk or ride directly below the structure. In some embodiments, a structure is a platform without walls or a roof. A structure may be a human residence (e.g., permanent or temporary dwelling or lodging unit) including, but not limited to, a hotel room, an apartment, a condominium, or a house available for rent, purchase, or lease. In some embodiments, a structure may include a storage unit, restroom facilities, a retail store, a bar, a foodservice facility (e.g., a restaurant), a deck, an arcade, a game room, an entertainment area, a child's playhouse or treehouse, or a combination thereof.

As depicted in FIG. 2, structure 128 may be coupled or connected to one or more composite trees 100 (e.g., secured to one or more bases 102). In some embodiments, structure 128 may be coupled or connected to platform 130. Platform 130 may be coupled or connected to base 102 of one or more composite trees 100. Exterior walls of structure 128 may be positioned proximate an outer surface of one or more bases 102. In some embodiments, one or more bases 102 may extend through one or more openings in platform 130 and/or structure 128. In certain embodiments, an opening in platform 130 may allow direct or indirect access to structure 128.

Structure 128 may be assembled off-site or proximate composite tree 100 to which the structure is to be coupled. Structure 128 may be assembled on platform 130. In some embodiments, structure 128 is connected to platform 130. Equipment known in the art (e.g., a jack-up rig) is used to elevate and position platform 130 (and thus structure 128) with respect to one or more bases 102 such that the platform and the structure are supported by at least one of the bases. After structure 128 and/or platform 130 is secured (e.g., bolted) to base 102, vegetation 104 may be provided to the base, structure, and/or platform as desired.

In some embodiments, structure 128 may include roof 132. In some embodiments, roof 132 may include solar panels 134 (e.g., vacuum tube solar heaters). Energy from solar panels 134 may be used to provide electricity for use in structure 128. In certain embodiments, roof 132 may include skylights. As depicted in FIG. 2, roof 132 may be designed to accept vegetation 104. For example, roof 132 may include recesses designed to accept containers for potted plants. In some embodiments, roof 132 may include one or more recesses (e.g., trenches) designed to accept growth media 116 (e.g., soil). Vegetation 104 may be planted in growth media 116 and/or secured to roof 132 to provide shading and/or to alter (e.g., enhance) an appearance of roof 132. Vegetation 104 planted in growth media 116 on roof 132 may be chosen to coordinate with a theme of composite tree 100 and structure 128. For example a tropical theme may incorporate thatched roofing materials or substances which mimic thatched roofing materials. Any of the known construction methods may be used to build structures 128. Modular, prefabricated units may be used for the structures.

Figure 3:
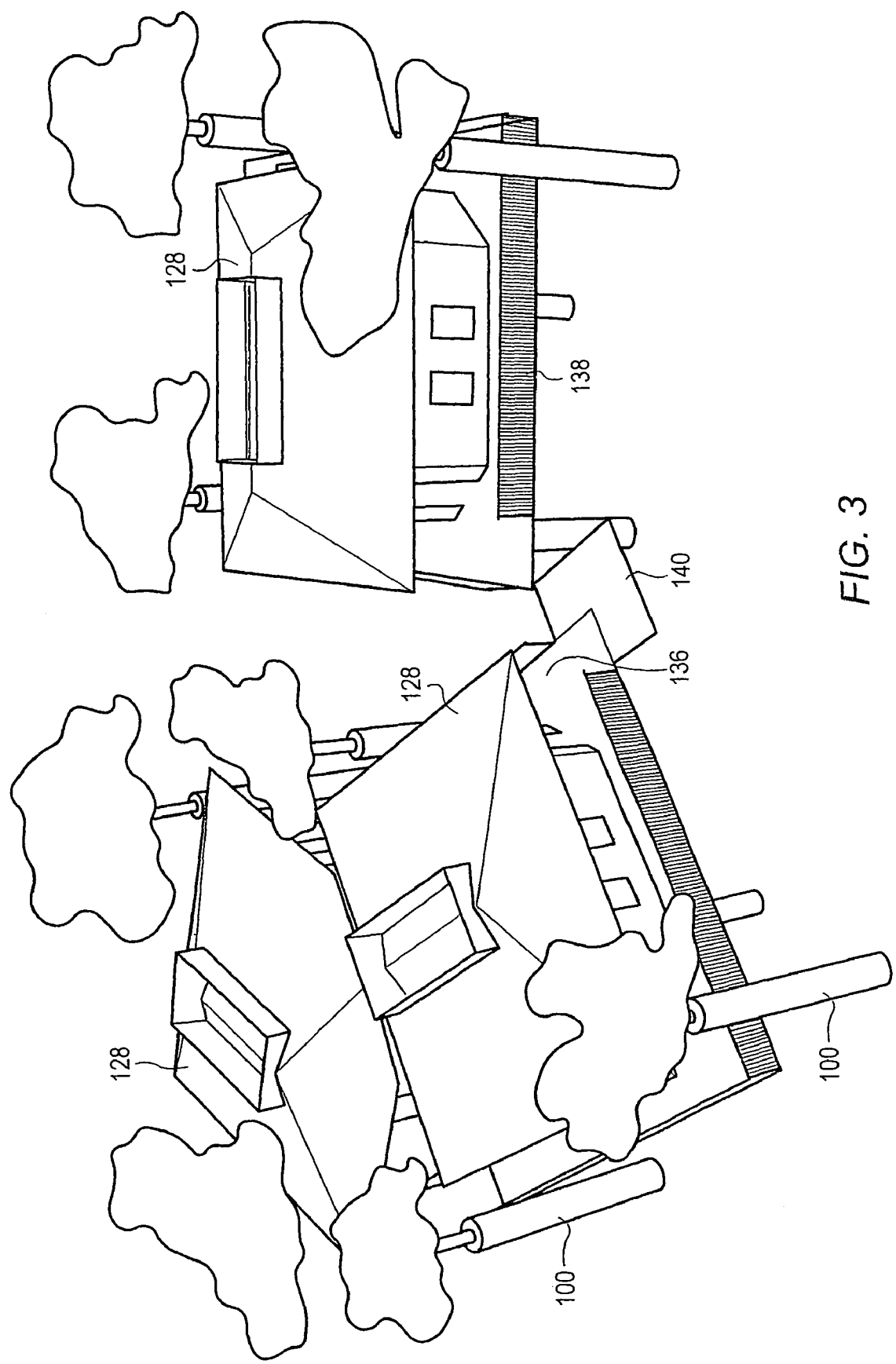
FIG. 3 depicts a perspective view of a representation of a model of an embodiment of a grouping of coupled elevated structures in composite trees.

FIG. 3 depicts a perspective view of a schematic representation of an embodiment of a grouping of structures 128 coupled to composite trees 100. Composite trees 100 and/or structures 128 may be clustered in groups of two, three, or more. In some embodiments, structures 128 may be grouped to resemble villages. In certain embodiments, structures 128 may include walkways 136 and/or railings 138. Common areas 140 may couple one or more structures 128.

Figure 4:
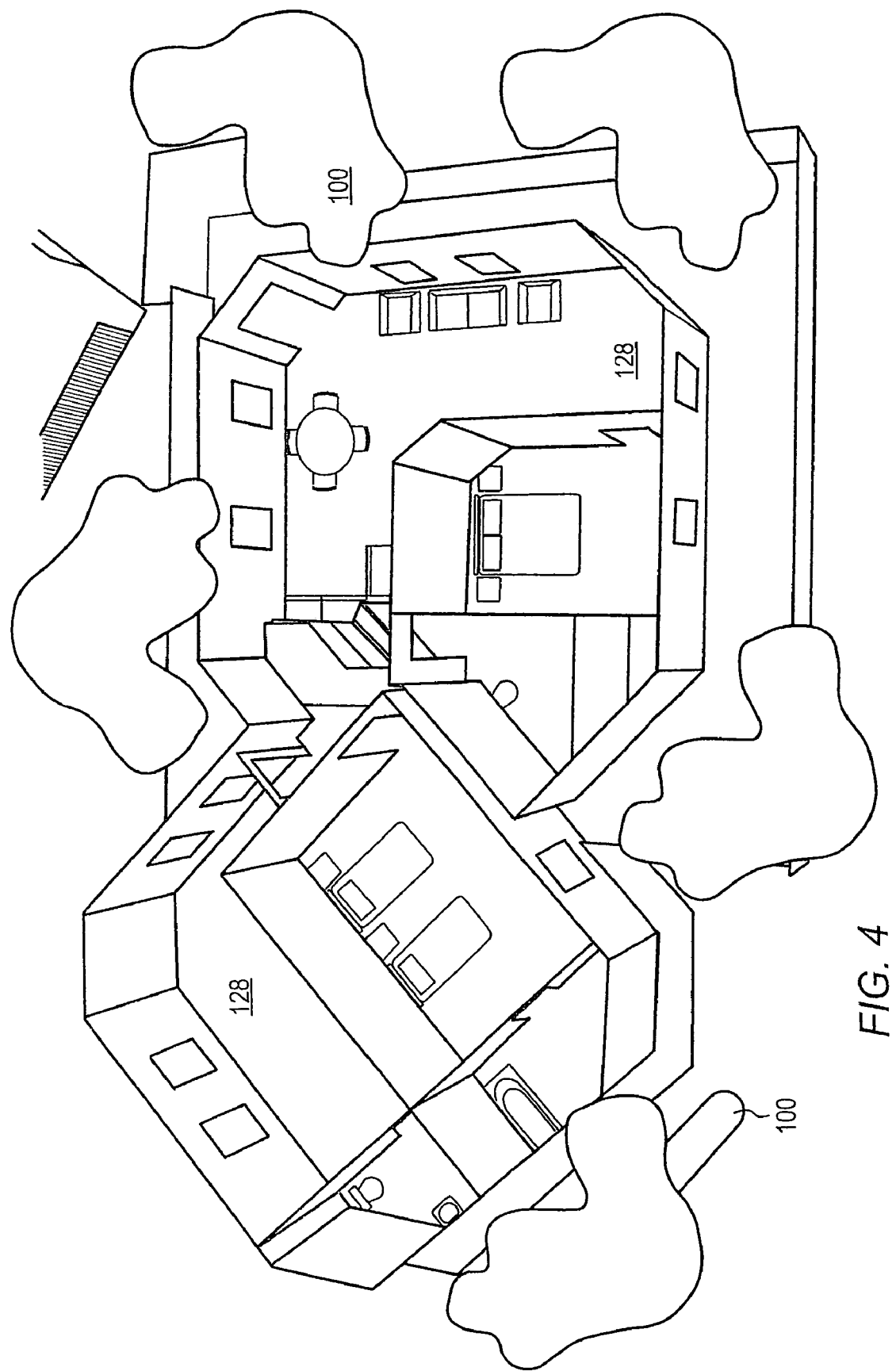
FIG. 4 depicts a perspective view of an interior of a model of an embodiment of elevated structures in composite trees.

FIG. 4 depicts a partial cut-away view of an interior of a model of an embodiment of structures 128 in composite trees 100. Structures 128 (e.g., lodgings or dwellings) may include one or more rooms. For example, structure 128 may include one or more bedrooms, one or more bathrooms, one or more general purpose areas (e.g., sitting rooms or family rooms), one or more storage areas, a kitchen, and/or one or more dining areas.

Figure 5:
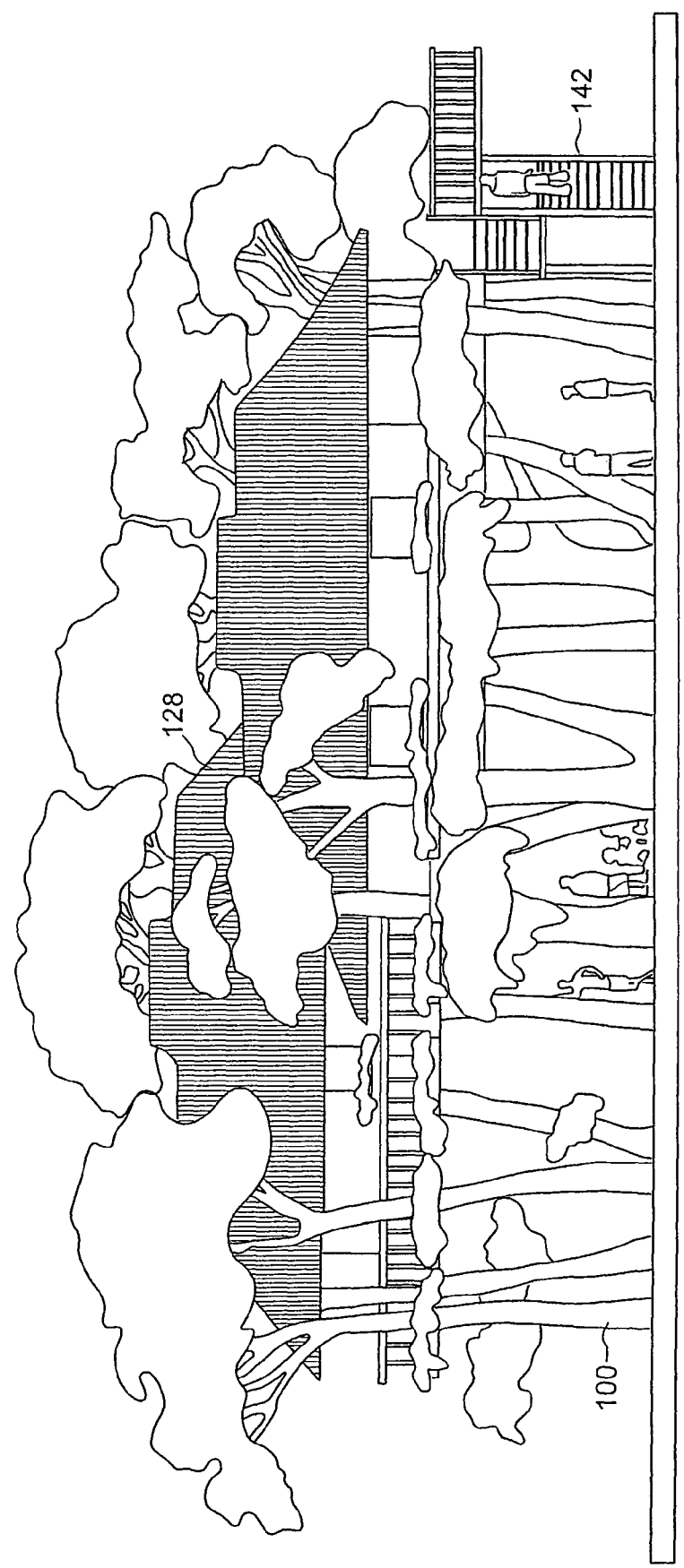
FIG. 5 depicts an embodiment of a grouping of composite trees with elevated structures.

In some embodiments, architectural structures may be decorated or embellished to resemble structures (e.g., residential structures) native to various countries, cultures, locales, holidays, seasons, and/or eras. For example, a roof of an architectural structure may have a thatched appearance. FIG. 5 depicts an embodiment of a cluster (e.g., grouping) of composite trees 100 with elevated structures 128. Structures 128 may be coupled with, for example, a walkway. Structures 128 may provide temporary housing (e.g., lodging) for guests at a water amusement park. In some embodiments, guests may access one or more structures 128 by vertical access 142. Vertical access 142 may include, but is not limited to, one or more flights of stairs, a ladder, an elevator, an inclined ramp, or combinations thereof. In some embodiments, vertical access may be designed to allow disabled persons access to structures 128 (e.g., complying with the Americans with Disabilities Act (ADA)).

Figure 6:
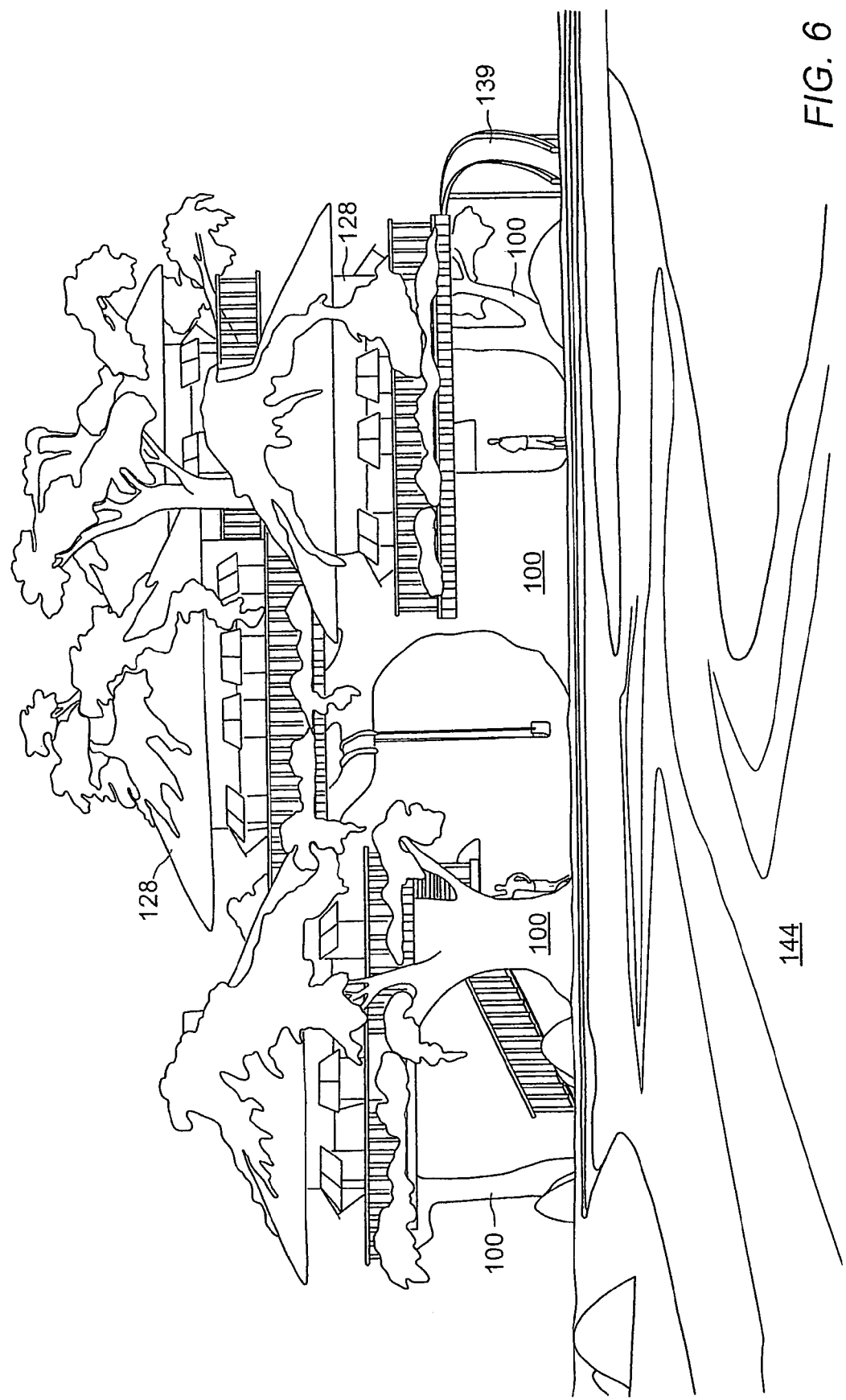
FIG. 6 depicts an embodiment of elevated structures in composite trees.

FIG. 6 depicts an embodiment of elevated structures 128 in composite trees 100. As shown in FIG. 6, composite tree 100 may support one or more structures. In some embodiments, one or more structures 128 in composite tree 100 may be designed to resemble a treehouse. In certain embodiments, composite tree 100 may be positioned adjacent a portion of water amusement ride 144. Water amusement ride 144 may be positioned within a water park.

Figure 7:
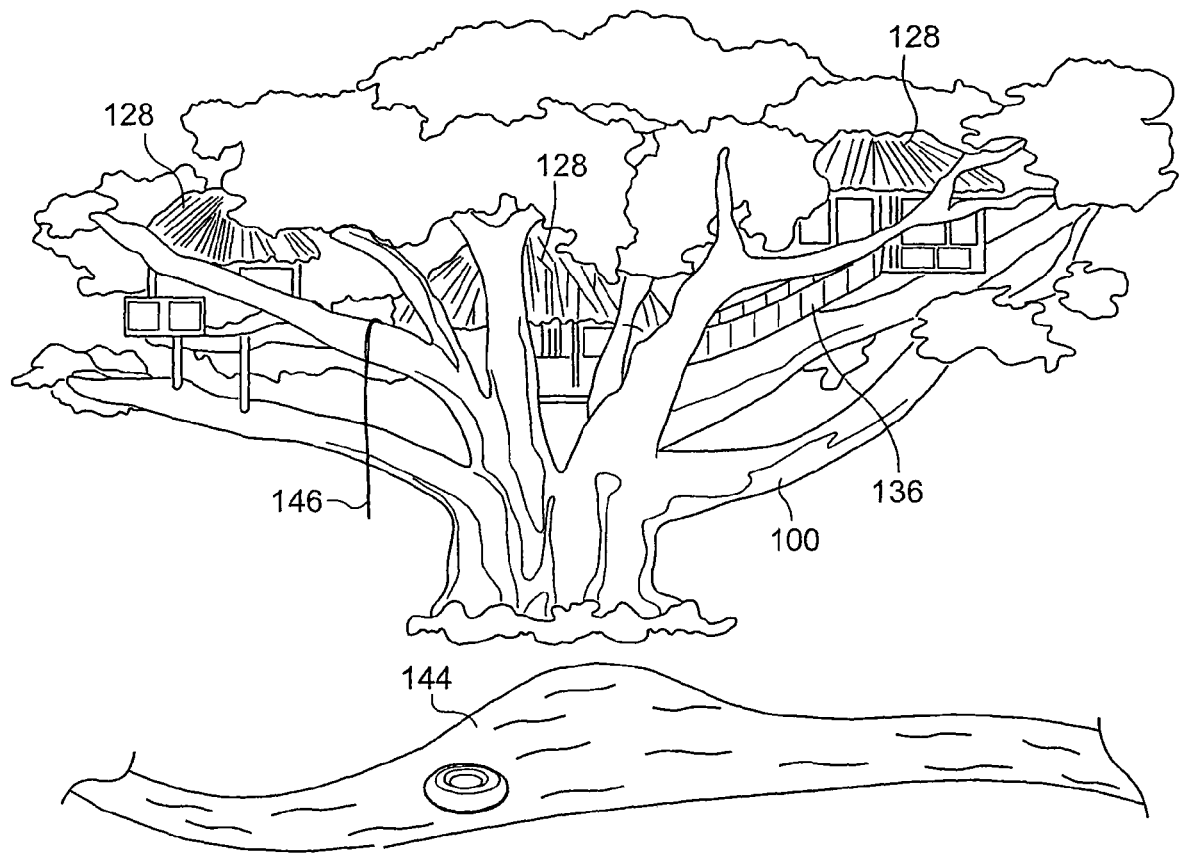
FIG. 7 depicts an embodiment of a composite tree with an elevated structure positioned adjacent a water amusement ride.

FIG. 7 depicts an embodiment of elevated structures 128 in composite tree 100 positioned adjacent water amusement ride 144. Discrete structures within the same composite tree or two or more coupled composite trees may be coupled to one another such that guests may move from one discrete structure to another. Systems used to couple discrete structures may include systems to assist a guest in moving from one discrete structure to another. Systems for assisting movement between discrete structures may include a powered assisting system. Powered assisting systems may include powered pulley or lift systems (e.g., ski lift type systems). The guests themselves may power similar systems. For example, a guest may use a hand powered crank system to move from one discrete structure to another.

In some embodiments, discrete structures within a composite tree or two or more coupled composite trees may be coupled to one another using a variety of different systems. Discrete structures may be coupled to one another using a suspended bridge and/or a walkway. Walkway 136 coupling two discrete structures 128 is depicted in FIG. 7. In some embodiments, discrete structures may be coupled to one another using elongated members (e.g., ropes, cables, and/or artificial vines). Elongated members 146 may be coupled to composite trees 100, allowing guests to use the elongated members to move between the structures 128. In some embodiments, elongated member 146 may be coupled to composite tree 100 and/or a structure 128 in the composite tree. Elongated members 146 may include safety mechanisms/systems (e.g., a harness) to ensure the safety of guests using such systems while still providing entertainment to the guests. Elongated members 146 may allow guests to swing, climb, or otherwise move from one structure to another. In some embodiments, coupling of structures 128 may allow disabled persons access to different coupled structures (e.g., complying with ADA).

There are many known mechanisms and systems available which may be appropriate for coupling structures in the same composite tree or in different composite trees. Any system that is capable of conveying or assisting in the conveyance of guests from one structure to another may be employed. Systems capable of conveying or assisting in the conveyance of guests may include safety systems. These safety systems may include known safety systems that are typically associated with a particular system of conveyance. For example, an elongated member used to swing from one structure to another may be used in conjunction with safety nets below the elongated member in order to catch any participants who fall. Safety harnesses may be used to inhibit guests from falling while using any system of conveyance. Methods and systems described for coupling discrete structures within a composite tree (e.g., for conveyance of guests, for increasing structural integrity) may also be used to couple structures not within the same composite tree and/or not within a composite tree grouping.

In some embodiments, composite trees including structures positioned in an upper portion of the composite tree, as described herein, may allow expansion of a water park without increasing a footprint of the water park. For example, structures positioned in and/or coupled to a composite tree may include some type of lodging for guests of the water park. A structure may include any type of architectural structure known, built in, adapted to be built in, or pre-fabricated and secured in a composite tree above the ground. Technology involved with constructing, positioning, and securing elevated structures is generally known in the art.

Positioning one or more composite trees with one or more elevated structures in a water park may reduce the footprint of the water park relative to a water park including traditional structures (e.g., guest accommodations) positioned on the ground. Positioning structures above the ground (e.g., in one or more composite trees) may increase the privacy of guests inside the structures. Elevating one or more structures with one or more composite trees may inhibit water park participants near the structures from viewing inside the structures (e.g., through one or more windows in one or more of the structures).

Composite trees may be grouped together in groups of two or more. In some embodiments, composite trees within a group may be coupled to each other. In certain embodiments, composite trees from two or more groups may be coupled to each other. For example, composite trees may be coupled to each other with one or more walkways. In some embodiments, composite trees may be coupled to each other to provide structural support to the composite trees and/or to provide stability to a grouping of composite trees.

Figure 8:
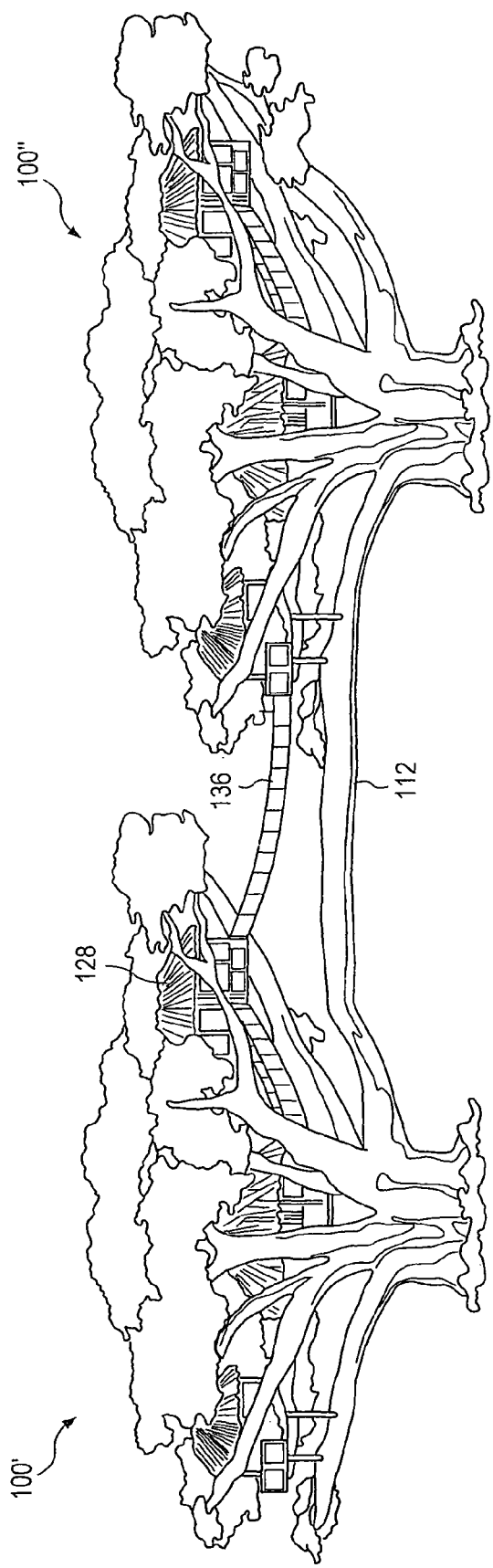
FIG. 8 depicts an embodiment of a grouping of two composite trees.
Figure 8A:
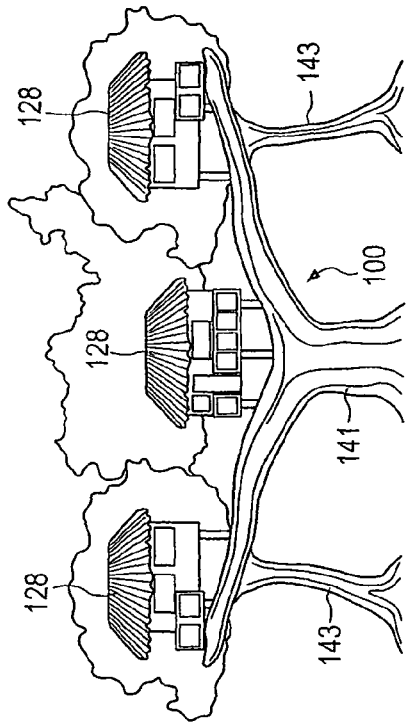
FIG. 8A depicts an embodiment of a composite tree including a plurality of shoots.

FIG. 8 depicts an embodiment of a group of two composite trees. Composite trees 100', 100" are coupled via extension 112. Coupling composite trees 100', 100" in such a manner may provide structural support to each of the composite trees. Composite trees 100', 100" may be coupled with walkway 136. In some embodiments, a tree may include two or more trunks portions. The trunk portions may be spaced apart from one another. The trunks may form a series of columns. Each of the trunks may provide structural support to the tree and structures 128 mounted in the tree. In one embodiment, some of the trunks may resemble shoots of a banyan tree. FIG. 8A depicts composite tree 100 including main trunk 141 and shoots 143. Main trunk 141 and shoots 143 may be spaced apart from each other. Main trunk 141 and each of shoots 143 may carry a portion of the load of structures 128. In certain embodiments, each shoot 143 may provide primary support for one or more structures 128 coupled to composite tree 100. In one embodiment, a system may include a bridge over a body of water (e.g., a water ride) between two columns.

Figure 9:
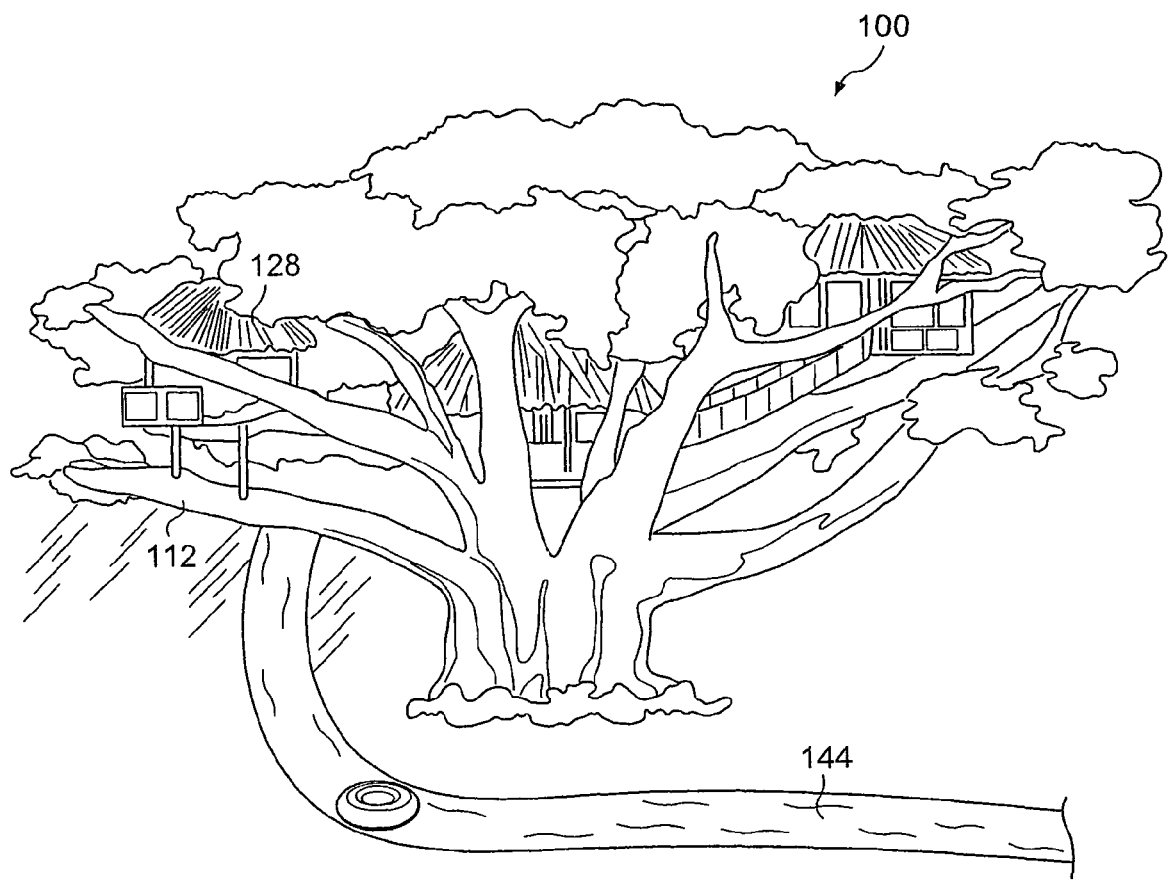
FIG. 9 depicts an embodiment of a composite tree positioned adjacent a water ride.

FIG. 9 depicts an embodiment of composite tree 100 positioned adjacent water ride 144. A portion of composite tree 100 (e.g., a base or vegetation), extension 112, and/or structure 128 may extend over a portion of water ride 144. Portions of composite tree 100 and/or structure 128 over water ride 144 may provide one or more advantages. Advantages may include, for example, providing shade for participants riding in the water ride 144 as they pass under composite tree 100 and/or structure 128. In one embodiment, a portion of a tree or structure shades a participant from direct overhead sunlight. Advantages may further include reducing the footprint of the water park. Advantages may include providing a better view of water rides for guests inside structures 128 positioned in composite tree 100. In some embodiments, portions of structure 128 and/or composite tree 100 (e.g., a base, extension, or vegetation) may extend over a body of water (e.g., an artificial lake and/or a natural lake) with sufficient depth to allow guests to enter the water directly from the composite tree or the structure. For example, a guest may be able to swing down (e.g., with a rope) from an upper portion of composite tree 100 into water below the composite tree. In certain embodiments, a water amusement system may include a slide for a participant to move from a structure to a body of water (e.g., slide 139 shown in FIG. 6).

In some embodiments, one or more water rides may flow substantially adjacent to one or more composite trees in a water park. Water rides that flow substantially adjacent to one or more composite trees may allow guests to enter the water ride directly upon exiting the composite tree. A path may be provided that allows participants to move between a tree and a water ride. In some embodiments, a body of water may include an access point to a tree and/or structure. An access point may allow participants to access a water amusement ride from a structure (e.g., a lodging unit). In some embodiments, participants may be able to float up to and/or away from the composite tree in a water ride that flows substantially adjacent to the composite tree. In some embodiments, a portion of a water ride may be positioned within about 100 meters of a composite tree.

Figure 10:
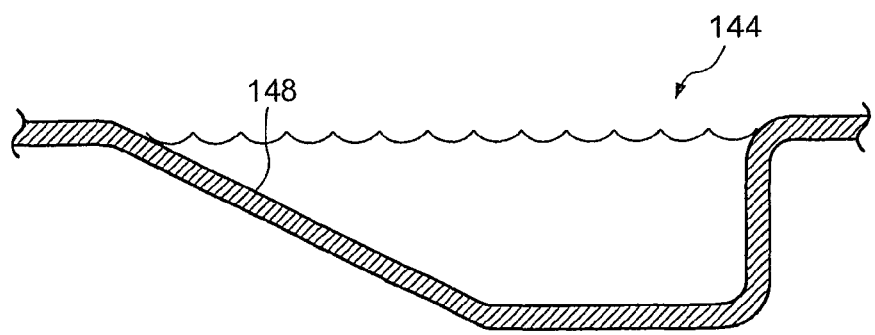
FIG. 10 depicts a representation of a cross section of an embodiment of a zero-edge entry point into a water ride.

In some embodiments, an area of a water ride may include a "zero-edge" entry point FIG. 10 depicts a representation of a cross section of an embodiment of a zero-edge entry point 148 into water ride 144. For example, a zero-edge entry may not include steps. A zero-edge entry point may be designed such that a participant is not required to consciously step down to move from a first elevation to a second elevation. A zero-edge entry may increase the safety of guests/participants as they enter the water. Many participants may feel safer entering the water using a zero-edge entry point as opposed to using steps or a drop off entry point into the water. In some embodiments, a zero-edge entry point may be positioned adjacent a composite tree such that guests may enter the water more safely.

Figure 11:
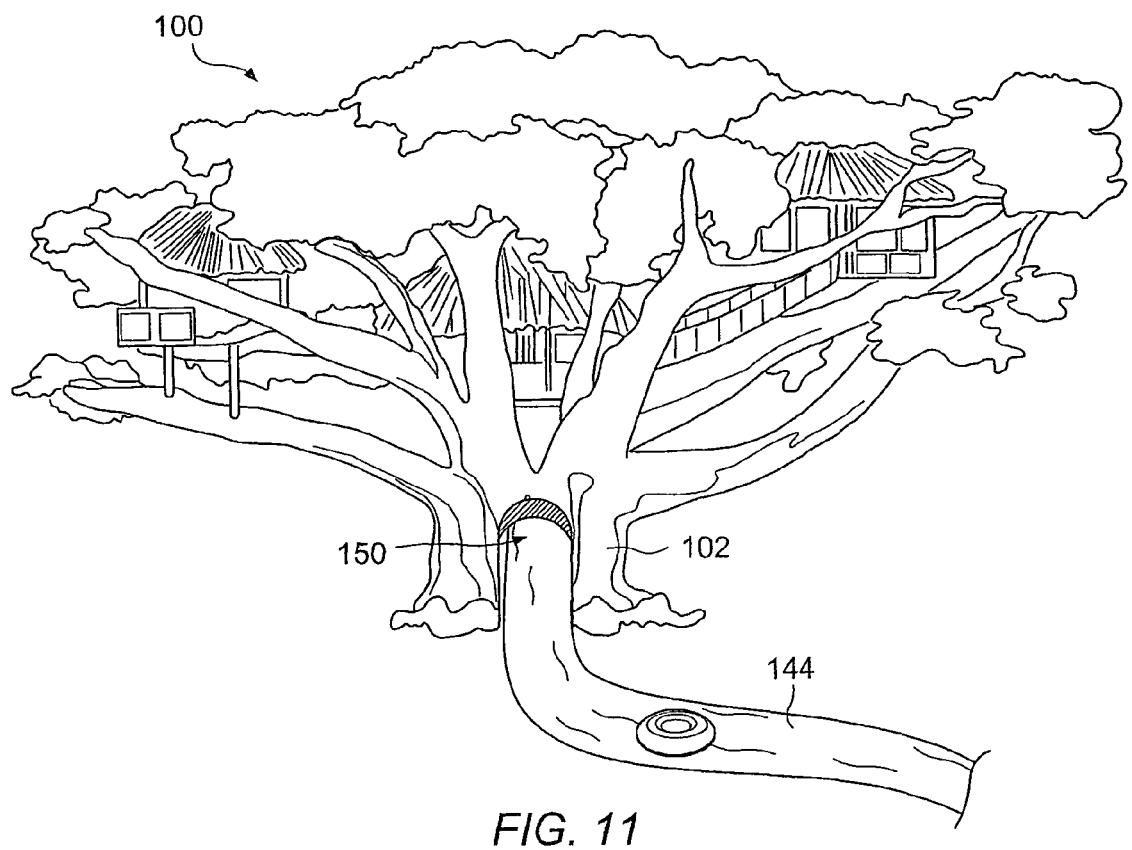

FIG. 11 depicts a representation of an embodiment of composite tree 100 including opening 150 for water ride 144 to pass through the composite tree. In some embodiments, composite tree 100 may include one or more openings. Opening 150 may be positioned in the lower portion or base 102 of composite tree 100. Openings 150 may serve one or more functions. In some embodiments, water ride 144 may pass through opening 150 in base 102 of composite tree 100. Water ride 144 may pass through opening 150 in the base of composite tree 100 such that participants may float through the base of the composite tree and/or participants may enter and/or exit directly from the composite tree into the water ride. Composite trees may also provide shade for participants as they float through the trunk of the composite tree. Water rides and bodies of water may be used to couple composite trees together, thereby reducing waiting times for rides and increasing convenience for guests who may be staying overnight in a lodging in a composite tree at the water park.

Figure 12:
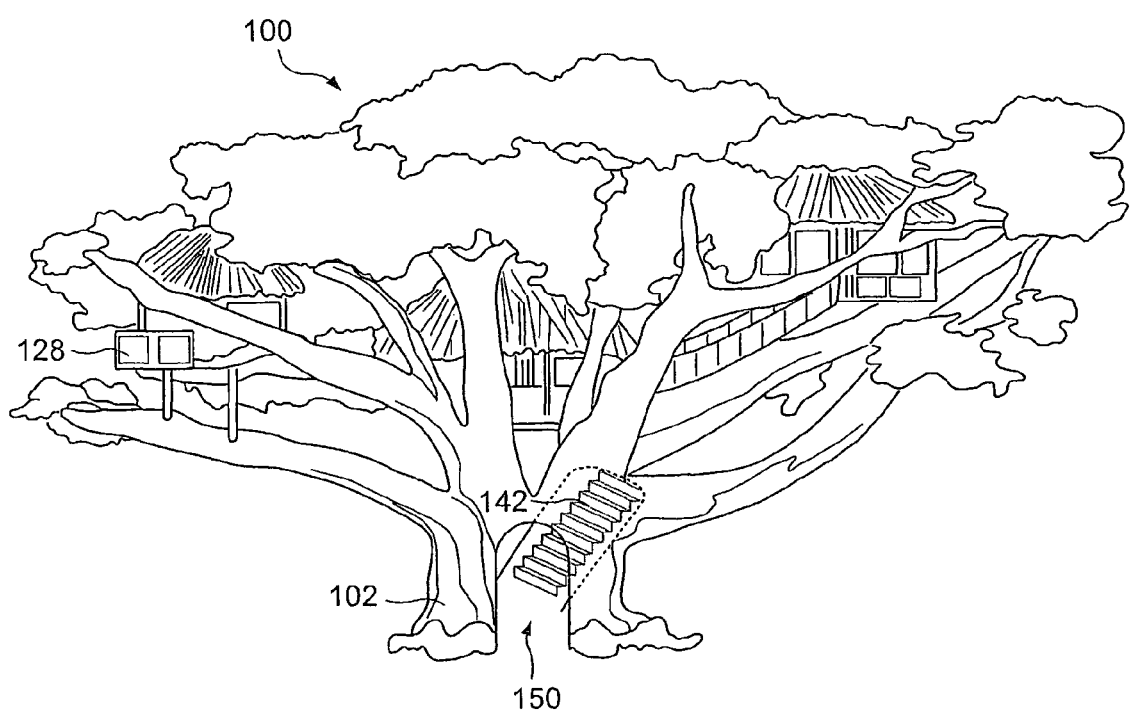
FIG. 12 depicts an embodiment of a composite tree including an opening in the base of the composite tree.

FIG. 12 depicts a representation of an embodiment of composite tree 100 including opening 150 in the base of the composite tree. In some embodiments, composite tree 100 may include one or more openings 150. Opening 150 may be positioned in base 102 of composite tree 100 (e.g., proximate the surface to which the base is connected). Opening 150 may provide access (e.g., to vertical access 142) for a guest to reach an upper portion of one or more composite trees 100 and/or structures 128 positioned in the composite trees and/or proximate the opening.

In some embodiments, a composite tree and any structures (e.g., lodgings) associated with the composite tree may include a theme. Themes may increase the entertainment value of structures in composite trees as well as the amusement park. For example, a composite tree and elevated structures may be designed to resemble a tropical jungle habitat. In certain embodiments, an elevated structure in a composite tree may be designed to resemble a child's playhouse. Rooms within a structure may be decorated with particular themes in mind. Themes may vary from room to room and/or connected rooms may include similar themes within a common structure. An example of a theme may include a honeymoon suite with a romantic theme such as a Parisian theme.

In some embodiments, a composite tree system includes a base and one or more removable branch portions. The tree system may include a set of branch portions having a common theme (e.g., a jungle theme). In some embodiments, each branch portion is a living plant. For example, for a set of branch portions used for a jungle theme, each of the branch portions may be a tropical plant. In certain embodiments, a structure for holding or accommodating persons (e.g., a lodging unit) may be mounted to the base of the tree. The structure may be designed to complement the theme of the composite tree system (e.g., a bamboo hut for a tropical tree).

In certain embodiments, a tree system may include a base and multiple sets of branch portions. Each set of branch portions may have a different theme. The theme of the tree system may be changed by removing one set of branch portions having one theme and replacing it with another set of branch portions having another theme. For example, one set of branches may have an Independence Day theme and another set of branches may have a Halloween theme. Having a common base that can be used with multiple sets of branch portions allows a composite tree to be re-dressed in a different theme from time to time. Having a common tree base that can be used for multiple themes may also reduce production costs for a system. Nevertheless, in certain embodiments, a different form of tree base may be used for each tree.

Figure 12A:
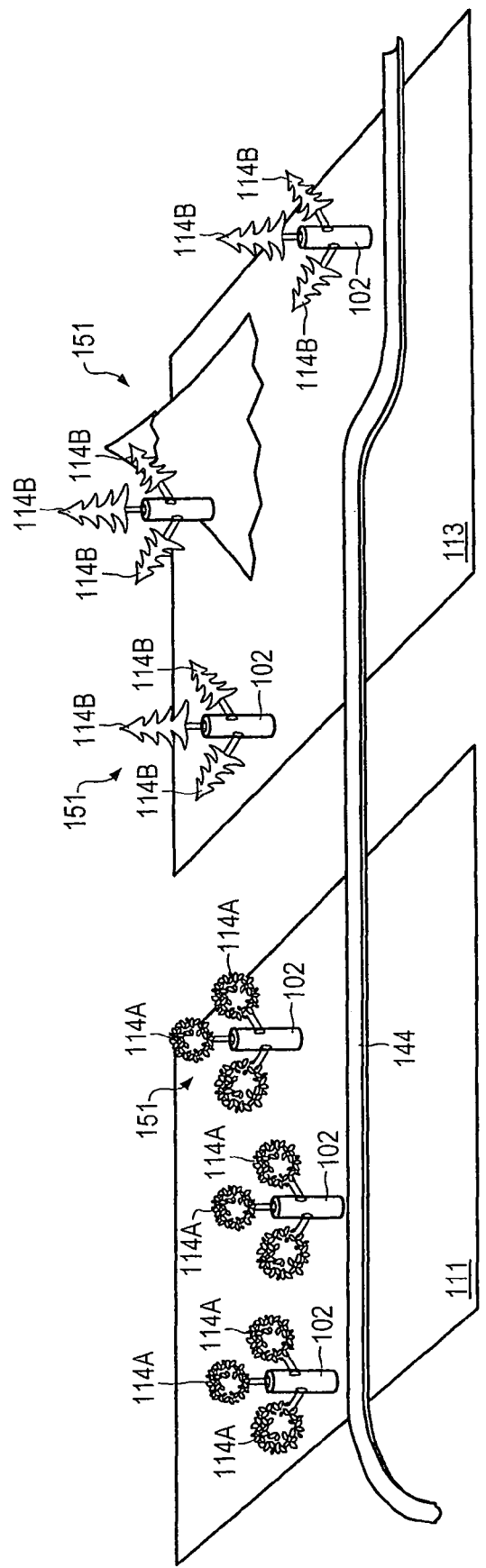
FIG. 12A depicts a schematic representation of a water amusement park including two theme areas.

In some embodiments, branch portions of composite tree systems may be selected to establish different themes for different trees within a water amusement park. In certain embodiments, branch portions of composite tree systems may be selected to establish different themes for different areas of a water amusement park. In one embodiment, a common tree base is used for all the areas of a water amusement park, but the branch portions for each area differ depending on the theme for the area. FIG. 12A depicts a water amusement park including river valley area 111 and mountain ridge area 113. Tree systems 151 in both of river valley area 111 and mountain ridge area 113 may include bases 102. In river valley area 111, living deciduous trees 114A are coupled to or positioned in bases 102. In mountain ridge area 113, living evergreen trees 114B are coupled to or positioned in bases 102. In certain embodiments, the exterior of the base of a tree may be re-dressed to match the theme of the branch portions attached to the base. For example, in a system described above, a synthetic sycamore bark covering may be replaced by a synthetic spruce bark covering.

In some embodiments, a water amusement system may include composite tree systems that are reconfigured from time to time to reflect different themes. For example, branch portions of a tree system may be removed and replaced from time to time to reflect an appropriate seasonal or holiday theme. In one embodiment, the staff of a water amusement park may couple living deciduous trees (e.g., living deciduous trees 114A shown in FIG. 12A) to the bases of composite trees early in the fall. The participants of the water amusement park may enjoy viewing the deciduous trees (e.g., watching the leaves change color and fall from the trees) during the fall months. When winter comes, the staff of the water amusement park may remove the deciduous trees from the bases and replace them with evergreen trees. The participants of the water amusement park may enjoy viewing the evergreen trees during the winter months. In certain embodiments, branch portions may be decorated (e.g., by attaching holiday ornaments to living evergreen trees 114B) to further evoke a desired theme. In certain embodiments, a structure mounted in a composite tree may be decorated to complement the theme selected for the branch portions of the tree. In another embodiment, composite tree systems may be reconfigured to permanently or semi-permanently convert a group of trees or an area of water amusement park to a different theme. For example, the management of a water amusement park may decide to convert a tropical island area of a park to an alpine area. The staff of the water park may remove tropical plants from the bases of composite trees and replace them with evergreen trees. Replacing only the branch portions of composite tree systems (rather than replacing entire trees) may reduce a cost of converting of an area of a water amusement park to another theme.

In some embodiments, a water amusement system (e.g., a water park) may include a water ride coupling two or more composite trees. The water ride may be a continuous water ride. The water ride may allow a participant, using the water ride, to avoid long lines typically associated with water amusement systems. In certain embodiments, a participant lodging in one of the structures in the composite trees may easily access the water ride, thereby reducing time associated with gaining access to a water ride.

Almost all water park rides require substantial waiting periods in a queue line due to the large number of participants at the park. This waiting period is typically incorporated into the walk from the bottom of the ride back to the top, and can measure hours in length, while the ride itself lasts a few short minutes, if not less than a minute. A series of corrals are typically used to form a meandering line of participants that extends from the starting point of the ride toward the exit point of the ride. Besides the negative and time-consuming experience of waiting in line, the guests are usually wet, exposed to varying amounts of sun and shade, and are not able to stay physically active, all of which contribute to physical discomfort for the guest and lowered guest satisfaction. Additionally, these queue lines are difficult if not impossible for disabled guests to negotiate.

The concept of a water ride connecting composite trees and/or elevated structures in a water park addresses the problems and issues stated above associated with water amusement parks. Continuous water rides may assist in eliminating and/or reducing many long queue lines. Continuous water rides may eliminate and/or reduce requiring participants to walk to an entry point of a water ride and may allow participants to float directly to elevated structures (e.g., their lodgings) or other destinations. Continuous water rides that couple elevated structures may also allow physically handicapped or physically challenged participants to more fully experience water amusement parks. It may have been difficult previously, if not impossible, due to many flights of stairs typically associated with water amusement parks, for physically handicapped and physically challenged people to participate at least in certain portions of water amusement parks.

In some embodiments, a continuous water ride may include a system of water rides coupled and/or connected together, as well as one or more composite trees. The system may include two or more water rides coupled and/or connected together. Water rides may include downhill waterslides, uphill waterslides, single tube slides, multiple participant tube slides, space bowls, sidewinders, interactive waterslides, water rides with falling water, themed waterslides, dark water rides, and/or accelerator sections in waterslides. Coupled and/or connected rides may reduce long queue lines normally associated with individual water rides as well as allow participants to access the water rides from composite trees and/or elevated structures. Coupled and/or connected rides may allow participants to remain in the water and/or a vehicle (e.g., a floatation device) during transportation from a first portion of the continuous water ride to a second portion of the continuous water ride and, if desired, to a composite tree.

In some embodiments, an exit point of a first water ride may be coupled or connected to an entry point of a second water ride, forming at least a portion of a continuous water ride. An exit/entry point of the continuous water ride may be coupled to one or more composite trees. The entry/exit point of the first water ride and a portion of the composite tree (e.g., an upper portion of the composite tree) may be at different elevations. An elevation system may be used to connect the entry/exit point of the first water ride and the portion of the composite tree (e.g., an elevated structure in the composite tree). In some embodiments, a portion of the composite tree may have a higher elevation than an entry/exit point of a first water ride.

Figure 13:
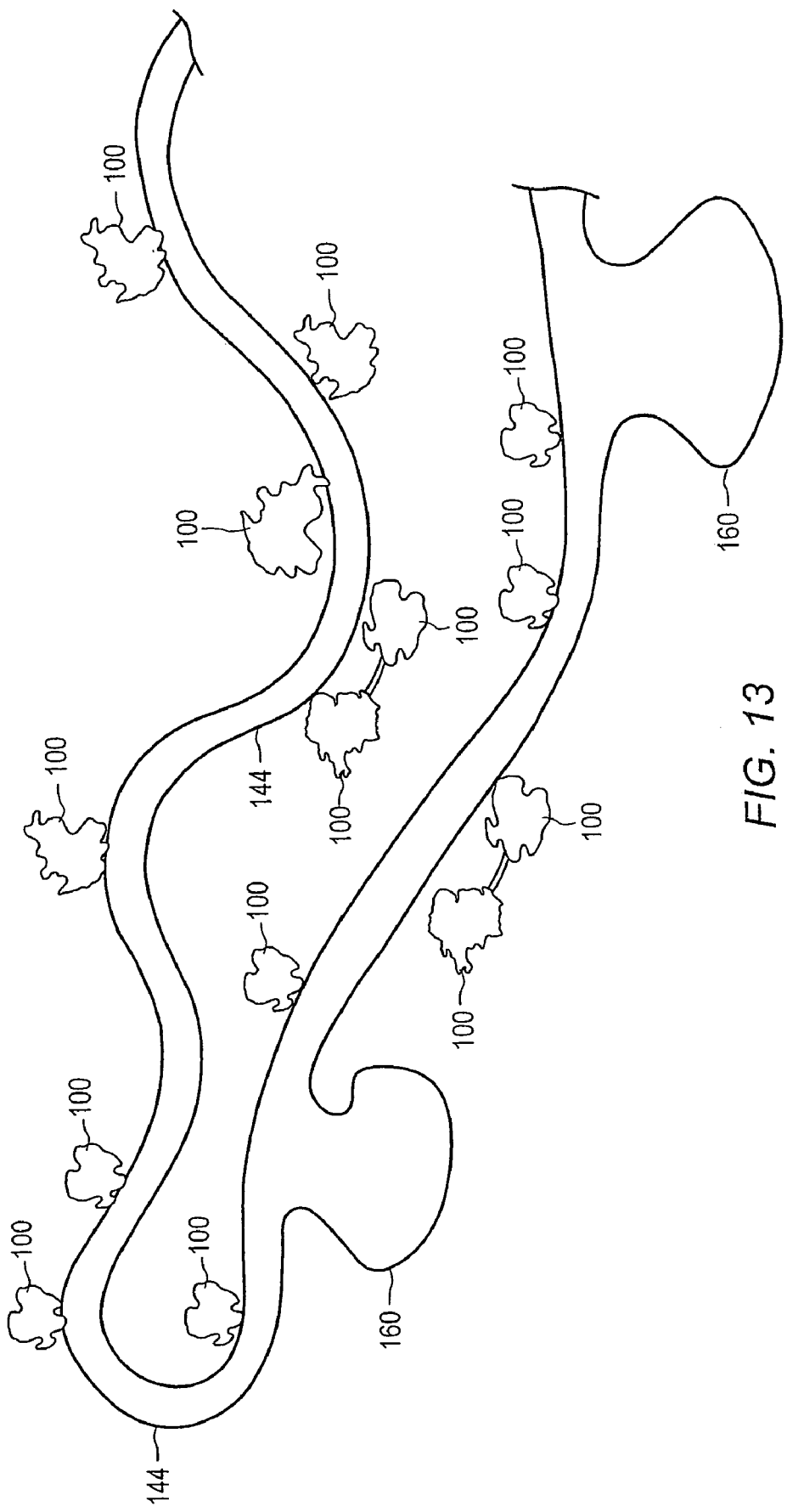
FIG. 13 depicts a schematic representation of a portion of a channel adjacent several composite trees as well as several groupings of composite trees.

FIG. 13 depicts a representation of a portion of connected water ride 144 (e.g., a channel) adjacent several composite trees 100 as well as several groupings of composite trees 100. Water ride 144 may include several bodies of water 160 coupled to the water ride as depicted in FIG. 13. In some embodiments, a channel of water may run adjacent to a plurality of composite trees. The channel of water may act as one way to transport guests to and from their composite tree lodgings. In some embodiments, the channel may be coupled to a continuous water ride system of a water amusement park. In some embodiments, the channel may not be coupled to a water amusement park system. In some embodiments, the channel may be coupled to a water amusement park and include a system for inhibiting persons other than composite tree guests from entering the channel, giving guests more privacy.

Figure 14:
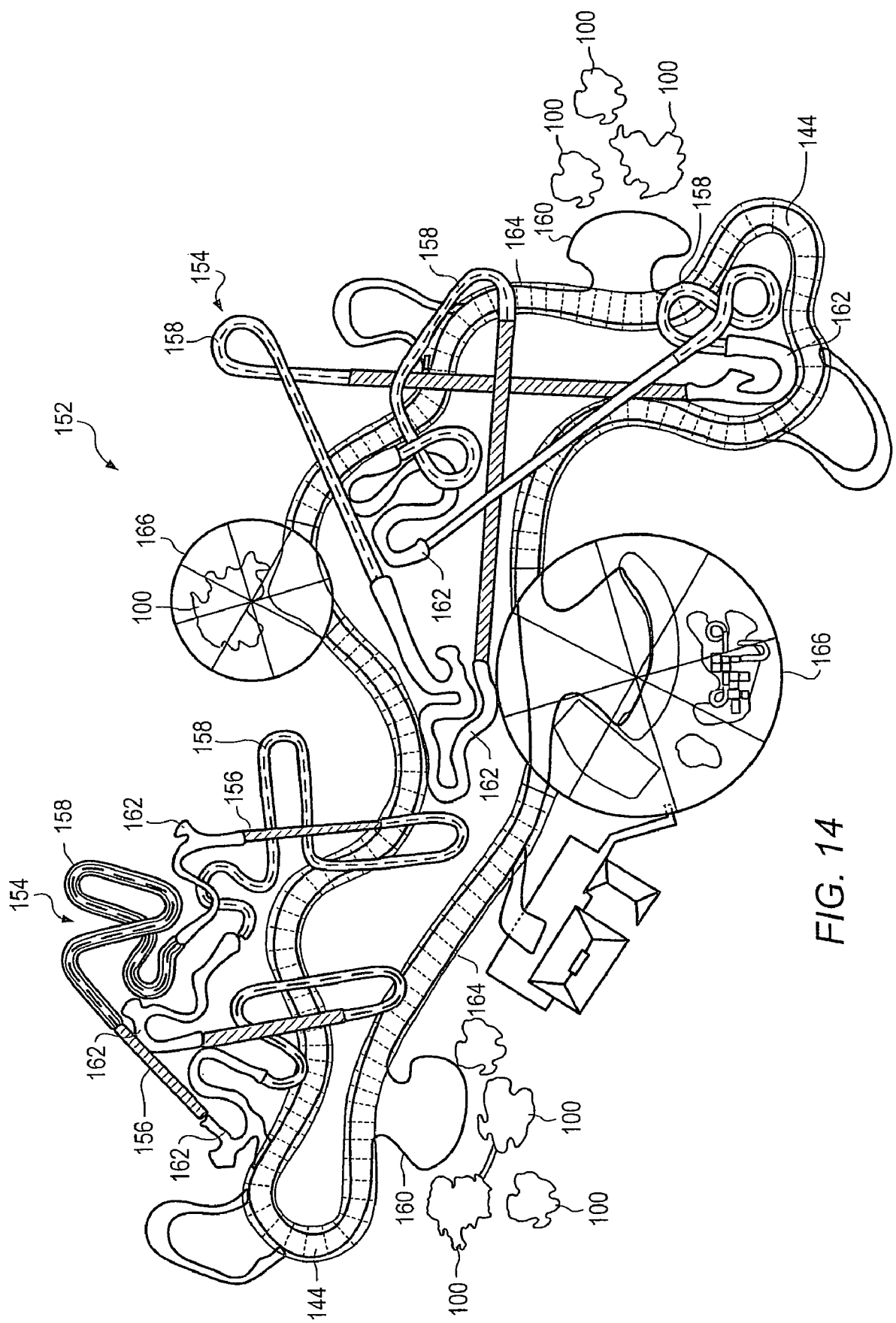
FIG. 14 depicts an embodiment of a water amusement park.

FIG. 14 depicts a schematic view of an embodiment of a water amusement park. Water amusement park 152 includes continuous water rides 154 as well as various types of water rides 144. Continuous water rides 154 may include coupled and/or connected water rides 144. Water rides 144 may include elevation systems 156, downhill waterslide 158, bodies of water 160, and floating queue systems 162. Elevation systems 156 may include, for example, conveyor belt systems as depicted in FIG. 14. Downhill waterslides 158 may couple elevation systems 156 to floating queue systems 162. Water rides 144 may couple several groups of one or more composite trees 100 together, such that guests may more easily access their accommodations and/or other areas of the water park. Portions of the water amusement park may be enclosed and/or covered using screens 164. Screens 164 may be variably positionable. Screens 164 may allow portions of the park (e.g., a ride or a portion of a ride) to be covered or uncovered. Portions of a water amusement park may include an enclosure 166 (e.g., a dome) which protects the portion from the elements (e.g., sun, rain). Enclosure 166 may effectively protect one or more composite trees 100 from the elements.

In some embodiments, elevation systems may include any system capable of transporting one or more participants and/or one or more vehicles from a first point at one elevation to a second point at a different elevation. Elevation systems may include a conveyor belt system, a water lock system, an uphill waterslide, a spiral transport system, a water wheel, and/or combinations thereof.

Figure 15:
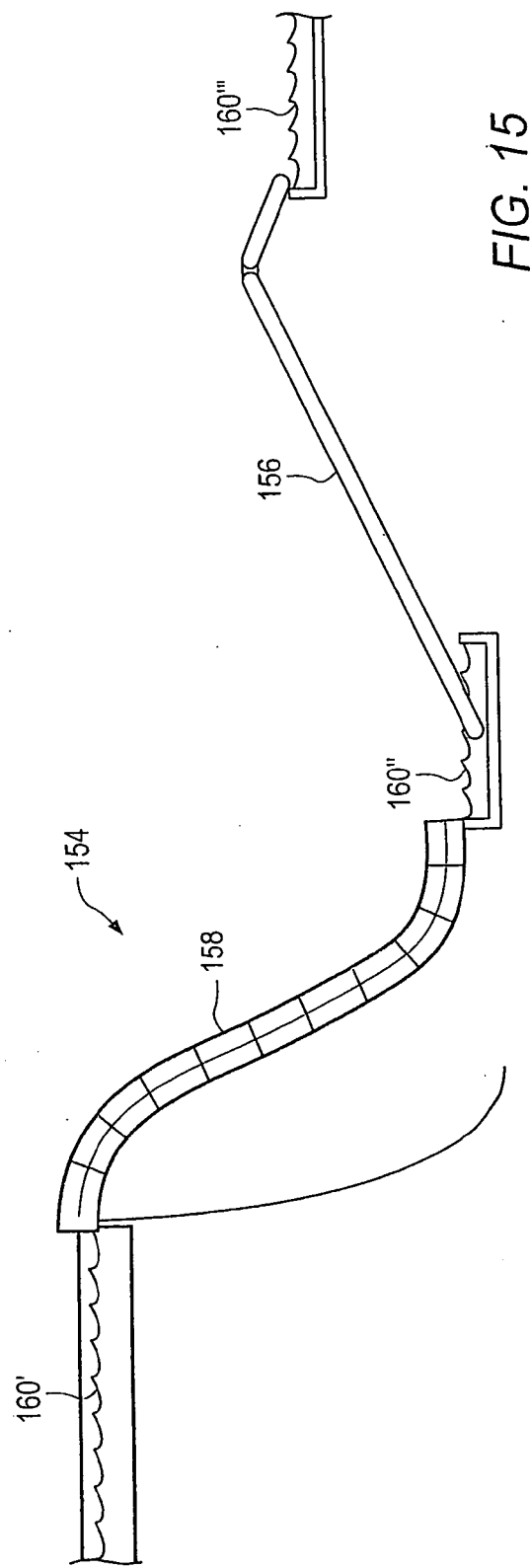
FIG. 15 depicts an embodiment of a portion of a continuous water ride.

FIG. 15 depicts a portion of an embodiment of continuous water ride 154. Continuous water ride 154 may include first body of water 160'. First body of water 160' may include one or more pools, lakes, and/or wells. First body of water 160' may be a natural, an artificial, or an artificially modified natural body of water. A non-limiting example of an artificially modified natural body of water may include a natural lake that has been artificially enlarged and/or adapted for water amusement park purposes (e.g., with entry ladders and/or entry steps). Continuous water ride 154 may include downhill waterslide 158. Downhill waterslide 158 may convey participants from first body of water 160' at a first elevation to a lower second elevation into one of various types of water containers (e.g., a body of water, a channel, a floating queue line, a pool, and/or combinations thereof). The water container at the lower second elevation may include, for illustrative purposes only, second body of water 160". Second body of water 160" may be, for example, a pool. Continuous water ride 154 may include elevation system 156. Elevation system 156 may include any system capable of safely moving participants and/or vehicles from a lower elevation to a higher elevation. Elevation system 156 is depicted as a conveyor belt system in FIG. 15. Elevation system 156 may convey participants to third body of water 160'''.

Figure 16:
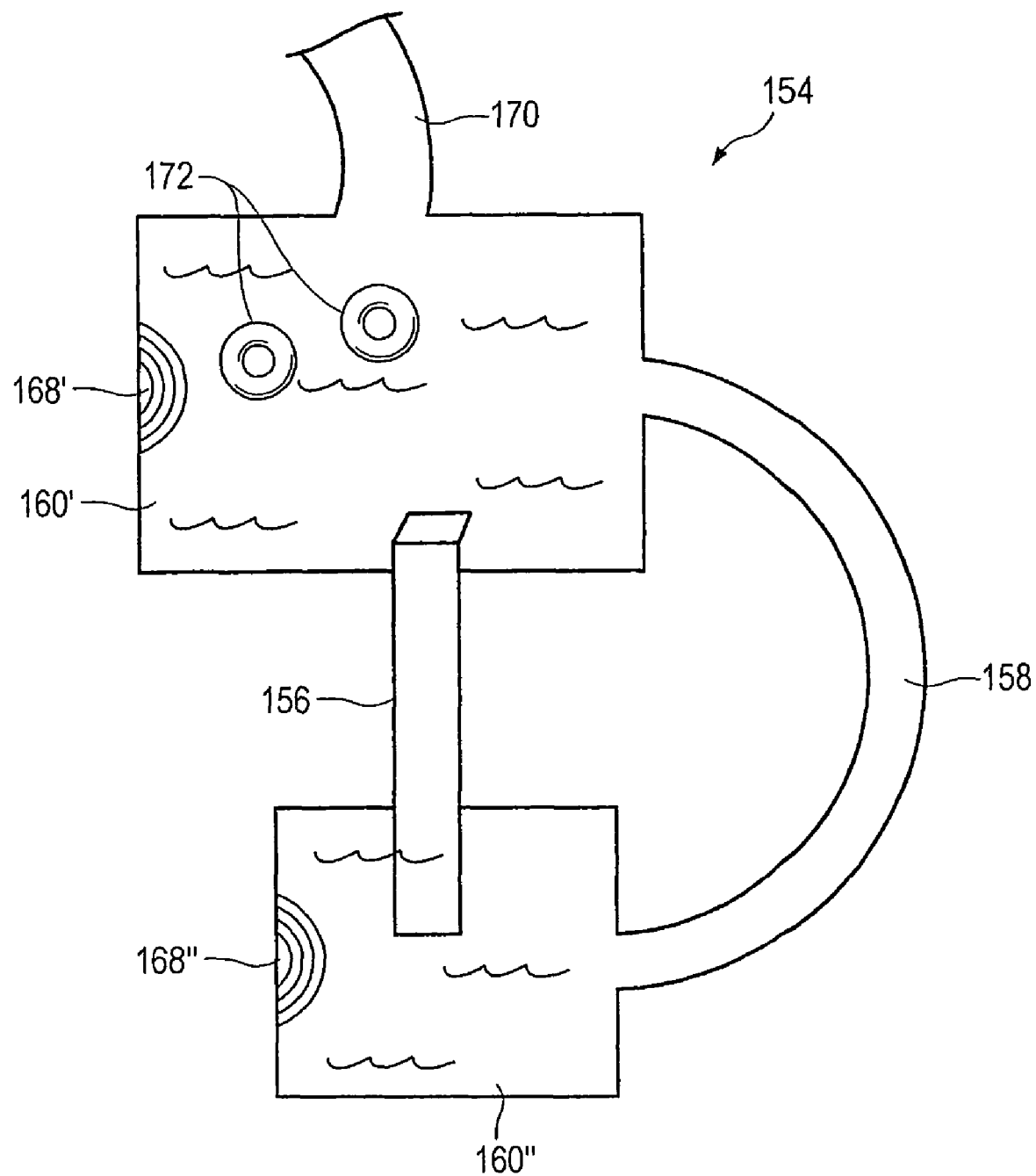
FIG. 16 depicts an embodiment of a portion of a continuous water ride.

FIG. 16 depicts a portion of an embodiment of continuous water ride 154. Continuous water ride 154 may include first body of water 160'. Second body of water 160" may be coupled to downhill waterslide 158. Downhill waterslide 158 may couple first body of water 160' to second body of water 160". Second body of water 160" may be at a lower elevation than first body of water 160'. First body of water 160' may include first access point 168' and second body of water 160" may include second access point 168". First access point 168' may allow participants to safely enter and/or exit first body of water 160'. As depicted in FIG. 16, access points 168', 168" may be stairs. Access points 168', 168" may also include ladders, zero-edge entries, and/or a gradually sloping walkways. Second body of water 160" may be coupled to first body of water 160' with elevation system 156. Elevation system 156, as depicted in FIG. 16, is a conveyor belt system. Elevation system 156 may be any system of elevation known in the art including, but not limited to, any system of elevation described herein. First body of water 160' may be coupled to a second water ride. The second water ride may be, for example, river 170. In some embodiments, river 170 may be a slow (e.g., "lazy") river.

Continuous water ride 154 may allow participants and/or vehicles 172 (e.g., inner tubes) to ride continually without having to leave their vehicle or the continuous water ride. For example, a participant may enter first body of water 160' through first access point 168'. The participant may ride vehicle 172 down downhill waterslide 158 to second body of water 160". The participant may exit second body of water 160" at second access point 168" or ride vehicle 172 up elevation system 156 to first body of water 160'. For safety reasons, one or both ends of elevation system 156 may extend below the surface of bodies of water 160', 160". Extending the ends of elevation system 156 below the surface of the water may allow participants to access elevation system 156 more safely. Participants who choose to ride elevation system 156 to first body of water 160' may then choose to either exit from first access point 168', ride downhill waterslide 158 again, or enter river 170.

In some embodiments, two or more bodies of water may be connected and/or coupled to one or more elevation systems and one or more water rides. In some embodiments, floating queue lines and/or channels may couple water rides and elevation systems. In some embodiments, floating queue lines may couple water rides and composite trees. The flow of participants in a water ride with a floating queue line may be controlled more efficiently than the flow of participants in a water ride without a floating queue line.

In some embodiments, elevation systems may include a conveyor belt system. Conveyor belt systems are described in U.S. patent application Ser. No. 09/952,036 (Publication No. US-2002-0082097-A1), incorporated herein by reference. This system may include a conveyor belt system positioned to allow riders to naturally float up or swim up onto the conveyor and be carried up and deposited at a higher level.

A conveyor belt system may be used to remove participants and/or vehicles from the water flow at entry and/or exit locations (e.g., proximate composite trees) of a continuous water ride. Participants and vehicles float up to a moving conveyor and are carried along the conveyor. In some embodiments, participants may exit their vehicles on the conveyor. In certain embodiments, participants may exit the continuous water ride from the conveyor. Participants entering the continuous water ride may be transported (with or without a vehicle) into the water ride at a desired location and velocity.

A conveyor may extend below the surface of the water to facilitate participant access to the conveyor. For example, a participant may float or swim onto the conveyor. Extending the conveyor below the surface of the water may allow for a smoother entry into the water from the conveyor belt. Typically, the conveyor belt may take participants and vehicles from a lower elevation to a higher elevation. In some embodiments, however, participants may be first transported to an elevation that exceeds the elevation of their next destination. Upon reaching the higher elevation, the participants then may be transported down to the elevation of their next destination on a waterslide, on rollers, or on a continuation of the conveyor that transported them to the higher elevation. In some embodiments, gravity may remove the rider from the belt, slide, or rollers into a second water ride and/or a floating queue.

The endpoint of a conveyor may be near a first end of a horizontal hydraulic head channel where water is introduced through a first conduit. This flowing current may move the riders away from the conveyor endpoint in a quick and orderly fashion, thereby inhibiting an increase in rider density at the conveyor endpoint. Further, moving the riders quickly away from the conveyor endpoint may act as a safety feature by reducing the risk of riders becoming entangled in a part of the conveyor belt and related mechanisms.

In some embodiments, a deflector plate may extend from one or more ends of the conveyor and to a bottom of the channel. A deflector plate that extends at an angle away from the conveyor may help guide the riders up onto the conveyor belt and/or inhibit access to the rotating rollers underneath the conveyor. These conveyors may be designed to lift riders from a first elevation to a second higher elevation or to lift riders and vehicles out of the water onto a horizontal moving platform and then return the vehicle with a new rider to the water. In some embodiments, conveyors may be designed to lift riders from a first elevation (e.g., from the water in a water ride) to a second higher elevation (e.g., the base/entry point of a composite tree and/or an upper portion of a composite tree).

In some embodiments, an elevation system may include a water lock system. An elevation system with a water lock system may be used to increase elevation and/or decrease elevation. In certain embodiments, an exit point of a first water ride of a continuous water ride may have an elevation below an elevation of an entry point of a composite tree lodging coupled to the continuous water ride. In some embodiments, the water lock system may include a chamber for holding water coupled to the exit point of the first water ride and the entry point of the composite tree lodging. A chamber is herein defined as an at least partially enclosed space. The chamber may include at least one outer wall or a series of outer walls that together define the outer perimeter of the chamber. The chamber may also be at least partially defined by natural features such as the side of a hill or mountain. The walls of a chamber may be substantially watertight. The outer wall of the chamber, in certain embodiments, may extend below an upper surface of a first water ride and above an upper surface of an entry point of a composite tree lodging. A chamber may have a shape that resembles a square, a rectangle, a circle, a star, a regular polyhedron, a trapezoid, an ellipse, a U-shape, an L-shape, a Y-shape, or a figure eight, when viewed from overhead.

A first movable member may be formed in an outer wall of a chamber. The first movable member may be positioned to allow participants and water to move between the exit point of the first water ride and the chamber when the first movable member is open during use. A second movable member may be formed in a wall of the chamber. The second movable member may be positioned to allow participants to move between an entry point of a composite tree and the chamber when the second movable member is open during use. When moving participants up to an entry point of a composite tree, the second movable member may limit the amount of water that is released when a participant exits. In other cases, such as when a water lock system couples two water rides together, the second movable member may allow water to exit as a participant exits. In some embodiments, allowing water to exit with a participant may assist in conveying the participant out of the water lock system and into the second water ride. The second movable member may be formed in a wall at a different elevation than the first movable member.

In certain embodiments, first and second movable members may swing away from the chamber wall when moving from a closed position to an open position during use. In certain embodiments, first and second movable members may move vertically into a portion of the wall when moving from the closed position to the open position. In certain embodiments, first and second movable members may move horizontally along a portion of the wall when moving from the closed position to the open position.

A bottom member may also be positioned within a chamber. The bottom member may float below an upper surface of water within the chamber during use. The bottom member may rise when the water in the chamber rises during use. In certain embodiments, the bottom member is substantially water permeable such that water in the chamber moves freely through the bottom member as the bottom member moves within the chamber during use. The bottom member may remain at a substantially constant distance from the upper surface of the water in the chamber during use. The bottom member may include a wall extending from the bottom member to a position above the upper surface of the water. The wall may inhibit and/or prevent participants from moving to a position below the bottom member. A floatation member may be positioned on a wall of the chamber at a location proximate the upper surface of the water. A ratcheted locking system may couple the bottom member to the inner surface of the chamber wall. The ratcheted locking system may inhibit the bottom member from sinking when water is suddenly released from the chamber. The ratcheted locking system may also include a motor to allow the bottom member to move vertically within the chamber. There may be one or more bottom members positioned within a single chamber. The bottom member may incorporate water jets to direct and/or propel participants in or out of the chamber.

The lock system may also include a substantially vertical first ladder coupled to a wall of the bottom member and a substantially vertical second ladder coupled to a wall of the chamber. The first and the second ladders, in certain embodiments, may be positioned such that the ladders remain substantially aligned as the bottom member moves vertically within the chamber. The second ladder may extend to the top of the outer wall of the chamber. The ladders may allow participants to exit from the chamber if the lock system is not working properly.

In certain embodiments, water may be transferred into and out of the water lock system via the movable members formed within the chamber wall. Opening the movable members may allow water to flow into the chamber from the second water ride or out of the chamber into the first water ride.

The lock system may also include a controller for operating the system. The controller may be a computer, programmable logic controller, and/or any other control device. The controller may be coupled to the first movable member, the second movable member, and the first water control system. The controller may allow manual, semi-automatic, or automatic control of the lock system. The controller may be coupled to sensors. Sensors may be positioned to detect if people are in the lock, not in the lock, or blocking the gate. Sensors may be positioned to detect if the gate is fully opened or fully closed. Sensors may be positioned to detect water levels within the chambers.

In certain embodiments, the participants may float in water during the entire transfer from the first water ride to the second water ride. The participants may swim in the water or float on a floatation device. In some embodiments, the participants may float on an inner tube, a floatation board, a raft, or other floatation devices used by riders on water rides.

In certain embodiments, the lock system may include multiple movable members formed within the outer wall of the chamber. These movable members may lead to multiple water rides and/or continuous water ride systems coupled to the chamber. The additional movable members may be formed at similar elevation level or at different elevations.

In some embodiments, first and second movable members formed in the outer wall of a chamber of a lock system may move vertically into a portion of the wall when moving from a closed position to an open position. The members may be substantially hollow, and may include holes in the bottom that allow fluid to flow in and out of the member. In an open position, the hollow member may be substantially filled with water. To move the member to a closed position, compressed air from a compressed air source may be introduced into the top of the hollow member through a valve, forcing water out of the holes in the bottom of the member. As the water is forced out and air enters the member, the buoyancy of the member may increase and the member may float up until it reaches a closed position. In this closed position, the holes in the bottom of the member may remain submerged, thereby preventing air from escaping through the holes. To move the member back to an open position, a valve in the top of the member may be opened, allowing the air to escape and allowing water to enter through the holes in the bottom. As water enters and air escapes, the gate may lose buoyancy and sink until it reaches the open position, when the air valve may be closed again.

An advantage to a pneumatic gate system is that water may be easily transferred from a higher lock to a lower lock over the top of the gate. This system may greatly simplify and reduce the cost of valves and pumping systems between lock levels. The water that progressively spills over the top of the gate as it is lowered may be at low, near-surface pressures in contrast to water pouring forth at various pressures in a swinging gate lock system. This advantage may make it feasible to eliminate some of the valves and piping required to move water from a higher lock to a lower lock.

In certain embodiments, a pneumatic or a hydraulic cylinder may be used to vertically move a gate system. An advantage to this system may be that the operator has much more control over the gate than with a gate system operating on a principle of increasing and decreasing the buoyancy. More control of the gate system may allow the gates to be operated in concert with one another, as well as increasing the safety associated with the system. The gate may be essentially hollow and filled with air or other floatation material such as Styrofoam, thus decreasing the power needed to move the gate.

While described as having only a single chamber coupled to two water rides forming a continuous water ride, it should be understood that multiple chambers may be interlocked to couple two or more water rides of a first continuous water ride and/or a second continuous water ride. By using multiple chambers, a series of smaller chambers may be built rather than a single large chamber. In some situations, it may be easier to build a series of chambers rather than a single chamber. For example, use of a series of smaller chambers may better match the slope of an existing hill. Reducing water depths and pressures operating in each chamber may improve safety and may reduce structural considerations resulting from increased water pressure differentials. Using multiple chambers may increase aesthetics or ride excitement. Using multiple chambers may increase overall speed and rider throughput of the lock.

Participants may be transferred from the first water ride to the second water ride by entering the chamber and altering the level of water within the chamber. The first movable member, coupled to the first water ride, may be opened to allow participants to move into the chamber. The participants may propel themselves by pulling themselves along using a rope or other accessible handles. The participants may be pushed directly with water jets or may be propelled by a current moving from the lower water ride toward the chamber. The current may be generated using water jets positioned along the inner surface of the chamber. In an embodiment, altering the level of water in the first water ride may generate a current. For example, by raising the level of water in the first water ride, a flow of water from the first water ride into the chamber may occur.

After the participants have entered the chamber, the first movable member may be closed and the level of water in the chamber may be altered. The level may be raised or lowered, depending on the elevation level of the second water ride with respect to the first water ride. If the second water ride is higher than the first water ride, the water level may be raised. If the first water ride is at a higher elevation than the second water ride, the water level may be lowered. As the water level in the chamber is altered, the participants may move to a level commensurate with the upper surface of the second water ride. While the water level is altered within the chamber, the participants may remain floating proximate the surface of the water. In some embodiments, a bottom member may move with the upper surface of the water in the chamber to substantially maintain a relatively constant and safe depth of water beneath the riders.

In some embodiments, the water level in the chamber may be altered until the water level in the chamber is substantially equal to the water level of the second water ride. The second movable member may now be opened, allowing the participants to move from the chamber to the second water ride. In certain embodiments, a current may be generated by filling the chamber with additional water after the level of water in the chamber is substantially equal to the level of water outside the chamber. As the water is pumped in the chamber, the resulting increase in water volume within the chamber may cause a current to be formed flowing from the chamber to the water ride. When the movable member is open, the formed current may be used to propel the participants from the chamber to a water ride. Thus, the participants may be transferred from a first water ride to a second water ride without having to leave the water, forming a continuous water ride. The participants may be thus relieved of having to walk up a hill. The participants may also be relieved from carrying any floatation devices necessary for the continuous water ride.

Figure 17:
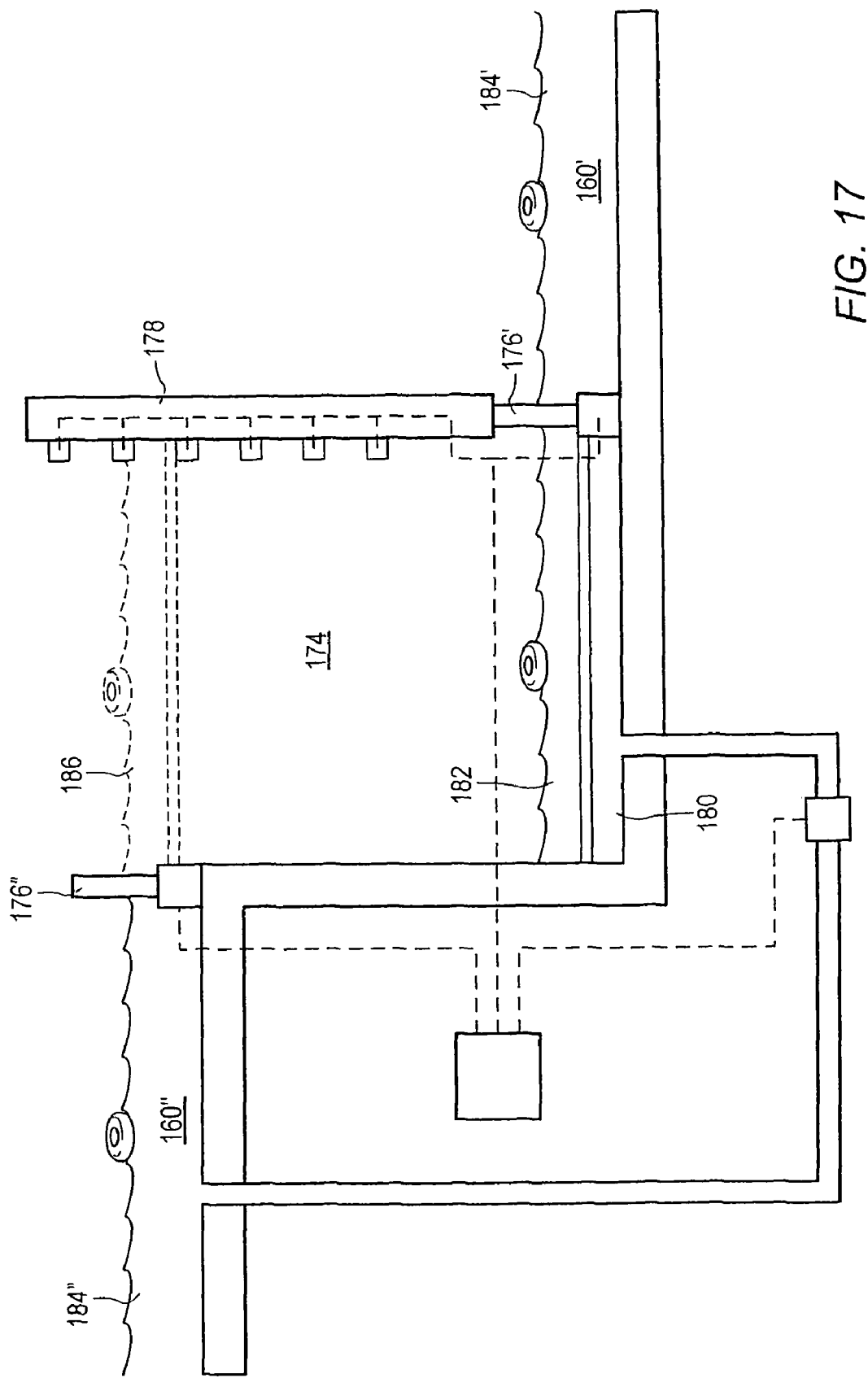
FIG. 17 depicts a cross-sectional side view of an embodiment of a water lock system with one chamber and a conduit coupling an upper body of water to the chamber.

FIG. 17 depicts a water lock system for conveying a person or a group of people (i.e., participants) from first body of water 160' (e.g., a lower body of water) to second body of water 160" (e.g., an upper body of water). It should be understood that while a system and method of transferring the participants from a lower body of water to an upper body of water is herein described, the lock system may also be used to transfer participants from an upper body of water to a lower body of water by reversing the operation of the lock system. Bodies of water 160', 160" may be receiving pools (i.e., pools positioned at the end of a water ride), entry pools (i.e., pools positioned at the entrance of a water ride), a chamber of a water lock system, an entry to a composite tree, or a natural body of water (e.g., a lake, river, reservoir, pond, etc.). The water lock system, in certain embodiments, may include one or more chambers 174 coupled to bodies of water 160', 160". First movable member 176' and second movable member 176" may be formed in outer wall 178 of chamber 174. First movable member 176' may be coupled to first body of water 160' such that the participants may enter chamber 174 from the first body of water while water 180 in the chamber is at level 182 substantially equal to upper surface 184' of the first body of water. After the participants have entered chamber 174, the level of water within the chamber may be raised to height 186 substantially equal to upper surface 184" of second body of water 160". Second movable member 176" may be coupled to second body of water 160" such that participants may move from chamber 174 to the second body of water after the level of water in the chamber is raised to the appropriate height.

Outer wall 178 of chamber 174 may be coupled to both first body of water 160' and second body of water 160". Outer wall 178 may extend from a point below upper surface 184' of first body of water 160' to a point above upper surface 184" of second body of water 160'. Water lock systems are described in U.S. patent application Ser. No. 09/952,036 (Publication No. US-2002-0082097-A1).

In some embodiments, an elevation system may be designed to be as entertaining and enjoyable as the water rides coupled by the elevation system. For example, when the elevation system includes an uphill waterslide, the entertainment value may be no less for the elevation system of the continuous water ride than for the connected water rides.

In some embodiments, an exit point of a second water ride of a continuous water ride may be coupled to an entry point of a first water ride. Coupling the exit point of the second water ride to the entry point of the first water ride may form a continuous water ride loop. The continuous water ride may include a second elevation system coupling the exit point of the second water ride to the entry point of the first water ride. The continuous water ride may couple two or more composite trees or groups of composite trees. The second elevation system may include any of the elevation systems described herein for use in coupling an exit point of the first water ride to the entry point of the second water ride. The second elevation system may be a different elevation system than the first elevation system. For example, the first elevation system may be an uphill waterslide and the second water elevation system may be a conveyor belt system. Any elevation system described herein may be adapted to move a participant or a guest from a water ride to an entry portion of a composite tree and/or a structure in the composite tree. At least some of the elevation systems described herein may require no significant adaptation in order to couple a water ride and a composite tree.

In some embodiments, a continuous water ride may include one or more floating queue lines. Floating queue lines may be more fully described in U.S. patent application Ser. No. 09/952,036 (Publication No. US-2002-0082097-A1). Floating queue lines may assist in coupling different portions of a continuous water ride. Floating queue line systems may be used for positioning riders in an orderly fashion and delivering them to the start of a ride at a desired time and/or to an entry portion of a composite tree. In certain embodiments, this system may include a channel (horizontal or otherwise) coupled to a ride on one end and an elevation system on the other end. It should be noted, however, that any of the previously described elevation systems may be coupled to the water ride by the floating queue line system. Alternatively, a floating queue line system may be used to control the flow of participants into the continuous water ride from a dry position and/or from a composite tree.

In use, riders desiring to participate in a water ride may leave the body of water and enter the floating queue line. The floating queue line may include pump inlets and outlets similar to those in a horizontal channel but configured to operate intermittently to propel riders along the queue line. The inlet and the outlet may be used solely to keep a desired amount of water in the queue line. In the latter case, the channel may be configured with high velocity low volume jets that operate intermittently to deliver participants to the end of the queue line at the desired time.

In certain embodiments, the water moves participants along the floating queue line down a hydraulic gradient or bottom slope gradient. The hydraulic gradient may be produced by out-flowing the water over a weir at one end of the queue after the rider enters the ride to which the queue line delivers them, or by out-flowing the water down a bottom slope that starts after the point that the rider enters the ride. In certain embodiments, the water moves through the queue channel by means of a sloping floor. The water from the outflow of the queue line in any method can re-enter the main channel, another ride or water feature, or return to the system sump. In some embodiments, the water level and width of the queue line may be minimized for water depth safety, rider control, and water velocity. These factors combined may deliver the participants to the ride in an orderly and safe fashion, at a desired speed and rate, with minimal water volume usage. Water depth, channel width, and velocity may be set by adjustable parameters which depend on the type of riding vehicle, participant comfort and safety, and water usage. Decreased water depth may also be influenced by local ordinances that determine operator or lifeguard assistance requirements. Minimal operator assistance consistent with safety may be desirable.

In some embodiments, continuous water rides may include exits or entry points at different portions of the continuous water ride. Floating queue lines coupling different portions and/or rides forming a continuous water ride may include exit and/or entry points onto the continuous water ride. Exit/entry points may be used for emergency purposes in case of, for example, an unscheduled shutdown of the continuous water ride. Exit/entry points may allow participants to enter/exit the continuous water ride at various designated points along the ride during normal use of the continuous water ride. Participants entering/exiting the continuous water ride during normal use of the ride may not disrupt the normal flow of the ride depending on where the entry/exit points are positioned along the course of the ride. In some embodiments, exit/entry points may include a zero-edge entry.

Embodiments disclosed herein may provide an interactive control system for a continuous water ride and/or portions of a continuous water ride. In certain embodiments, the control system may include a programmable logic controller. The control system may be coupled to one or more activation points, participant detectors, and/or flow control devices. In addition, one or more other sensors may be coupled to the control system. The control system may be utilized to provide a wide variety of interactive and/or automated water features. In some embodiments, participants may apply a participant signal to one or more activation points. The activation points may send activation signals to the control system in response to the participant signals. The control system may send control signals to a water system, a light system, and/or a sound system in response to a received activation signal from an activation point. A water system may include, for example, a water effect generator, a conduit for providing water to the water effect generator, and a flow control device. The control system may send different control signals depending on which activation point sent an activation signal. The participant signal may be applied to the activation point by the application of pressure, moving a movable activating device, a gesture (e.g., waving a hand), interrupting a light beam, a participant identifier, and/or voice activation. Examples of activation points include, but are not limited to, hand wheels, push buttons, optical touch buttons, pull ropes, paddle wheel spinners, motion detectors, sound detectors, and levers.

In some embodiments, interactive control systems may be positioned in and/or adjacent to a structure coupled to a composite tree. Interactive control systems positioned in a structure (e.g., a lodging) in a composite tree may allow lodging guests to interact with water ride participants below in a fashion that provides entertainment for both guest and participant. Any of the interactive devices described may be used. A specific example may include water cannons coupled to the composite tree that a guest may control using an interactive control system to spray participants passing nearby in an adjacent water ride.

The control system may be coupled to sensors to detect the presence of a participant proximate to the activation point. The control system may produce one or more control signals to activate a water system, sound system, and/or light system in response to a detection signal from the sensors indicating that a participant is proximate to an activation point. The control system may also be coupled to flow control devices, such as, but not limited to, valves and pumps. Valves may include air valves and water valves that control the flow of air or water, respectively, through a water feature. The control system may also be coupled to one or more indicators located proximate to one or more activation points. The control system may generate and send indicator control signals to turn an indicator on or off. The indicators may signal a participant to apply a participant signal to an activation point associated with each indicator. An indicator may signal a participant via a visual, audible, and/or tactile signal. For example, an indicator may include an image projected onto a screen.

In some embodiments, the control system may generate and send one or more activation signals in the absence of an activation signal. For example, if no activation signal is received for a predetermined amount of time, the control system may produce one or more control signals to activate a water system, sound system, and/or light system.

Throughout the water park, electronic signs or monitors may be positioned to notify riders or operators of various aspects of the water park including, but not limited to: operational status of any part of the system described herein above, estimated waiting time for a particular ride, and possible detours around non-operational rides or areas of high rider density.

In some embodiments, a water amusement park may include a cover or a screen. Screens may substantially envelope or cover a portion of a water amusement park. Portions of the screen may be positionable. Positionable screen portions may allow portions of the park to be covered or uncovered. The decision to cover or uncover a portion of the water amusement park may be based on the weather. Inclement weather may prompt operators to cover portions of the water park with the positionable screens. Clear warm weather may allow operators to move the positionable screen so that portions of the water amusement park remain uncovered. Screens are described in U.S. Pat. No. 7,497,784, entitled "ROLLABLE CARRIER RIDE," which is incorporated by reference as if fully set forth herein.

In some embodiments, positionable screens may be formed from substantially translucent materials. Translucent materials may allow a portion of the visible light spectrum to pass through the positionable screens. Translucent materials may inhibit transmittance of certain potentially harmful portions of the light spectrum (e.g., ultraviolet light). Filtering out a potentially harmful portion of the light spectrum may provide added health benefits to a water amusement park with screens relative to an uncovered water amusement park. A non-limiting example of possible screen material may include FoilTech (Victoria, Australia). FoilTech has an R protective value of about 2.5. A non-limiting example of possible screen material may include polycarbonates. Polycarbonates may have an R protective value of about 2. In some embodiments, multiple layers of screen material (e.g., polycarbonate) may be used. Using multiple layers of screen material may increase a screen materials natural thermal insulating abilities among other things. Portions of the screening system described herein may be purchased commercially at Arqualand in the United Kingdom.

In some embodiments, portions of the positionable screen may assist in collecting solar radiation. Solar radiation collected by portions of the positionable screen may be used to increase the ambient temperature in the area enclosed by the screen. Increasing the ambient temperature in enclosed portions of the water amusement park using collected solar radiation may allow the water amusement park to remain open to the public even when the outside temperature is uncomfortably cold and inconducive to typical outside activities.

In some embodiments, positionable screens may be used to enclose portions of a water amusement park. Enclosed areas of the water amusement park may function as a heat sink. Heat emanating from bodies of water within the enclosed area of the water amusement park may be captured within the area between the body of water and the positionable screens. Heat captured under the positionable screens may be recirculated back into the water. Captured heat may be recirculated back into the water using heat pumps and/or other common methods known in the art.

In some embodiments, screens may be mounted on wheels and/or rollers. Screens may be formed from relatively light but strong materials. For example, panels may be formed from polycarbonate for other reasons described herein, while structural frameworks supporting these panels may be formed from, for example, aluminum. Lightweight, well-balanced, support structures on wheels/rollers might allow screens to be moved manually by only a few operators. Operators might simply push screens into position. Mechanisms may be installed to assist operators in manually positioning screens (e.g., tracks, pulley mechanisms).

Examples of systems which facilitate movement of screens over bodies of water and/or channels (e.g., track based systems) are illustrated in U.S. Pat. No. 4,683,686 to Ozdemir and U.S. Pat. No. 5,950,253 to Last, each of which is incorporated by reference as if fully set forth herein.

In some positionable screen embodiments, screens may be moved using automated means. Powered engines (e.g., electrically driven) may be used to move positionable screens around using central control systems. Control systems may be automated to respond to input from sensors designed to track local weather conditions. For example, sensors may detect the temperature and/or if it is raining. When it begins to rain and/or if the temperature drops below a preset limit, an automated control system may move one or more positionable screens to enclose previously unenclosed portions of the water amusement park.

In some embodiments, screens may form a convertible cover (e.g., in which panels forming the cover can slide relative to one another). Some sections, adapted for such structures, may include side grooves. Side grooves may facilitate positioning of the panels and allow the panels to slide relative to each other. In some embodiments, convertible covers or screens may include curved arches forming the overall structure.

In some embodiments, substantially all of a water park may be enclosed (e.g., with screens and/or a dome). In some instances, only portions of a water park may be enclosed, for example, composite tree lodgings may be enclosed under a dome while portions of water rides may not be enclosed or may use positionable screens to enclose the portion of the water ride when necessary.

In some embodiments, a lift apparatus may be used to move or manage elements of a tree system. A lift apparatus may position, transport, or otherwise move or manipulate a plant, tree, structure, or base. In one embodiment, a lift apparatus may lift and install a plant in an opening in a base. In another embodiment, a lift apparatus (e.g., a davit) may remove a plant from an opening in a base. In certain embodiments, a lift apparatus may position a structure in a tree.

Figure 18:
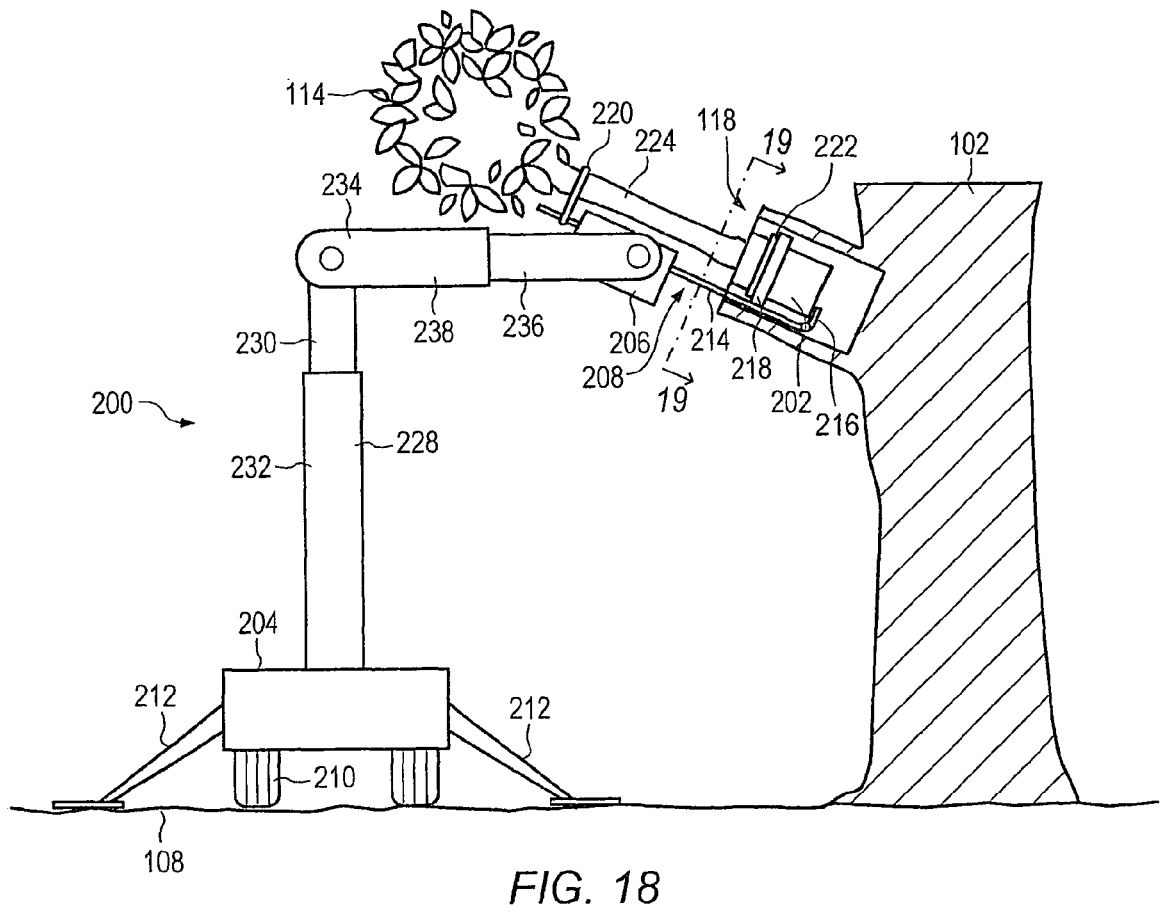
FIG. 18 depicts an embodiment of a lift apparatus.

FIG. 18 depicts lift apparatus 200. Lift apparatus 200 may be used to install, remove, and manipulate living tree 114 from opening 118 in base 102. Living tree 114 may be held in container 202. Lift apparatus 200 may include base element 204, lift mechanism 206, and holder 208. Base elements for a lift apparatus may be any shape or size. A base element may be one component or include multiple components. Base element 204 may include wheels 210 and outriggers 212. Wheels may allow lift apparatus 200, and objects held by the lift apparatus, to be easily moved. Outriggers 212 may be deployed to stabilize base element 204 during operation of lift apparatus 200. In another embodiment, a lift apparatus may be mounted in or coupled to base 102 or to a base of an adjoining tree system.

Figure 19:
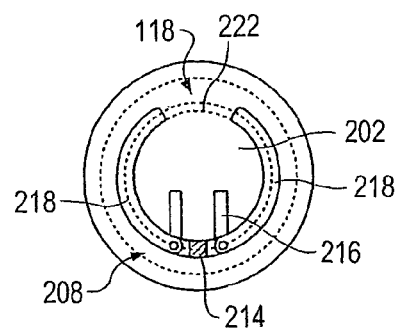
FIG. 19 depicts an embodiment of a cross sectional view of a living tree in an opening of a base.

Examples of holders include hooks, clamps, jaws, forks, shovels, threaded pins, and buckets. As shown in FIG. 18, holder 208 may include shaft 214, fork 216, jaws 218, and strap 220. FIG. 19 depicts a cross sectional view of living tree 114 taken through segment 19. Jaws 218 and fork 216 may be pivotally coupled to shaft 214. Fork 216 may be positioned to contact bottom of container 202. Jaws 218 may couple with the sides of container 202. In some embodiments, jaws 218 may engage under lip 222 or a similar protruding element on container 202. Engagement of jaws 218 with lip 222 may help support container 202 on holder 208. Strap 220 may couple with trunk 224 of living tree 114. Strap 220 may stabilize an upper portion of living tree 114. Examples of lift mechanisms include actuators, pulley systems, and hydraulic piston systems.

In one embodiment, lift mechanism 206 is an actuator that selectively advances and retracts shaft 214 relative to opening 118 of living tree 114. Lift mechanism 206 may be pivotally mounted on post 228. Post 228 may have upper section 230 and lower section 232. Upper section 230 may telescope with respect to lower section 232. Holder 208 may include arm 234. Arm 234 may include distal section 236 and proximal section 238. Distal section 236 may telescope relative to proximal section 238. Telescoping posts and/or arms may aid in positioning, raising, and lowering living tree 114 with respect to base 102. For example, extension of arm 234 may allow holder 208 to be extended over the top center region of base 102. To install living tree 114 on base 102, holder 208 may be coupled to container 202 while container 202 rests on surface 108. Container 202 may be raised to a position above opening 118. Lift mechanism 206 may be pivoted to align an axis of shaft 214 of holder 208 with an axis of opening 118. Lift mechanism 206 maybe operated to lower container 202 into opening 118. When a container is installed in opening 118, fork 218 and jaws 216 may be disengaged from container 202 so that holder 208 may be separated from living tree 114.

To remove tree from base 102, holder 208 may be coupled to container 202 in opening 118. Lift mechanism 206 may be operated to withdraw container 202 from opening 118. In an embodiment, a lift apparatus is used to move living tree 114 to a new location. In some embodiments, living tree 114 may remain in an elevated position while lift apparatus 200 is moved to a different location. In other embodiments, living tree 114 may be at least partially lowered to surface 108 before a lift apparatus is moved. Lift apparatus 200 may be used as described above to install another tree in opening 118 of base 102.

Figure 20:
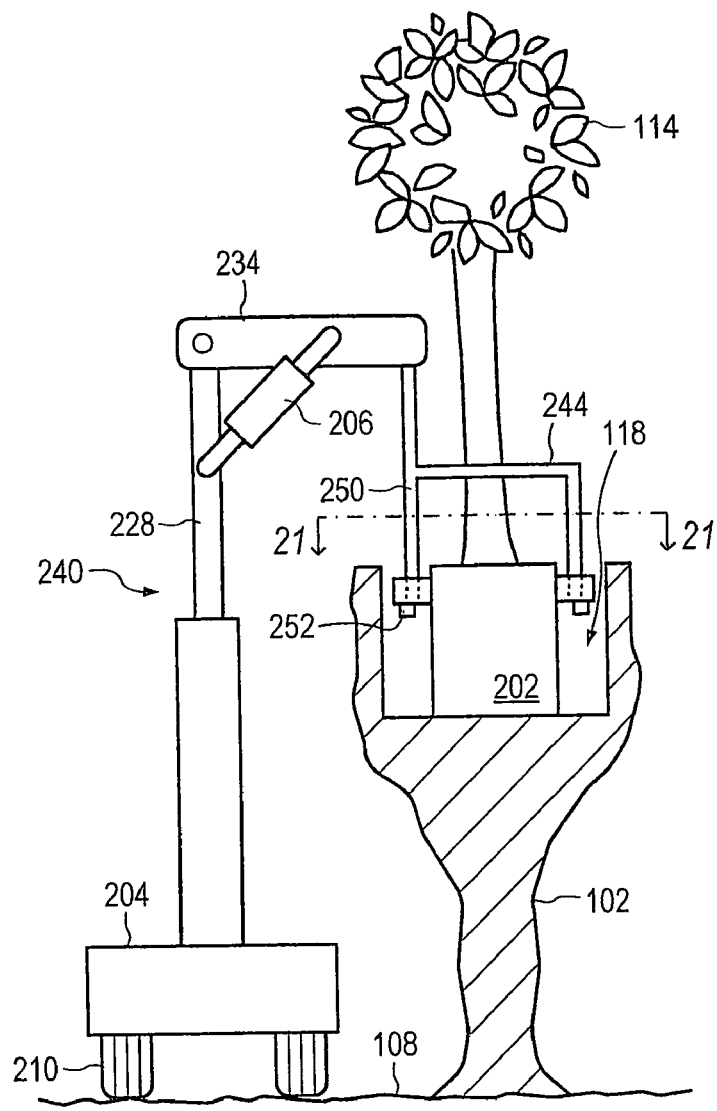
FIG. 20 depicts an embodiment of a lift apparatus.
Figure 21:
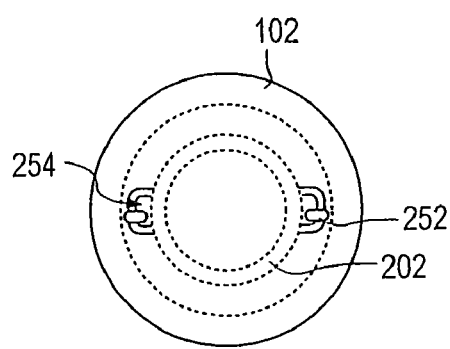
FIG. 21 depicts an embodiment of a cross sectional view of a living container in an opening of a base of a composite tree.

FIG. 20 depicts another embodiment of a lift apparatus. FIG. 21 depicts a cross sectional view of living container 202 taken through segment 21 in opening 118. Lift apparatus 240 may include lift mechanism 206 and holder 244. Arm 234 may be coupled to post 228. In one embodiment, arm 234 is pivotally coupled to post 228. Lift mechanism 206 may be coupled between arm 234 and post 228. Lift mechanism 206 may include a hydraulic system. Lift mechanism 206 may be operated to orient arm 234 relative to post 228. Holder 244 may include frame 250 and tabs 252. Tabs 252 may pivot with respect to frame 250.

To remove living tree 114, lift apparatus 240 may be operated to raise holder 244 above container 202 for living tree 114. Post 228, arm 234, and holder 244 may be manipulated to lower tabs 252 on holder 244 through slots 254 on container 202. Tabs 252 may be rotated to lock tabs with respect to container 202, as shown in FIG. 21. Arm 234 and/or post 228 may be manipulated to raise living tree 114 out of opening 118.

Figure 22:
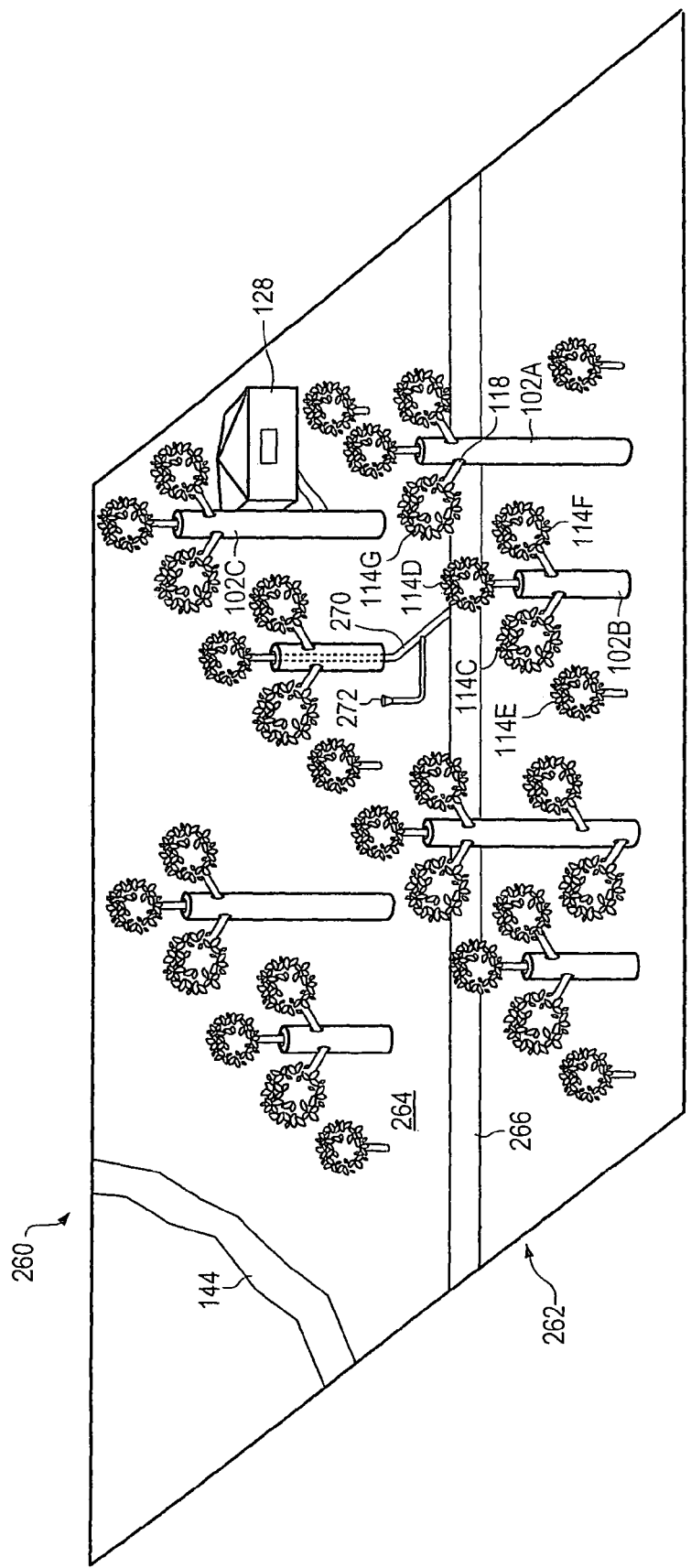
FIG. 22 depicts an embodiment of a tree farm including a section of land.

In an embodiment, a farm for growing and harvesting living plants may include living plants mounted on bases. FIG. 22 depicts tree farm 260 including section of land 262. Bases 102A, 102B may be situated on section of land 262. Bases 102A, 102B may include openings 118. Openings on opposing sides of a base may be horizontally aligned with one another, staggered, or a combination thereof. Living trees 114 may be positioned in openings 118 of 102A, 102B. Bases 102A, 102B and living trees 114 may form composite trees 100. Other living trees 114 (e.g., living tree 114E) may be planted directly in soil 264 of section of land 262.

In some embodiments, trees may be at least partially stacked with respect to one another. For example, living tree 114F on 102B is below living tree 114D on the same base. As another example, living tree 114E planted directly in soil 264 is partially under living tree 114C on base 102B. As still another example, a portion of living tree 114F on base 102B is under a portion of living tree 114G on base 102A. In certain embodiments, the height of bases 102A, 102B and openings 118 of adjacent bases are selected such that living tree 114 in one opening is directly below living tree 114 in another opening. In some embodiments, a height of one base is greater than a height of an adjacent base. Positioning living tree 114 such that a portion of one living tree 114 is under a portion of another living tree 114 may increase density of plantings on a farm, and decrease the area required for a farm of a given capacity.

In some embodiments, a farm may include systems for delivering water, fertilizer, or other materials to plants on the farm. As shown in FIG. 22, the farm may include irrigation canal 266. In one embodiment, a pump draws water from irrigation canal 266 and distributes the water through lines 270 to living trees 114 on 102A, 102B. In certain embodiments, sprinklers 272 on 102A, 102B may distribute water to living trees 114.

In certain embodiments, trees on a farm may include elevated structures. As shown in FIG. 22, structure 128 may be supported by base 102C. In some embodiments, an elevated structure may be a lodging unit. In some embodiments, a tree farm may be included with a tree lodging system.

In an embodiment, a tree farm may be coupled to a water amusement ride. As shown in FIG. 22, water amusement channel 144 may flow across section of land 262. In certain embodiments, a tree farm may be in a water amusement park.

In an embodiment, trees are periodically harvested from bases on a tree farm and replaced by different trees. For example, trees may be removed when they reach a predetermined size, and replaced with smaller trees. In some embodiments, a lift apparatus is used to remove, install, and handle the trees. Trees harvested from the farm may be used a in a variety of ways. For example, trees may be sold to customers for replanting in residential or commercial settings. As another example, trees harvested in a water amusement park may be relocated to a different area of a water amusement park (e.g., to a tree lodging system).

In some embodiments, a tree system or structure includes a covering apparatus. A covering apparatus includes any apparatus that applies a material to surfaces of an object (e.g., to a branch of a tree or the roof of a structure). For example, a snow making machine may cover the branches of a tree with snow. Covering apparatus include, but are not limited to, snow guns, water guns, sprinklers, spreaders, hoses, or drip lines. In one embodiment, a covering apparatus includes a snow making machine. A covering apparatus may be used as a fire prevention system, such as the equivalent of an exterior building sprinkler system. Suitable snow making machines include, but are not limited to, compressed-air type or airless (e.g., fan-driven) type. Various materials may be dispensed from a covering apparatus, such as water, snow, ice, frost, artificial snow (e.g., snow made from a polymer or paper), artificial greenery, fertilizer, or brine. Materials may be in various forms when dispensed from a covering apparatus, including, but not limited to, liquid, solid, gaseous, vapor, or a combination thereof. In one embodiment, water in a snow making machine includes nucleators to promote the formation of snow flakes. In one embodiment, water vapor is deposited on cold objects (e.g., tree branches that have been in a freezing environment) to form frost on the objects.

Figure 23:
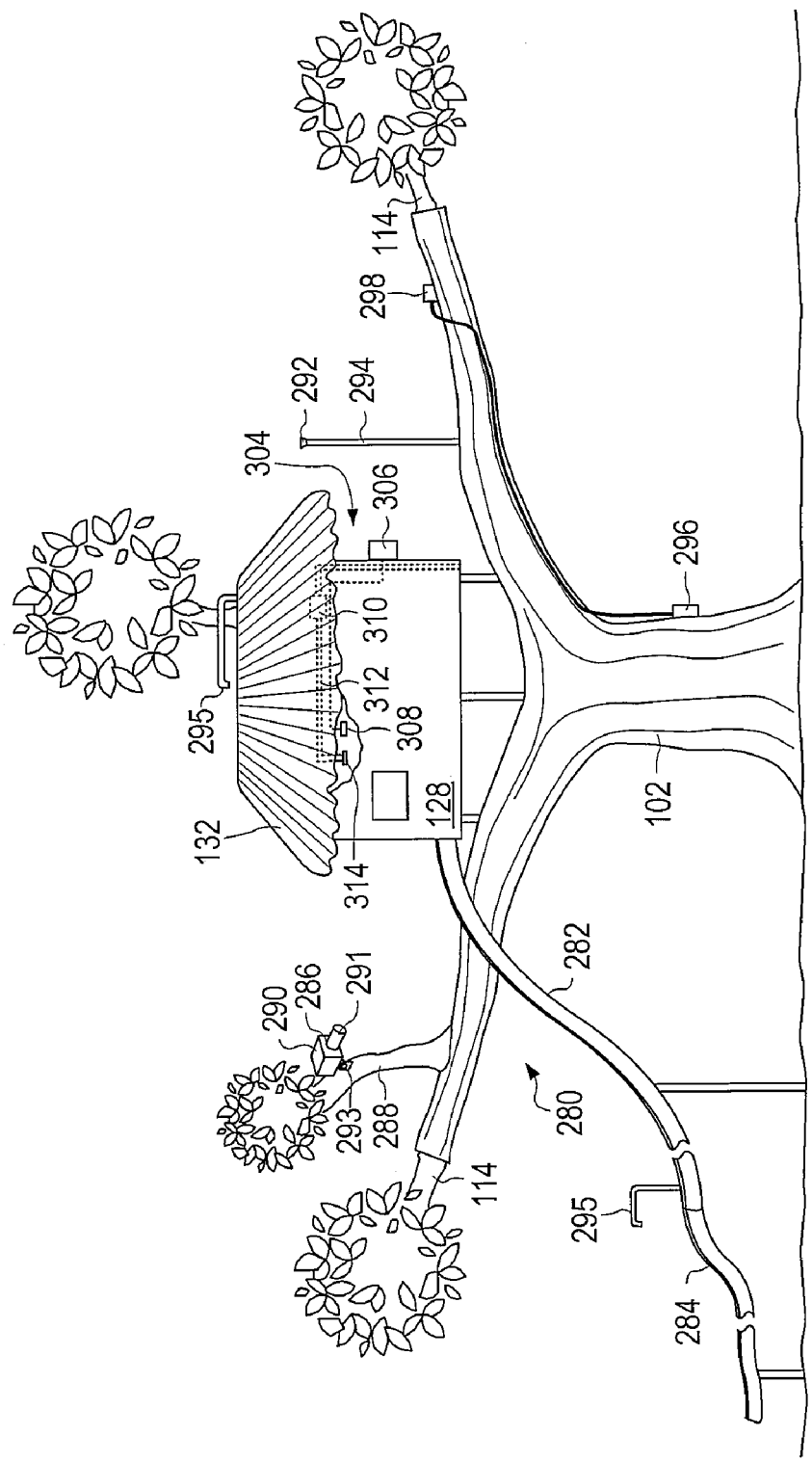
FIG. 23 depicts an embodiment of a tree system including a base, living trees, a sled run and water slide, and a snow gun.

FIG. 23 depicts tree system 280 including base 102, living trees 114, and structure 128. Sled run 282 and water slide 284 may be coupled to base 102. Snow gun 286 is coupled on mount 288. Snow gun 286 includes snow making machine 290 and nozzle 291. Snow gun 286 may apply snow to living trees 114, base 102, and structure 128. Sprinkler 292 is coupled on mount 294. Sprinkler 292 may sprinkle water on living trees 114, base 102, and structure 128. In some embodiments, mounts are in a form that blend aesthetically with the surroundings. For example, as shown in FIG. 23, mount 288 may be in the form of a natural or artificial tree branch.

In some embodiments, a covering apparatus is mounted so that it can be selectively pointed toward elements of a tree system. For example, snow gun 286 may be mounted on coupling 293. Coupling 293 may allow snow gun 286 to be selectively pointed toward roof 132 of structure 128. Suitable mounting systems include, but are not limited to, a flexible arm, u-joint, or swivel joint. In one embodiment, a covering apparatus may be mounted on a surface below the tree (e.g., on the ground). In certain embodiments, a covering apparatus may be portable.

Tree system 280 may include drip lines 295. Drip lines 295 may dispense a liquid onto elements of the tree system. In some embodiments, drip lines 295 are commonly controlled and/or supplied from a single source. In other embodiments, each drip line is independently controlled and/or supplied. In one embodiment, one or more of drip lines 295 include a manifold to distribute liquid to selected locations on roof 132 or living trees 114.

In some embodiments, a covering apparatus may be controlled manually (either at the covering apparatus or remotely). In other embodiments, a covering apparatus may be automatically controlled. For example, as shown in FIG. 23, tree system 280 may include control unit 296 and sensors 298. Control unit 296 may be programmed to control snow gun 286. Control unit 296 may activate snow making machine 290, set an output level, and move snow gun 286 through a desired pattern. Control unit 296 may control a motor coupled to coupling 293 that establishes an orientation of nozzle 291. Sensors 298 may detect when a desired level of covering is achieved. For example, sensors 298 may be optical sensors that detect when they are covered under snow applied by snow gun 286. As another example, sensors 298 may be gauges that detect when a predetermined amount of water has been applied to living trees 114.

Tree system 280 may include fire suppression system 304. Fire suppression system 304 may include fire suppression control unit 306, detectors 308, valves 310, pipes 312, and sprinklers 314. Detectors may detect smoke or fire in or around structure 128. Fire suppression control unit 306 may be coupled to detectors 308 and valves 310. When detectors 308 detect smoke or fire, fire suppression control unit 306 may automatically open valves 310 to allow water to issue from sprinklers 314, thereby suppressing fire in structure 128. In certain embodiments, fire control system 304 may provide fire suppression for living trees 114 or base 102 of tree system 280. In some embodiments, a single system is used both for watering living plants and for fire suppression for the living plants. For example, sprinkler system 292 may be coupled to fire suppression control unit 306 and be automatically activated when a fire is detected on base 102 or structure 128.

In some embodiments, a covering apparatus may apply material to portions of a water amusement ride. For example, snow gun 286 may apply snow to sled run 282. One of drip lines 295 may apply water to water slide 284.

Figure 24:
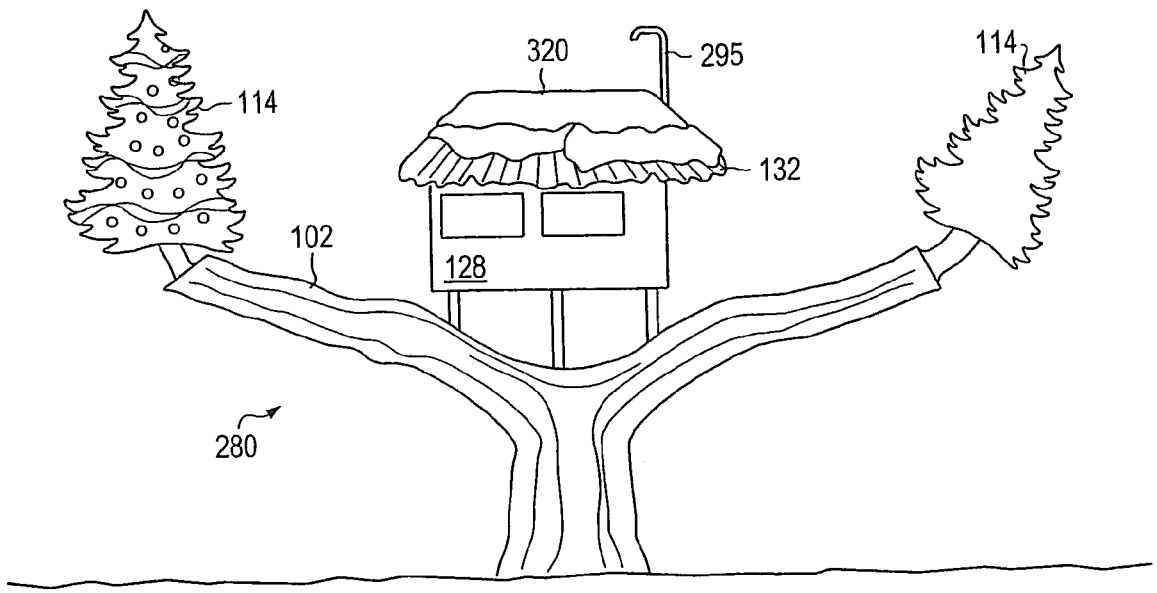
FIG. 24 depicts an embodiment of an elevated structure in a tree system including a system for applying water to a roof of the structure.

In some embodiments, one or more layers of ice are deposited on a surface. For example, layers of ice may be deposited on a roof of a structure in a composite tree. The layers of ice may have form an ice block from which an ice sculpture can be sculpted. FIG. 24 depicts structure 128 in tree system 280. Drip line 295 may be used to apply water on roof 132 of structure 128. Layers of ice 320 may form on roof 132. In some embodiments, water may freeze under the natural weather conditions. In other embodiments, equipment (e.g., freezers) may be provided to freeze the water.

Figure 25:
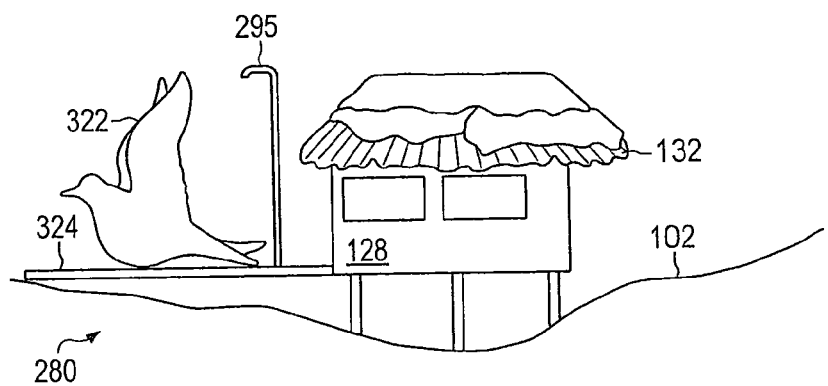
FIG. 25 depicts an embodiment of an elevated structure in a tree system including a system for applying water adjacent to the structure, which may be used to form ice for ice sculptures.

In some embodiments, ice may be formed next to a structure on a base of a tree system. FIG. 25 depicts tree system 280 including structure 128 and platform 324 on base 102. Drip line 295 may deposit water on platform 324. Layers of ice may be allowed to form on platform 324. The ice may be sculpted to form sculpture 322. Suitable instruments for sculpting may include, but are not limited to, chisels, chainsaws, handsaws, and picks. In another embodiment, blocks of ice may be frozen in one location (e.g., a freezer) and transported to the location where the ice sculpture is to be produced (e.g., in a tree or on a structure).

Figure 26:
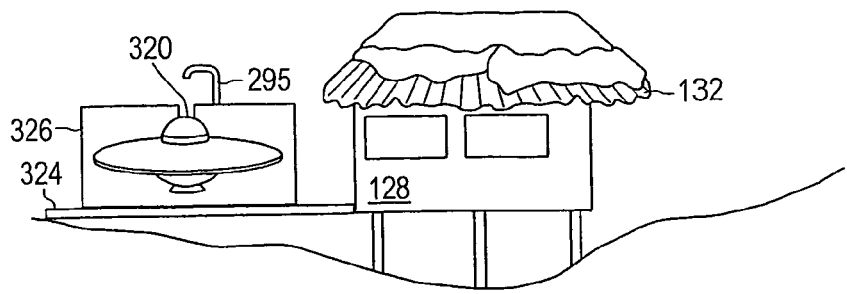
FIG. 26 depicts an embodiment of an elevated structure in a tree system including a system for applying water adjacent to the structure, which may flow into a mold forming an ice sculpture.

In some embodiments, layers of ice are formed in a mold. FIG. 26 depicts layers of ice 320 in mold 326 on platform 324. Water from drip line 295 may be allowed to drop into mold 326. Water in mold 326 may be frozen into layers of ice 320. After layers of ice 320 have formed, mold 326 may be removed, leaving an ice sculpture on platform 324.

Ice sculptures may have any of various forms. Examples include architectural forms (e.g., Eiffel Tower, Tower of Pisa), holiday symbols, animals, classical sculptures, sports objects, or musical instruments. In some embodiments, ice sculptures coupled to a structure are sculpted by dwellers in the structure. The dwellers may select a theme for the sculpture that represents the family's interests, heritage, or other characteristics. For example, a ranching family staying in a lodging unit may sculpt an ice sculpture of the ranch's brand next to the lodging unit.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A water amusement system, comprising:
   a first base coupled to a first surface, wherein the first base comprises one or more receptacles that hold one or more living plants, during use, wherein the first base forms an artificial trunk of a composite tree, and wherein the artificial trunk portion comprises synthetic bark;
   a system at least partially disposed in the first base which delivers nutrients, during use, to one or more of the receptacles in order to sustain one or more of the living plants disposed in the receptacle;
   a first structure coupled to the first base, the first structure which holds, during use, a participant of a water amusement system, wherein a bottom of the first structure is elevated above the first surface;
   a water amusement ride, wherein at least a portion of the water amusement ride is positioned adjacent the first base; and
   an access point configured to allow participants to access the water amusement ride from the first structure.

2. The water amusement system of claim 1, further comprising a platform adjacent to the access point.

3. The water amusement system of claim 1, wherein the bottom of the first structure is elevated above the first surface such that participants of the water amusement system can walk on a surface directly below at least a portion of the first structure.

4. The water amusement system of claim 1, wherein the bottom of the first structure is at least 2 meters above the first surface.

5. The water amusement system of claim 1, wherein at least a portion of the first base extends over the water amusement ride.

6. The water amusement system of claim 1, wherein at least a portion of the first structure extends over the water amusement ride.

7. The water amusement system of claim 1, wherein at least a portion of the first base or a portion of the first structure shades a portion of the water amusement ride from overhead sunlight.

8. The water amusement system of claim 1, wherein the first structure is configured to accommodate overnight guests.

9. The water amusement system of claim 1, wherein the first base comprises two or more columns, the water amusement system further comprising a bridge between the columns over a portion of the water amusement ride.

10. The water amusement system of claim 1, wherein the access point comprises an opening in the first base adjacent to the first surface, and wherein the opening provides access through the first base to the first structure.

11. The water amusement system of claim 1, wherein at least one of the plants forms a branch of the composite tree.

12. The water amusement system of claim 1, wherein at least one of the plants forms a branch of the composite tree, wherein at least a portion of one of the branches extends over the water amusement ride.

13. The water amusement system of claim 1, wherein the first structure comprises one or more lodging units.

14. The water amusement system of claim 1, wherein a bottom of at least one of the first structures is configured such that a participant positioned on the ground is inhibited from viewing the interior of the first structure.

15. The water amusement system of claim 1, further comprising an interactive control system coupled to one of the first structures, the interactive control system is operable by a participant in or on the first structure to interact with a participant on the water amusement ride.

16. The water amusement system of claim 1, wherein the access point is configured to couple the water amusement ride to the first base such that a participant can move from the first structure to the water amusement ride.

17. The water amusement system of claim 1, further comprising:
    a second base coupled to a second surface; and
    a second structure coupled to the second base, the second structure configured to hold a participant of the water amusement system above the second surface; wherein the water amusement ride conveys, during use, a participant from the first base to the second base.

18. The water amusement system of claim 17, wherein the second structure is configured to accommodate overnight guests.

19. The water amusement system of claim 17, further comprising a powered assist system configured to transport a participant at least part of the way from the first structure to the second structure.

20. The water amusement system of claim 17, further comprising a self-powered system configured to transport a participant at least part of the way from the first structure to the second structure.

* * * * *